(12) United States Patent
Bowen et al.

(10) Patent No.: US 11,514,203 B2
(45) Date of Patent: Nov. 29, 2022

(54) COMPUTER AIDED SYSTEMS AND METHODS FOR CREATING CUSTOM PRODUCTS

(71) Applicant: Best Apps, LLC, Miami Beach, FL (US)

(72) Inventors: Michael Bowen, Los Angeles, CA (US); Payton Breck Arriaga, Los Angeles, CA (US); Linden D. Nelson, Miami Beach, FL (US)

(73) Assignee: Best Apps, LLC, Miami Beach, CA (US)

( * ) Notice: Subject to any disclaimer, the term of this patent is extended or adjusted under 35 U.S.C. 154(b) by 0 days.

(21) Appl. No.: 17/302,858

(22) Filed: May 13, 2021

(65) Prior Publication Data
US 2021/0357542 A1 Nov. 18, 2021

Related U.S. Application Data

(60) Provisional application No. 63/120,374, filed on Dec. 2, 2020, provisional application No. 63/060,285, filed on Aug. 3, 2020, provisional application No. 63/026,566, filed on May 18, 2020.

(51) Int. Cl.
*G06F 30/12* (2020.01)
*G06F 3/04845* (2022.01)
(Continued)

(52) U.S. Cl.
CPC .......... *G06F 30/12* (2020.01); *G06F 3/0482* (2013.01); *G06F 3/04845* (2013.01);
(Continued)

(58) Field of Classification Search
CPC .... G06F 30/12; G06F 3/0482; G06F 3/04845; G06F 2111/02; G06T 11/001; G06T 2200/24
See application file for complete search history.

(56) References Cited

U.S. PATENT DOCUMENTS

| | | | |
|---|---|---|---|
| 4,873,643 A | 10/1989 | Powell et al. | |
| 6,389,850 B1 * | 5/2002 | Fujiwara | D04B 1/24 66/171 |

(Continued)

FOREIGN PATENT DOCUMENTS

WO WO 2019/005562 A1 1/2019

OTHER PUBLICATIONS

"All-in-One Designer—Design Studio Features" (retrieved from the Internet at Youtube "All-in-One Designer—Design Studio Features", designnbuyTV https://www.youtube.com/watch?v=wejvOhC6-54 Oct. 10, 2018 (Year: 2018).

(Continued)

*Primary Examiner* — Charles L Beard
(74) *Attorney, Agent, or Firm* — Knobbe, Martens, Olson & Bear LLP

(57) ABSTRACT

A computer-aided design (CAD) system enables physical articles to be customized via printing or embroidering and enables digital content to be customized and electronically shared. A CAD user interface may be generated that includes an image of a model of an article of manufacture and a customizable template. The customizable template may include user customizable design areas. One or more defined rules associated with respective customizable areas may be accessed. In response to a user selection of a default content item and a corresponding rule, content items may be automatically used to populate other template design areas and/or change a color of one or content items. Manufacturing instructions corresponding to the user customizations may be transmitted to a printing system using a file that includes location, rotation, and/or scale data.

21 Claims, 35 Drawing Sheets

(51) Int. Cl.
　　　*G06T 11/00*　　　(2006.01)
　　　*G06F 3/0482*　　(2013.01)
　　　*G06F 111/02*　　(2020.01)

(52) U.S. Cl.
　　　CPC ......... *G06T 11/001* (2013.01); *G06F 2111/02* (2020.01); *G06T 2200/24* (2013.01)

(56) References Cited

U.S. PATENT DOCUMENTS

| | | | |
|---|---|---|---|
| 6,459,952 B1 | 10/2002 | Dundorf | |
| 6,564,118 B1* | 5/2003 | Swab | G06Q 30/02 700/130 |
| 6,684,188 B1 | 1/2004 | Mitchell | |
| 6,718,895 B1* | 4/2004 | Fortuna | D05B 19/08 112/475.19 |
| 6,804,568 B1 | 10/2004 | Miyazaki et al. | |
| 7,117,469 B1 | 10/2006 | Dahl | |
| 7,835,591 B2* | 11/2010 | Lunetta | G06T 11/60 382/284 |
| 8,019,182 B1* | 9/2011 | Wolfram | H04N 1/40068 382/299 |
| 8,100,324 B1 | 1/2012 | Leon | |
| 8,174,539 B1* | 5/2012 | Samaniego | G06T 11/001 345/581 |
| 8,180,474 B2* | 5/2012 | Basheer | A41H 3/007 700/132 |
| 8,261,195 B2 | 9/2012 | Buehler | |
| 8,838,482 B2* | 9/2014 | Schindler | A41H 3/007 700/235 |
| 9,177,082 B2 | 11/2015 | Linder | |
| 9,299,009 B1* | 3/2016 | Arora | G06T 5/20 |
| 9,418,375 B1 | 8/2016 | Cunico | |
| 9,460,523 B1* | 10/2016 | Fujio | G06T 11/001 |
| 9,623,578 B1* | 4/2017 | Aminpour | B26D 5/005 |
| 9,702,071 B2 | 7/2017 | Harvill et al. | |
| 9,782,906 B1* | 10/2017 | Aminpour | B26D 5/007 |
| 9,868,302 B1* | 1/2018 | Aminpour | B41J 3/4078 |
| 9,971,854 B1* | 5/2018 | Bowen | G06F 3/0484 |
| D819,673 S * | 6/2018 | Bowen | D14/486 |
| 10,008,039 B1* | 6/2018 | Neustein | G06T 11/001 |
| 10,140,392 B1* | 11/2018 | Bowen | G06Q 50/184 |
| 10,176,617 B2 | 1/2019 | Harvill | |
| 10,254,941 B2* | 4/2019 | Bowen | G06F 3/0482 |
| 10,437,446 B2 | 12/2019 | Bowen | |
| 10,496,763 B2 | 12/2019 | Bowen | |
| 10,515,110 B2 | 12/2019 | Jing | |
| 10,607,411 B1 | 3/2020 | Pezzino | |
| 10,608,829 B1 | 3/2020 | Yoshihama | |
| 10,706,637 B2* | 7/2020 | Bowen | G06T 11/60 |
| 10,713,821 B1* | 7/2020 | Surya | G06N 3/0472 |
| 10,769,317 B2 | 9/2020 | Bowen | |
| 10,802,692 B2 | 10/2020 | Bowen | |
| 10,820,649 B2* | 11/2020 | Barnet | G05B 15/02 |
| 10,853,626 B2 | 12/2020 | Malkemus | |
| 10,853,839 B1* | 12/2020 | Galep | G06Q 30/0244 |
| 10,867,081 B2* | 12/2020 | Bowen | G06F 3/0482 |
| 10,922,449 B2* | 2/2021 | Bowen | G06K 9/6253 |
| 11,030,574 B1* | 6/2021 | Grande | G06N 20/00 |
| 11,036,896 B2 | 6/2021 | Bowen | |
| 11,126,653 B2 | 9/2021 | Zhai | |
| 11,263,371 B2* | 3/2022 | Bowen | G06F 30/12 |
| 11,386,588 B2* | 7/2022 | Tejima | G06F 30/12 |
| 2002/0072289 A1* | 6/2002 | Jasani | D06P 5/22 442/59 |
| 2002/0114537 A1 | 8/2002 | Sutula | |
| 2003/0069809 A1 | 4/2003 | von Rosen et al. | |
| 2003/0142847 A1 | 7/2003 | Rhoads | |
| 2003/0144758 A1 | 7/2003 | Duggirala | |
| 2003/0231185 A1* | 12/2003 | Kupersmit | G09B 11/10 345/589 |
| 2004/0030997 A1 | 2/2004 | Farrah | |
| 2004/0128621 A1* | 7/2004 | Orihara | H04N 1/0035 715/275 |
| 2005/0096885 A1 | 5/2005 | Rhodes, Jr. | |
| 2005/0122543 A1* | 6/2005 | Walker | H04N 1/622 358/1.18 |
| 2005/0289018 A1 | 12/2005 | Sullivan | |
| 2006/0072847 A1 | 4/2006 | Chor | |
| 2006/0101742 A1* | 5/2006 | Scott-Leikach | G06F 30/18 52/235 |
| 2006/0111976 A1 | 5/2006 | Pompushko | |
| 2006/0165280 A1* | 7/2006 | Miwa | H04N 1/6075 382/167 |
| 2006/0184425 A1 | 8/2006 | Hanechak | |
| 2007/0033568 A1 | 2/2007 | Barrieau et al. | |
| 2007/0132779 A1 | 6/2007 | Gilbert | |
| 2008/0006192 A1 | 1/2008 | Zeiger et al. | |
| 2008/0172208 A1 | 7/2008 | Lechine | |
| 2008/0252651 A1* | 10/2008 | Mills | G06T 11/001 345/581 |
| 2008/0308636 A1 | 12/2008 | Lynch | |
| 2009/0077510 A1 | 3/2009 | Youngman | |
| 2009/0122329 A1 | 5/2009 | Hegemier et al. | |
| 2009/0160856 A1 | 6/2009 | Hoguet | |
| 2009/0254814 A1 | 10/2009 | Lai | |
| 2010/0162137 A1 | 6/2010 | Ganz et al. | |
| 2010/0169185 A1* | 7/2010 | Cottingham | G06F 30/00 705/26.1 |
| 2010/0174400 A1* | 7/2010 | Lai | G06T 11/00 700/132 |
| 2010/0274535 A1 | 10/2010 | McDaniel | |
| 2010/0328335 A1* | 12/2010 | Hanechak | H04N 1/6011 345/589 |
| 2011/0029635 A1 | 2/2011 | Shkurko | |
| 2011/0060437 A1 | 3/2011 | Durham, III | |
| 2011/0205242 A1* | 8/2011 | Friesen | G06T 11/001 345/633 |
| 2011/0264412 A1 | 10/2011 | Fritz-Humblot | |
| 2011/0282476 A1 | 11/2011 | Hegemier | |
| 2012/0060102 A1 | 3/2012 | Shohfi | |
| 2012/0105467 A1 | 5/2012 | Chao | |
| 2012/0203371 A1* | 8/2012 | Hsu | H04N 1/644 382/163 |
| 2012/0229491 A1 | 9/2012 | Hymel | |
| 2012/0304052 A1 | 11/2012 | Tanaka | |
| 2012/0313927 A1* | 12/2012 | Curington | G06T 9/00 345/419 |
| 2013/0061142 A1 | 3/2013 | Brier | |
| 2013/0061198 A1* | 3/2013 | Brier | G06F 3/0481 716/139 |
| 2013/0125033 A1 | 5/2013 | Kelley | |
| 2013/0125072 A1 | 5/2013 | Newcomb | |
| 2013/0155111 A1* | 6/2013 | Dirsa | A43B 3/0078 345/646 |
| 2013/0173415 A1* | 7/2013 | Harvill | G06Q 30/0641 705/26.5 |
| 2013/0208305 A1 | 8/2013 | Epstein | |
| 2013/0243312 A1* | 9/2013 | Sato | G06T 7/90 382/164 |
| 2013/0266229 A1 | 10/2013 | Ptucha | |
| 2013/0336523 A1* | 12/2013 | Ruan | G06F 3/04845 345/620 |
| 2014/0033010 A1 | 1/2014 | Richardt | |
| 2014/0058959 A1 | 2/2014 | Isbjornssund | |
| 2014/0096018 A1 | 4/2014 | Iannucci | |
| 2014/0143082 A1* | 5/2014 | Larson | G06Q 30/0621 705/26.5 |
| 2014/0153821 A1* | 6/2014 | Masuko | G06F 16/5838 382/162 |
| 2014/0156416 A1 | 6/2014 | Goenka | |
| 2014/0215682 A1* | 8/2014 | Northup | A41B 1/00 2/69 |
| 2014/0342831 A1 | 11/2014 | Weston | |
| 2015/0062152 A1* | 3/2015 | Loeffler | G06T 11/001 345/601 |
| 2015/0066189 A1* | 3/2015 | Mulligan | G06Q 30/0621 700/136 |
| 2015/0109323 A1* | 4/2015 | Johnson | G06F 3/0488 345/594 |
| 2015/0134496 A1* | 5/2015 | Grinblat | G06Q 30/0643 705/27.2 |

(56) References Cited

U.S. PATENT DOCUMENTS

| | | |
|---|---|---|
| 2015/0134688 A1 | 5/2015 | Jing |
| 2015/0332479 A1* | 11/2015 | Gershon ............ G06Q 30/0627 |
| | | 382/164 |
| 2016/0035055 A1 | 2/2016 | Perkins |
| 2016/0072820 A1 | 3/2016 | Shaffer |
| 2016/0092935 A1 | 3/2016 | Bradley |
| 2016/0171304 A1* | 6/2016 | Golding ................. G01J 3/528 |
| | | 345/632 |
| 2016/0171354 A1 | 6/2016 | Glasgow |
| 2016/0188783 A1 | 6/2016 | Li |
| 2016/0210602 A1 | 7/2016 | Siddique |
| 2016/0267684 A1* | 9/2016 | Li ............................. G09G 5/06 |
| 2016/0358187 A1 | 12/2016 | Radocchia |
| 2016/0370971 A1* | 12/2016 | Hackett ............... G06F 3/03545 |
| 2017/0032050 A1 | 2/2017 | Koi |
| 2017/0039628 A1* | 2/2017 | Wang ................. G06Q 30/0621 |
| 2017/0046862 A1 | 2/2017 | Harvill |
| 2017/0064334 A1* | 3/2017 | Minoo ..................... H04N 1/64 |
| 2017/0076346 A1 | 3/2017 | Jennings |
| 2017/0115847 A1 | 4/2017 | Barras |
| 2017/0118357 A1 | 4/2017 | Morris |
| 2017/0124586 A1 | 5/2017 | Tepper |
| 2017/0139483 A1 | 5/2017 | Selker |
| 2017/0139886 A1 | 5/2017 | Chalmers |
| 2017/0220029 A1* | 8/2017 | Alun-Jones ........ G06Q 30/0621 |
| 2017/0258164 A1* | 9/2017 | Barnet ..................... G06F 3/125 |
| 2017/0259445 A1* | 9/2017 | Aminpour .............. B65H 5/222 |
| 2017/0295119 A1 | 10/2017 | Rosenberg |
| 2017/0352058 A1* | 12/2017 | Bender ................. G06Q 50/01 |
| 2017/0366579 A1 | 12/2017 | Assuncao Aguiar |
| 2017/0370040 A1 | 12/2017 | Harvill |
| 2018/0004693 A1* | 1/2018 | MacNamara ............. G06T 1/20 |
| 2018/0042419 A1* | 2/2018 | Sanders ............. A47G 25/1407 |
| 2018/0069899 A1 | 3/2018 | Lang |
| 2018/0096496 A1* | 4/2018 | Lobaugh ............... G06T 11/001 |
| 2018/0129958 A1 | 5/2018 | Saxena |
| 2018/0144243 A1 | 5/2018 | Hsieh |
| 2018/0173688 A1 | 6/2018 | Melinand |
| 2018/0285747 A1* | 10/2018 | Bron ..................... H04W 4/50 |
| 2018/0308054 A1 | 10/2018 | Obrecht |
| 2018/0350117 A1* | 12/2018 | Ogata ..................... G06Q 50/10 |
| 2018/0367704 A1* | 12/2018 | Iwafuchi ............... G06T 11/001 |
| 2018/0373686 A1* | 12/2018 | Pittman ................. G06F 40/106 |
| 2019/0004688 A1* | 1/2019 | Bowen ................. G06F 40/186 |
| 2019/0012249 A1 | 1/2019 | Mercuri |
| 2019/0012568 A1 | 1/2019 | Ku |
| 2019/0019242 A1* | 1/2019 | Bajpai ................. G06Q 30/0603 |
| 2019/0021426 A1* | 1/2019 | Barnes ..................... G06F 30/00 |
| 2019/0026054 A1* | 1/2019 | Botha ................. H04N 1/00132 |
| 2019/0026394 A1* | 1/2019 | Barnes ..................... G06F 30/00 |
| 2019/0026395 A1* | 1/2019 | Barnes ..................... B29C 64/386 |
| 2019/0026396 A1* | 1/2019 | Barnes ..................... G06F 30/00 |
| 2019/0026397 A1* | 1/2019 | Barnes ................. G06Q 30/0621 |
| 2019/0026406 A1* | 1/2019 | Barnes ................. G06Q 30/0621 |
| 2019/0026407 A1* | 1/2019 | Barnes ................. G06Q 30/0621 |
| 2019/0026809 A1* | 1/2019 | Barnes ..................... G06F 30/00 |
| 2019/0026810 A1* | 1/2019 | Barnes ................. G06Q 30/0201 |
| 2019/0052454 A1 | 2/2019 | Wright |
| 2019/0057382 A1 | 2/2019 | Wright |
| 2019/0108292 A1 | 4/2019 | Bowen |
| 2019/0158470 A1 | 5/2019 | Wright |
| 2019/0205363 A1 | 7/2019 | Zukerman |
| 2019/0236879 A1 | 8/2019 | Ivanov |
| 2019/0244407 A1* | 8/2019 | Wiesel ............... G06K 9/00369 |
| 2019/0258925 A1 | 8/2019 | Li |
| 2019/0302993 A1 | 10/2019 | Francis |
| 2019/0311550 A1 | 10/2019 | Cuthbertson |
| 2019/0325626 A1* | 10/2019 | Tao ........................ G06F 40/106 |
| 2019/0356529 A1 | 11/2019 | Gulati |
| 2019/0391731 A1* | 12/2019 | Adler .................. G06F 3/04817 |
| 2020/0057828 A1 | 2/2020 | Harrison |
| 2020/0082389 A1 | 3/2020 | Regev |
| 2020/0090407 A1* | 3/2020 | Miranda ............... G02B 27/017 |
| 2020/0126316 A1* | 4/2020 | Sharma .................. G06T 19/20 |
| 2020/0147486 A1* | 5/2020 | Bleasdale-Shepherd ................... |
| | | A63F 13/26 |
| 2020/0159870 A1* | 5/2020 | Bowen ................ G06F 3/0482 |
| 2020/0159871 A1* | 5/2020 | Bowen ................ G06T 11/001 |
| 2020/0160612 A1* | 5/2020 | Bowen ................ G06Q 30/00 |
| 2020/0219093 A1 | 7/2020 | Malhotra |
| 2020/0242279 A1* | 7/2020 | Malkosh ................ G06F 30/10 |
| 2020/0250661 A1 | 8/2020 | Padmanabhan |
| 2020/0250683 A1 | 8/2020 | Padmanabhan |
| 2020/0273048 A1 | 8/2020 | Andon |
| 2020/0279008 A1* | 9/2020 | Jain ....................... G06F 3/0487 |
| 2020/0285800 A1 | 9/2020 | Monroe |
| 2020/0311665 A1 | 10/2020 | Gray |
| 2020/0351089 A1 | 11/2020 | Wentz |
| 2020/0358783 A1* | 11/2020 | Beaver, III ............. G06F 30/12 |
| 2020/0380080 A1 | 12/2020 | Glunz |
| 2020/0402126 A1 | 12/2020 | Choche |
| 2020/0402127 A1* | 12/2020 | Stohlman ........... G06Q 30/0621 |
| 2020/0410616 A1 | 12/2020 | Theunis |
| 2021/0004995 A1* | 1/2021 | Burg ....................... G01J 3/463 |
| 2021/0012278 A1 | 1/2021 | Alon |
| 2021/0012433 A1 | 1/2021 | Zhu |
| 2021/0027352 A1* | 1/2021 | Bell ...................... B23K 26/362 |
| 2021/0027353 A1* | 1/2021 | Asbury .............. G06Q 30/0621 |
| 2021/0042830 A1 | 2/2021 | Burke |
| 2021/0125192 A1 | 4/2021 | Beaver, III |
| 2021/0133875 A1 | 5/2021 | Foote |
| 2021/0166472 A1* | 6/2021 | Han ........................ G06T 7/174 |
| 2021/0174275 A1 | 6/2021 | Valencich |
| 2021/0174603 A1* | 6/2021 | Han .................... G06F 3/04845 |
| 2021/0192097 A1* | 6/2021 | Beaver, III ............. G06Q 50/04 |
| 2021/0192814 A1* | 6/2021 | Oh ......................... G06T 11/60 |
| 2021/0201336 A1 | 7/2021 | Mallett |
| 2021/0224797 A1 | 7/2021 | Berengoltz |
| 2021/0241243 A1 | 8/2021 | Wiklof |
| 2021/0241321 A1 | 8/2021 | Downing |
| 2021/0248594 A1 | 8/2021 | Yantis |
| 2021/0264426 A1 | 8/2021 | Alt |
| 2021/0264517 A1 | 8/2021 | Harris |
| 2021/0266352 A1 | 8/2021 | Beaver, III |
| 2021/0272037 A1 | 9/2021 | Hanebeck |
| 2021/0287285 A1 | 9/2021 | Yan |
| 2021/0287406 A1* | 9/2021 | Tejima .................... G06F 30/12 |
| 2021/0304197 A1 | 9/2021 | Pomassl |
| 2021/0326494 A1 | 10/2021 | White |
| 2021/0326849 A1 | 10/2021 | Yantis |
| 2021/0333986 A1* | 10/2021 | Lee ........................ G06F 9/451 |
| 2021/0342946 A1 | 11/2021 | Leise |
| 2021/0357542 A1 | 11/2021 | Bowen |
| 2021/0366164 A1* | 11/2021 | Takase .................. G06T 11/00 |
| 2021/0373722 A1 | 12/2021 | Bamford |
| 2021/0383031 A1* | 12/2021 | Wilcox ................ A41H 3/007 |
| 2021/0390549 A1 | 12/2021 | Rule |
| 2021/0398095 A1 | 12/2021 | Mallett |
| 2021/0407007 A1 | 12/2021 | Eriksson |
| 2022/0026877 A1 | 1/2022 | Small |
| 2022/0101614 A1* | 3/2022 | Luo .......................... G06T 15/04 |

OTHER PUBLICATIONS

"Creating a Product Template," Zazzle Help Center, Jun. 2, 2018, 7 pages, https://protect-us.mimecast.com/s/B0fMCPNG43Sv4l4oc0MyUf?domain=help.zazzle.com.

DesignnbuyTV: "Web to Print Software—All-in-one Designer—Demo", YouTube, Nov. 19, 2013, pp. 1-1, url: https://www.youtube.com/watch?v=lcEX2islP08.

Ed C., "Sneak Peek . . . EZ Template", Zazzle blog, 2 page, https://zazzleblog.wordpress.com/2007/07/31/sneak-peekez-templates/, Jul. 31, 2007.

Freeformatter ("XSL Transformer—XSL T", 2016, https://www.freeformatter.com/xsl-transformer.html).

Help Center "Creating a Product Template"—Apr. 4, 2019, 4 pages, https://help.zazzle.com/hc/en-us/articles/219145288-Creating-a-Product-Template.

International Search Report and Written Opinion dated Oct. 2, 2018, received in International Patent Application No. PCT/US2018/038594.

(56) References Cited

OTHER PUBLICATIONS

Jackson Duanfeng et al., "Automatic Authentication Method and Scanner," IEEE Xplore, pp. 161-164 (Year: 2007).
Lifewire "What Is a Mobile Device?," Retrieved from Wayback Machine Sep. 27, 2018, storing https://www.lifewire.com/what-is-a-mobile-device-2373355 (Year: 2018).
PCT International Search Report & Written Opinion, regarding International Application No. PCT/US2019/062506, dated Mar. 3, 2020, 24 pages.
Quackit retrieved from the Wayback Machine Internet Archive May 8, 2017 https://www.quackit.com/html_5/tags/html_iframe_tag.cfm (Year: 2017).
Wikipedia article on Mobile Devices Retrieved from Wayback Machine Jul. 26, 2018, storing https://en.wikipedia.org/wiki/Mobile_device (Year: 2018).
International Search Report and Written Opinion dated Sep. 3, 2021, received in International Patent Application No. PCT/US2021/032604, in 22 pages.
Office Action dated Apr. 11, 2022, received in European Patent Application No. 18 739 713, in 16 pages.
Mahadeokar et al., "Open Sourcing a Deep Learning Solution for/open-sourcing-a-deep-learning-solution for Detecting NSFW Images," Sep. 30, 2016; XP055908048; Retrieved from the internet: URL: https://yahooeng.tumblr.com/post/151148689421/open-sourcing-a-deep-learning-solution-for#:~:text=Open%20Sourcinga%20Deep%20Learning%20Solution%20for%20Detecting%20NSFW%20Images&text=Automatically%20identifying%20that%20an%20image.trying%20to%20takle%20for%20decades. [retrieved on Apr. 1, 2022].

\* cited by examiner

COMPUTER AIDED SYSTEMS AND METHODS FOR CREATING CUSTOM PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to computer aided design and the manufacture of custom products.

DESCRIPTION OF THE RELATED ART

Computer-Aided Design (CAD) systems are conventionally used to design articles of manufacture. However, such conventional CAD systems often have overly difficult to use user interfaces, do not adequately ensure compliance with manufacturing processes, and do not provide adequate mechanisms for a manufacturer to provide flexibility for users to customize articles of manufacture.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product to be displayed on the first user device with default design elements in respective locations determined using a first template, wherein the first product is displayed in accordance with corresponding current color data; access current color data associated with the first product; detect a first user selection of a first template design area; determine design element collections associated with the first template design area; access a color rule corresponding to the current color data associated with the first product; access color data associated with design elements in the design element collections associated with the first template design area; use the color rule corresponding to the current color data associated with the first product, the current color data associated with the first product, and the color data associated with design elements in the design element collections associated with the first template design area to identify proscribed design elements in the design element collections associated with the first template design area; cause, a least in part, a design element menu comprising at least a portion of the design elements in the design element collections associated with the first template design area, with a visual identification of proscribed design elements; enable the first user to modify the first template design area utilizing non-proscribed design elements in the design element collections associated with the first template design area, and inhibit the first user from modifying the first template design area utilizing proscribed design elements in the design element collections associated with the first template design area; and cause at least in part design elements of the first template, as modified by the first user, to be printed or embroidered on a physical instance of the first product.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product in a first color to be displayed on the first user device with default design elements in respective locations determined using a first template; detect a first user selection of a first template design area; cause, a least in part, a design element interface comprising at least a portion of design elements in design element collections associated with the first template design area to be displayed; receive a selection of a first design element by the first user from the design element interface; access color data associated with selected first design element; at least partly in response to the color data associated with selected first design element and a color rule, change a color of the first product displayed on the first user device to a second color; and cause at least in part the selected first design element to be printed or embroidered on a physical instance of the first product having the second color.

An aspect of the present disclosure relates to a computer-implemented method, the method comprising: causing, using a computer system comprising hardware, an image of a first product in a first color to be displayed on the first user device with default design elements in respective locations determined using a first template; detecting a first user selection of a first template design area; causing, a least in part, a design element interface comprising at least a portion of design elements in design element collections associated with the first template design area to be displayed; receiving a selection of a first design element by the first user from the design element interface; accessing color data associated with selected first design element; at least partly in response to the color data associated with selected first design element and a color rule, causing a color of the first product displayed on the first user device to be changed to a second color; and causing at least in part the selected first design element to be printed or embroidered on a physical instance of the first product having the second color.

An aspect of the disclosure relates to a computer-aided design system that enables physical articles to be customized via printing, embroidering, or otherwise, and enables digital content to be customized and electronically shared. A user interface may be generated that includes an image of a model of an article of manufacture and user customizable design areas. A design customization user interface may be provided enabling a user to access a customizable template comprising one or more design areas (sometimes referred to as slots) for use in object customization. The user may be enabled to select or specify design elements that may be used to customize the object using the customizable template. Rules may be utilized to propagate a user input with respect to one design area to other design areas. Manufacturing instructions corresponding to the user customizations may be transmitted to a printing system using a file that includes location, rotation, and/or scale data.

An aspect of the present disclosure relates to a computer-aided design (CAD) computer system comprising: a computing device; a network interface; a non-transitory data media configured to store instructions that when executed by the computing device, cause the computing device to perform operations comprising: provide a design rule definition user interface comprising: a conditional specification user interface comprising: a first field configured to receive a specification of: a first template slot and associated slot content for a first customizable template; a second field configured to receive a specification of: a second template slot and associated slot content specification for the first customizable template; an operator field configured to receive an operator specification that relates the first slot and associated slot content specification with the second slot and associated slot content specification; a consequent specification user interface comprising: a third field configured to receive a specification of: a third template slot and associated slot content specification for the first customizable template; receive, via the network interface from a user device of a user, a user selection of an image of a product from an interactive catalog; enable a representation of the product to be presented on the user device; receive a user selection of the first customizable template; access one or more rules associated with the first customizable template, the accessed rules defined using the design rule definition user interface; access a data source locator associated with the first customizable template; access data using the data source locator; enable at least a portion of the first customizable template populated using the data accessed using the data source locator to be presented by the user device via a computer aided design user interface; receiving a user customization of a first rendered template slot; determining if the user customization of the first rendered template slot violates a first rule; at least partly in response to determining that the user customization of the first rendered template slot violates the first rule, reversing the user customization of the first template slot; receiving a user customization of a second rendered template slot; using a second rule to modify a third rendered template slot based at least in part on the user customization of the second rendered template slot; causing the first customizable template, as customized by the user, to be printed or embroidered on a physical instance of the product.

An aspect of the present disclosure relates to a computer-implemented method, the method comprising: receiving, over a network at a computer system, a first rule via a design rule definition user interface, the design rule definition user interface comprising: a conditional specification user interface comprising: a first field configured to receive a specification of: a first template slot and associated slot content specification for a first customizable template; a second field configured to receive a specification of: a second template slot and associated slot content specification for the first customizable template; an operator field configured to receive an operator specification that relates the first slot and associated slot content specification with the second slot and associated slot content specification; a consequent specification user interface comprising: a third field configured to receive a specification of: a third template slot and associated slot content specification for the first customizable template; wherein the first rule is associated with the first customizable template, the first rule comprising a first conditional specification and a first consequent specification; receiving, over the network at the computer system from a user device of a user, a user selection of an image of an object; enabling a representation of the object to be presented on the user device; accessing at least the first rule associated with the first customizable template; accessing a data source locator associated with the first customizable template; accessing data using the data source locator; enabling at least a portion of the first customizable template populated using the data accessed using the data source locator to be presented by the user device via a customization user interface; receiving a user input with respect to a first depicted template slot via the customization user interface; using the first rule to modify a second depicted template slot based at least in part on the user input with respect to the first depicted template slot; enabling the first customizable template, as customized by the user, to be printed or embroidered on a physical instance of the object and/or for an electronic file corresponding to the object customized using the first customizable template to be electronically distributed.

An aspect of the present disclosure relates to a computer system comprising: a computing device; a network interface; a non-transitory data media configured to store instructions that when executed by the computing device, cause the computing device to perform operations comprising: receive, using the network interface, a first rule via a design rule definition user interface comprising: a conditional specification user interface comprising: a first field configured to receive a first template slot and associated slot content specification for a first customizable template; a second field configured to receive a second template slot and associated slot content specification for the first customizable template; an operator field configured to receive an operator specification that relates the first slot and associated slot content specification with the second slot and associated slot content specification; a consequent specification user interface comprising: a third field configured to receive a third template slot and associated slot content specification for the first customizable template; wherein the first rule is associated with the first customizable template, the first rule comprising a first conditional specification and a first consequent specification; receive, using the network interface from a user device of a user, a user selection of an image of an object; enable a representation of the object to be presented on the user device; access at least the first rule associated with the first customizable template; access a data source locator associated with the first customizable template; access data using the data source locator; enable at least a portion of the first customizable template to be populated using the data accessed using the data source locator; enable at least a portion of the first customizable template populated using the data accessed using the data source locator to be presented by the user device via a customization user interface; enable the first rule to modify a second depicted template slot based at least in part on a user input with respect to the first depicted template slot; enable the first customizable template, as customized by the user, to be printed or embroidered on a physical instance of the object and/or for an electronic file corresponding to the object customized using the first customizable template to be electronically distributed.

An aspect of the present disclosure relates to a computer-aided design (CAD) computer system comprising: a computing device; a network interface; a non-transitory data media configured to store instructions that when executed by the computing device, cause the computing device to perform operations comprising: receive, via the network interface, layers from one or more layered image files, including at least: a first layer with a first design element at a first location, a second layer with a second design element at a second location, and a third layer with a third design element at a third location; store a first subset of the layers in a first file, wherein the first subset of the layers includes at least the first layer and the second layer; store a second subset of the layers in a second file, wherein the second subset of the layers includes at least the third layer; generate a template configured to be used to customize items, wherein the template comprises a plurality of slots, including slots configured to be positioned on a first side of an item and slots configured to be positioned on a second side of the item, wherein a given slot in the plurality of slots corresponds to a respective layer from the one or more layered image files, and wherein respective locations of the plurality of slots correspond to respective locations of design elements in the respective layers; respectively populate the plurality of slots with design elements from respective layers; cause design elements corresponding to slots configured to be positioned on the first side of the item to be displayed on a user device to be appear to overlay an image of the first side of the item; enable design elements corresponding to slots configured to be positioned on the second side of the item to be displayed on the user device to be appear to overlay an image of the second side of the item; enable design elements corresponding to slots configured to be positioned on the first side of the item to be printed or embroidered on the first side of the item thereby providing a customization of the first side of the item; and enable design elements corresponding to slots configured to be positioned on the second side of the item to be printed or embroidered on the second side of the item thereby providing a customization of the second side of the item.

An aspect of the present disclosure relates to a computer system comprising: a computing device; a network interface; a non-transitory data media configured to store instructions that when executed by the computing device to perform operations comprising: receive, via the network interface, layers of a layered image file, including at least: a first layer with a first design element at a first location, and a second layer with a second design element at a second location; generate a template having a plurality of slots, including at least: a first slot corresponding to the first layer at a location corresponding to the first location, and a second slot corresponding to the second layer at a location corresponding to the second location, wherein: the first slot is populated with the first design element from the first layer of the layered image file, and the second slot is populated with the second design element from the second layer of the layered image file; cause design elements corresponding to template slots of the generated template to be displayed on a user device so as to be appear to be on an image of a first side of an item; and enable design elements corresponding to template slots of the generated template to be printed or embroidered on the first side of the item.

An aspect of the present disclosure relates to a computer implemented method, the method comprising: receiving at a computer system, via ae network interface, layers of a layered image file, including at least: a first layer with a first design element at a first location, and a second layer with a second design element at a second location; generating a template having a plurality of slots, including at least: a first slot corresponding to the first layer at a location corresponding to the first location, and a second slot corresponding to the second layer at a location corresponding to the second location, wherein: the first slot is populated with the first design element from the first layer of the layered image file, and the second slot is populated with the second design element from the second layer of the layered image file; enabling design elements corresponding to template slots of the generated template to be displayed on a user device so as to appear to overlay an image of a first side of an item; and enabling design elements corresponding to template slots of the generated template to be printed or embroidered on the first side of the item.

An aspect of the present disclosure relates to a computer-aided design (CAD) computer system comprising: a computing device; a network interface; a non-transitory data media configured to store instructions that when executed by the computing device, cause the computing device to perform operations comprising: receive, via the network interface, layers of a layered image file, including at least: a first layer with a first design element at a first location, a second layer with a second design element at a second location; determine whether the first design element or the second design element comprises editable text; examine a font file for a first font associated with a layer, wherein the layer is determined to comprise editable text; based at least in part on the examination of the font file associated with a layer, determine if a system font library already comprises the first font; at least partly in response to determining that the system font library does not comprise the first font, use the font file to add the first font to the system font library; generate a template using the layers of the image file, the template including at least the first design element at a location corresponding to the first location and the second design element at a location corresponding to the second location; cause design elements, including at least one design element comprising editable text, of the generated template to be displayed on a device of a user so as to appear to overlay an image of an item; enable the first font to be used by the user to edit the design element comprising editable text; and enable template design elements, including at least one design element comprising text edited by the user using the first font, to be printed or embroidered on a physical instantiation of the item.

An aspect of the present disclosure relates to a computer-implemented method, the method comprising: receiving, via a network interface, layers of a layered image file, including at least: a first layer with a first design element at a first location, a second layer with a second design element at a second location; determining whether the first design element or the second design element comprises editable text; examining a font file for a first font associated with a layer, wherein the layer is determined to comprise editable text; based at least in part on the examination of the font file associated with a layer, determining if a font library already comprises the first font; at least partly in response to determining that the font library does not comprise the first font, use the font file to add the first font to the font library; generating a template using the layers of the image file, the template including at least the first design element at a location corresponding to the first location and the second design element at a location corresponding to the second location; enabling design elements, including at least one design element comprising editable text, of the generated template to be displayed on a device of a user so as to appear to overlay an image of an item; enabling the first font to be used by the user to edit the design element comprising editable text; and enabling template design elements, including at least one design element comprising text edited by the user using the first font, to be printed or embroidered on a physical instantiation of the item.

An aspect of the present disclosure relates to a computer-aided design (CAD) computer system comprising: a computing device; a network interface; a non-transitory data media configured to store instructions that when executed by the computing device, cause the computing device to perform operations comprising: provide, for display on a terminal of a first user, a design customization user interface enabling the first user to define a first template for use in product customization; enable the first user to define the first template using the design customization user interface by: defining one or more slots configured to receive content items; indicating for at least a first slot of the first template whether an end user is permitted to add end user-provided content to customize the first slot; defining prohibited one or more persons whose images may not be used by the end user to customize the first slot of the first template; receive a definition of the first template, the definition of the first template comprising an indication that an end user is permitted to add end user-provided content to the first slot of the first template; receive an identification of one or more prohibited persons whose images may not be used by the end user to customize the first slot of the first template; add the first template to an online catalog accessible by a plurality of end users, wherein the first template is configured to be used by end users in customizing at least a first product; enable a depiction of a first product to be displayed by an end user device via a customization user interface in association with an indication that the first slot of the first template is customizable by an end user; enable the end user to upload a first item of content comprising a first image to populate the first slot of the first template; monitor a timing of the upload of the first image to populate the first slot of the first template; use at least the monitored timing of the upload of the first image to populate the first slot of the first template to determine whether an analysis of the first image to determine if the first image includes an image of a prohibited person with respect to the first slot of the first template is to be dynamically modified from a default stage to the first stage; at least partly in response to determining that the analysis of the first image to determine if the first image includes an image of a prohibited person with respect to the first slot of the first template is to be dynamically modified from a default stage to the first stage, determine when the first stage has been reached; at least partly in response to determining that the first stage has been reached, enable a neural network to analyze the first image to determine if the first image includes an image of a prohibited person with respect to the first slot of the first template, the neural network comprising an input layer, an output layer, and one or more hidden layers; at least partly in response to determining, using the neural network, that the first image includes an image of a prohibited person with respect to the first slot of the first template, inhibit the printing or embroidering of the first image on the first product at a location corresponding to the first slot of the first template; and at least partly in response to determining, using the neural network, that the first image does not include an image of a prohibited person with respect to the first slot of the first template, enable the printing or embroidering of the first image on the first product at a location corresponding to the first slot of the first template.

An aspect of the present disclosure relates to a computer-implemented method, the method comprising: enabling a first user to define a first template configured to customize items using a design customization user interface by: defining one or more slots configured to receive content items; indicating for at least a first slot of the first template whether an end user is permitted to add end user-provided content to customize the first slot of the first template; identifying one or more prohibited objects whose images may not be used by the end user to customize the first slot of the first template; receiving a definition of the first template, the definition of the first template comprising an indication that an end user is permitted to add end user-provided content to the first slot of the first template; receiving an identification of one or more prohibited objects whose images may not be used by the end user to customize the first slot of the first template; adding the first template to an electronic catalog accessible by a plurality of end users, wherein the first template is configured to be used by end users in customizing at least a first item; enabling a depiction of a first item to be displayed by an end user device via a customization user interface in association with an indication that the first slot of the first template is customizable by an end user; enabling the end user to upload a first item of content comprising a first image to populate the first slot of the first template; monitoring a timing of the upload of the first image to populate the first slot of the first template; using at least the monitored timing of the upload of the first image to populate the first slot of the first template to determine whether an analysis of the first image to determine if the first image includes an image of a prohibited object with respect to the first slot of the first template is to be dynamically modified from a default stage to the first stage; at least partly in response to determining that the analysis of the first image to determine if the first image includes an image of a prohibited object with respect to the first slot of the first template is to be dynamically modified from a default stage to the first stage, determining when the first stage has been reached; at least partly in response to determining that the first stage has been reached, enable an image analyzer to analyze the first image to determine if the first image includes an image of a prohibited object with respect to the first slot of the first template; at least partly in response to determining, using the image analyzer, that the first image includes an image of a prohibited object with respect to the first slot of the first template, inhibiting the use of the first image on the first item at a location corresponding to the first slot of the first template; and at least partly in response to determining, using the image analyzer, that the first image does not include an image of a prohibited object with respect to the first slot of the first template, enable the use of the first image on the first item at a location corresponding to the first slot of the first template.

An aspect of the present disclosure relates to a computer-aided design (CAD) computer system comprising: a computing device; a network interface; a non-transitory data media configured to store instructions that when executed by the computing device, cause the computing device to perform operations comprising: provide, for display on a terminal of a first user, a user interface enabling the first user to identify a subject matter that is to be prohibited in performing at least a first type of customization of a given template, the template configured to be used to customize a physical item; receive, from the first user terminal via the network interface, an identification of the subject matter that is to be prohibited in performing at least the first type of customization of the given template; use the identification of the subject matter that is to be prohibited in performing at least the first type of customization of the given template to determine if image data corresponding to the identified subject matter exists in a data store of image data, the data store of image data configured to be used in determining whether an end user-supplied image includes prohibited subject matter; wherein in response a determination is made that image data corresponding to the identified subject matter does not exist in a data store of image data: a prompt is provided to the first user prompting the user to upload a specified minimum number of images of the subject matter; images of the subject matter uploaded by the first user are used to train a neural network to identify the subject matter; the trained neural network is configured to inhibit an end user from customizing at least one item using an end-user supplied image of the subject matter; wherein in response a determination is made that image data corresponding to the identified subject matter does exist in the data store of image data: the subject matter is added to a first record of prohibited of subject matter without prompting the first user to upload an image of the subject matter.

An aspect of the present disclosure relates to a computer implemented method, the method comprising: enabling a user interface to be displayed on a device of a first user, the first user interface enabling the first user to identify a subject matter that is to be prohibited in performing at least a first type of customization of a given template, the template configured to be used to customize a physical item; receiving, from the first user terminal, an identification of the subject matter that is to be prohibited in performing at least the first type of customization of the given template; using the identification of the subject matter that is to be prohibited in performing at least the first type of customization of the given template to determine if image data corresponding to the identified subject matter exists in a data store of image data, the data store of image data configured to be used in determining whether an end user-supplied image includes prohibited subject matter; at least partly in response to determining that image data corresponding to the identified subject matter does not exist in a data store of image data: causing a prompt to be provide to the first user prompting the first user to upload images of the subject matter; causing images of the subject matter uploaded by the first user to train a learning engine to identify the subject matter; using the trained learning engine to inhibit an end user from customizing at least one item using an end-user supplied image of the subject matter.

An aspect of the present disclosure relates to a computer-aided design (CAD) computer system comprising: a computing device; a network interface; a non-transitory data media configured to store instructions that when executed by the computing device, cause the computing device to perform operations comprising: enable a depiction of a first product to be displayed by an end user device via a customization user interface in association with a first template having a first slot, wherein the first slot of the first template is customizable by the end user; enable the end user to upload a first image to populate the first slot of the first template; enable the uploaded first image to be displayed on the depiction of the first image at a location corresponding to the first slot; enable the printing or embroidering of the first image on the first product at a location corresponding to the first slot of the first template; use a neural network comprising an input layer, an output layer, and one or more hidden layers to identify an object in the first image; access recommendation criteria; determine, using the recommendation criteria whether a design element recommendation is to be generated for the end user; at least partly in response to determining, using the recommendation criteria that a design element recommendation is to be generated for the end user, generate a recommendation of at least a first design element based at least in part on the object identified in the first image; generate a communication comprising the generated recommendation of the first design element, the communication comprising a customization user interface link; transmit the communication comprising the generated recommendation of the first design element to a destination associated with the end user; and at least partly in response to an activation of the link, enable the customization user interface with the first design element to be displayed by the end user device.

An aspect of the present disclosure relates to a computer implemented method, the method comprising: enabling a depiction of a first item to be displayed by an end user device via a customization user interface in association with a first template having a first slot, wherein the first slot of the first template is customizable by the end user; enabling the end user to provide a first image to populate the first slot of the first template; enabling the end user-provided first image to be displayed on the depiction of the first image at a location corresponding to the first slot; enabling the printing or embroidering of the first image on the first item at a location corresponding to the first slot of the first template; using an object recognition engine to identify an object in the first image; accessing recommendation criteria; determining, using the recommendation criteria whether a design element recommendation is to be generated for the end user; at least partly in response to determining, using the recommendation criteria that a design element recommendation is to be generated for the end user, generating a recommendation of at least a first design element based at least in part on the object identified in the first image; generating a communication comprising the generated recommendation of the first design element, the communication comprising a control; transmitting the communication comprising the generated recommendation of the first design element to a destination associated with the end user; and at least partly in response to an activation of the control, enabling the end user to customize at least one item using the recommended first design element.

An aspect of the present disclosure relates to a computer-aided design (CAD) computer system comprising: a computing device; a non-transitory data media configured to store instructions that when executed by the computing device, cause the computing device to perform operations comprising: access a template having: a first plurality of end user customizable slots; at least one collection of design elements associated with each of the plurality of end user customizable slots, wherein an end user is permitted to populate a given slot using a design element selected by the end user from a corresponding collection of design elements associated with the given slot; automatically generate and save a plurality of instantiations of populated versions of the template by automatically populating each of the first plurality of end user customizable slots with a respective design element randomly selected from a respective collection of design elements; access presentation creation instructions comprising a template instantiation quantity and a template instantiation time period; automatically generate an image presentation comprising at least a portion of the plurality of instantiations of populated versions of the template, the portion of the plurality of instantiations of populated versions of the template corresponding to the template instantiation quantity, where a display time period for a given instantiation of a populate versions of the template is determined based at least in part on the template instantiation time period included in the presentation creation instructions; associate an audio track with the automatically generated image presentation; cause the audio track to be faded beginning at a first threshold of time prior to an end of the image presentation; enable an audio visual presentation, comprising: the image presentation, the faded audio track, and a link to an item customization resource, to be made accessible via a plurality of devices associated with respective end users; track end user interactions with the link to the item customization resource; enable end users to customize at least a first item using the template at least partly in response to respective user activations of the link.

An aspect of the present disclosure relates to a computer implemented method, the method comprising: accessing a template having: a first plurality of end user customizable slots; at least one collection of design elements associated with each of the plurality of end user customizable slots, wherein an end user is permitted to populate a given slot using a design element selected by the end user from a corresponding collection of design elements associated with the given slot; automatically generating and saving a plurality of instantiations of populated versions of the template by automatically populating each of the first plurality of end user customizable slots with a respective design element selected from a respective collection of design elements; accessing presentation creation instructions comprising a template instantiation quantity and a template instantiation time period; automatically generating an image presentation comprising at least a portion of the plurality of instantiations of populated versions of the template, the portion of the plurality of instantiations of populated versions of the template corresponding to the template instantiation quantity, where a display time period for a given instantiation of a populate versions of the template is determined based at least in part on the template instantiation time period included in the presentation creation instructions; associating an audio track with the automatically generated image presentation; causing the audio track to be faded beginning at a first threshold of time prior to an end of the image presentation; enabling an audio visual presentation, comprising: the image presentation, the faded audio track, and a link to an item customization resource to be made accessible via a plurality of devices associated with respective end users; enabling end users to customize at least a first item using the template at least partly in response to respective user activations of the link.

An aspect of the present disclosure relates to a computer-aided design (CAD) computer system comprising: a computing device; a network interface; a non-transitory data media configured to store instructions that when executed by the computing device, cause the computing device to perform operations comprising: receive, via the network interface, a definition of a first template configured to be used to customize a first product type, the first template comprising: a plurality of slots corresponding to respective locations of the first product type, the plurality of slots configured to be populated with respective design elements, the plurality of slots associated with respective height/width ratios; receive, from an end user device, a selection from an online catalog, of a product of a second type; access a mapping of locations of the slots of the first template to respective locations on the product of the second type; modify two dimensions of at least one design element of at least one slot of the first template while maintaining a respective height/width ratio of the slot; use the mappings of locations of the slots of the first template to respective locations on the product of the second type to cause design elements associated with respective slots of the first template to be displayed on a rendering of the product of the second type at corresponding slot locations using the modified dimensions for at least one design element; and enable design elements associated with respective slots of the first template to be printed or embroidered on a physical instantiation of the product of the second type at corresponding slot locations using the modified dimensions for at least one design element.

An aspect of the present disclosure relates to a computer implemented method, the method comprising: receiving, at a first computer system, a definition of a first template configured to be used to customize a first product type, the first template comprising: a plurality of slots corresponding to respective locations of the first product type, the plurality of slots configured to be populated with respective design elements, the plurality of slots associated with respective height/width ratios; receiving, from an end user, a selection of a product of a second type; accessing a mapping of locations of the slots of the first template to respective locations on the product of the second type; modifying at least one dimension of at least one design element of at least one slot of the first template; using the mappings of locations of the slots of the first template to respective locations on the product of the second type to cause design elements associated with respective slots of the first template to be displayed on a rendering of the product of the second type at corresponding slot locations using the modified dimensions for at least one design element; and enabling design elements associated with respective slots of the first template to be printed or embroidered on a physical instantiation of the product of the second type at corresponding slot locations using the modified dimensions for at least one design element.

An aspect of the present disclosure relates to a computer-aided design (CAD) computer system comprising: a computing device; a network interface; a non-transitory data media configured to store instructions that when executed by the computing device, cause the computing device to perform operations comprising: access an item of video content comprising a first plurality of frames; store the first plurality of frames as corresponding frame files; use an image analysis engine to identify objects in a given frame in the first plurality of frames; associate with the given frame object identifiers corresponding to at least a portion of objects detected in the given frame; access product customization rules specifying objects that are not permitted in frames used to customize at least a first product; use the product customization rules and the object identifiers associated with the given frame to determine whether the given frame is or is not permitted to be used to customize the first product; at least partly in response to determining the given frame is not permitted to be used to customize the first product, store a corresponding indicator configured to inhibit the given frame from being used to customize the first product and/or edit the given frame so as to obscure objects in the frame; receive, over a network via the network interface, a request from a first user for the first product; determine what frames in the first plurality of frames have been used to customize the first product prior to the receipt of the request from the first user for the first product; select a first frame, among frames that have not been used to customize physical instances of the first product prior to the receipt of the request from the first user; cause the first frame to be printed on a first physical instance of the first product; store a use indication in association with the first frame indicating that the first frame has been used to customize the first physical instance of the first product; based at least in part on the use indication stored in association with the first frame indicating that the first frame has been used to customize the first physical instance of the first product, inhibit the first frame from being used to customize other physical instances of the first product; receive a request from a second user for the first product; determine what frames in the first plurality of frames have been used to customize the first product prior to the receipt of the request from the second user for the first product; select a second frame, among frames that have not been used to customize physical instances of the first product prior to the receipt of the request from the second user; cause the second frame to be printed on a second physical instance of the first product; store a use indication in association with the second frame indicating that the second frame has been used to customize the second physical instance of the first product; and based at least in part on the use indication stored in association with the first frame indicating that the first frame has been used to customize the second physical instance of the first product, inhibit the second frame from being used to customize another physical instance of the first product.

Optionally, the image analysis engine comprises an input layer, an output layer, and a plurality of hidden layers. Optionally, the first frame is positioned at a template slot location designated as a user customizable slot. Optionally, the first frame is positioned at a template slot location designated as a user customizable slot and wherein a second template slot location is not user customizable and is reserved for pre-designated content. Optionally, causing the first frame to be printed on a first physical instance of the first product further comprise transmitting a print file to a remote printer. Optionally, the operations further comprise excluding one or more frames from being used to customize at least one product based at least in part on a color composition of the frame. Optionally, the operations further comprise excluding one or more frames from being used to customize at least one product based at least in part on a color composition of the frame and a color of the at least one product. Optionally, the operations further comprise excluding one or more frames from being used to customize at least one product based at least in part on a contrast of the frame. Optionally, the operations further comprise excluding one or more frames from being used to customize at least one product based at least in part on a brightness of the frame. Optionally, the operations further comprise excluding one or more frames from being used to customize at least one product based at least in part on a presence of shadows in the frame. Optionally, the operations further comprise excluding one or more frames from being used to customize at least one product at least partly in response to determining that transparencies occupy more than a first threshold amount of the frame image. Optionally, the operations further comprise storing frames in association with respective frame identifiers identifying a sequential position of the frame in the item of video content. Optionally, the operations further comprise causing a frame sequence identifier for the first frame to be printed on the first physical instance of the first product.

An aspect of the present disclosure relates to a method comprising: receiving, over a network using a computer system, a request from a first user for the first product; determining, using the computer system, what frames in a first plurality of frames have been used to customize the first product prior to the receipt of the request from the first user for the first product; enabling, using the computer system, a first frame, among frames that have not been used to customize physical instances of the first product prior to the receipt of the request from the first user, to be printed on a first physical instance of the first product; storing in non-transitory memory a use indication in association with the first frame indicating that the first frame has been used to customize the first physical instance of the first product; based at least in part on the use indication stored in association with the first frame indicating that the first frame has been used to customize the first physical instance of the first product, inhibiting, using the computer system, the first frame from being used to customize other physical instances of the first product; receiving, using the computer system, a request from a second user for the first product; determining, using the computer system, what frames in the first plurality of frames have been used to customize the first product prior to the receipt of the request from the second user for the first product; enabling, using the computer system, a second frame, among frames that have not been used to customize physical instances of the first product prior to the receipt of the request from the second user, to be printed on a second physical instance of the first product; storing, in the non-transitory memory, a use indication in association with the second frame indicating that the second frame has been used to customize the second physical instance of the first product; and based at least in part on the use indication stored in association with the first frame indicating that the first frame has been used to customize the second physical instance of the first product, inhibiting, using the computer system, the second frame from being used to customize at least one other physical instance of the first product.

Optionally, the method further comprises: using an image analysis engine to identify objects in a given frame from a given item of video content; associating with the given frame object identifiers corresponding to at least a portion of objects detected in the given frame; accessing product customization rules specifying objects that are not permitted in frames used to customize at least one product; using the product customization rules and the object identifiers associated with the given frame to determine whether the given frame is or is not permitted to be used to customize the at least one product; at least partly in response to determining the given frame is not permitted to be used to customize the at least one product, store a corresponding indicator configured to inhibit the given frame from being used to customize the at least one product and/or edit the given frame so as to obscure one or more objects in the frame. Optionally, the first frame is selected by the first user from an image gallery, and wherein inhibiting the first frame from being used to customize other physical instances of the first product further comprises excluding the first frame from the image gallery when presented to the second user. Optionally, the method further comprises detecting that a third user has selected a third frame for customizing the first product, and wherein in response to the user selecting the third frame, inhibiting another user from using the third frame to customize the first product for a reservation period of time, wherein if the third user does not order the first product customized using the third frame, permitting another user to customize the first product using the third frame after the reservation period of time. Optionally, the first frame is positioned at a template slot location designated as a user customizable slot. Optionally, the first frame is positioned at a template slot location designated as a user customizable slot and wherein a second template slot location is not user customizable and is reserved for pre-designated content. Optionally, causing the first frame to be printed on a first physical instance of the first product further comprises transmitting a print file to a remote printer. Optionally, the method further comprises excluding one or more frames from being used to customize at least one product based at least in part on a color composition of the frame. Optionally, the method further comprises excluding one or more frames from being used to customize at least one product based at least in part on a color composition of the frame and a color of the at least one product. Optionally, the method further comprises excluding one or more frames from being used to customize at least one product based at least in part on a contrast of the frame. Optionally, the method further comprises excluding one or more frames from being used to customize at least one product based at least in part on a brightness of the frame.

Optionally, the method further comprises excluding one or more frames from being used to customize at least one product based at least in part on a presence of shadows in the frame. Optionally, the method further comprises excluding one or more frames from being used to customize at least one product at least partly in response to determining that transparencies occupy more than a first threshold amount of the frame image. Optionally, the first frame is automatically selected from a first set of frames. Optionally, the method further comprises: using an image analysis engine to identify objects in a given frame from a given item of video content; assigning tags to corresponding frames identifying objects in the corresponding frames; using the tags assigned to corresponding frames, assigning frames to galleries whose subject matter is related to the tags. Optionally, the method further comprises: using an image analysis engine to identify objects in a given frame from a given item of video content; assigning tags to corresponding frames identifying objects in the corresponding frames; receiving a user search query; using the tags assigned to corresponding frames to identify frames matching the search query; and presenting at least a portion of the identified frames in a search result. Optionally, the operations further comprises storing frames in association with respective frame identifiers identifying a sequential position of the frame in the item of video content. Optionally, the method further comprises causing a frame sequence identifier for the first frame to be printed on the first physical instance of the first product.

An aspect of the present disclosure relates to a computer system comprising: a computing device; a network interface; a non-transitory data media configured to store instructions that when executed by the computing device, cause the computing device to perform operations comprising: store a first template having one or more design areas associated with respective default design elements; identify, for a plurality of users, selections of design elements to replace one or more default design elements in the first template; based at least in part on the identification, for the plurality of users, of selections of design elements to replace one or more default design elements in the first template, select one or more new default design elements for the first template; receive over a network using the network interface, from a device of a first user, a selection of a first product via a product selection interface; cause an image of the first product to be displayed on the device of the first user with the one or more of the new default design elements in respective locations determined using the first template; enable the first user to replace at least one of the new default design elements in the first template with a different design element specified by the first user; and cause the different design element specified by the first user to be printed or embroidered on a physical instance of the first product.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product to be displayed on the first user device with default design elements in respective locations determined using a first template; receive from the first user via the first user device a selection of a first template design area; determine whether a search function is enabled for the selected first template design area; at least partly in response to determining that a search function is enabled for the selected first template design area, causing a corresponding search interface to be displayed on the first user device; receive a search query comprising one or more search terms via the search interface displayed at least partly in response to determining that a search function is enabled for the selected first template design area; identify design elements in a collection of design elements assigned to the selected first template design area that match the search query; rank the design elements in the collection of design elements assigned to the selected first template design area that match the search query; cause at least a portion of the ranked design elements in the collection of design elements assigned to the selected first template design area that match the search query to be displayed on the first device; enable a selection by the first user of a design element in the ranked design elements to be displayed in the first template design area on the first user device; and cause at least in part the design element, in the ranked design elements, selected by the user by the first template, to be printed or embroidered on a physical instance of the first product.

An aspect of the present disclosure relates to a computer system comprising: a computing device; a network interface; a non-transitory data media configured to store instructions that when executed by the computing device, cause the computing device to perform operations comprising: enable an image of a first product to be displayed on a first user device associated with a first template having a plurality of slots; receive from the first user via the first user device a selection of a first template slot; cause a search interface to be displayed on the first user device; receive a search query comprising one or more search terms via the search interface; identify design elements in a collection of design elements assigned to the selected first template slot that match the search query; rank the design elements in the collection of design elements assigned to the selected first template slot that match the search query; cause at least a portion of the ranked design elements in the collection of design elements assigned to the selected first template slot that match the search query to be displayed on the first device; enable a selection by the first user of a design element in the ranked design elements to be displayed in the first template slot on the first user device; cause at least in part the design element, in the ranked design elements, selected by the user by the first template, to be printed or embroidered on a physical instance of the first product.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product to be displayed on the first user device, wherein the image of the first product is associated with a first template; receive from the first user via the first user device a selection of a first design area of the first template; access one or more design area links linking the first design area of the first template with at least a second design area of at least one template being used to customize the first product; cause a menu of design elements associated with the first design area to be displayed on the first user device; receive a first user selection of a first design element from the menu of design elements associated with the first design area; based at least in part on the first user selection of the first design element from the menu of design elements associated with the first design area, and on the accessed one or more design area links linking the first design area of the first template with at least the second design area, enable at least the second design area to be populated with a second design element; and cause at least in part the first design element and the second element to be printed or embroidered on a physical instance of the first product in a first area and a second design area respectively.

An aspect of the present disclosure relates to a computer system comprising: a computing device; a network interface; a non-transitory data media configured to store instructions that when executed by the computing device, cause the computing device to perform operations comprising: enable an image of a first item to be displayed on a first user device, wherein the image of the first item is associated with a first template; receive from the first user via the first user device a selection of a first slot of the first template; access one or more links linking the first slot of the first template with at least a second slot of at least one template being used to customize the first product; receive a first user selection of a first design element from a menu of design elements associated with the first slot or a provision of the first design element; based at least in part on the first user selection or provision of the first design element, and on the accessed one or more links linking the first slot of the first template with at least the second slot, enable at least the second slot to be populated with a second design element; and enable at least in part the first design element and the second element to be printed or embroidered on a physical instance of the first item in a first area and a second slot respectively.

An aspect of the present disclosure relates to a computer-aided design (CAD) computer system comprising: a computing device; a network interface; a non-transitory data media configured to store instructions that when executed by the computing device, cause the computing device to perform operations comprising: receive a selection of a first template configured to be used to customize a first product; identify a first template form corresponding to the selected first template, the first template form separate from the first template, the first template form comprising a plurality of fields configured to receive design elements and/or identifiers associated with design elements; receive template form field inputs, the template form field inputs comprising design elements and/or identifiers associated with design elements; access a mapping of template form fields to slots of the selected first template; populate the first template with design elements based at least in part on the mapping of template form fields to slots of the selected first template and the received template form field inputs; enable an image of the first product to be displayed on a first user device, wherein the image of the first product is overlaid with design elements in accordance with the populate first template; and cause at least in part the design elements used to populate the first template to be printed or embroidered on a physical instance of the first product in areas corresponding to respective template slots.

An aspect of the present disclosure relates to a computer-aided design (CAD) computer system comprising: a computing device; a network interface; a non-transitory data media configured to store instructions that when executed by the computing device, cause the computing device to perform operations comprising: receive a selection of a first template configured to be used to customize a first product, the first template comprising a plurality of design areas; identify a data store of sets of design elements associated with respective metadata; select a first set of design elements from the data store, the first set of design elements associated with first metadata; populate, based at least in part on the first metadata, a first iteration of the first template using the first set of design elements; store the populated first iteration of the first template in memory; determine a presence of a second set of design elements in the data store; based at least in part on the determined presence of the second set of design elements in the data store, access the second set of design elements and associated second metadata from the data store; populate, based at least in part on the second metadata, a second iteration of the first template using the first set of design elements; store the populated second iteration of the first template in memory; populate an interactive online catalog with the populated first iteration of the first template and the populated second iteration of the first template; receive, via the interactive online catalog, an instruction from a first user device to produce a customized first product using the populated first iteration of the first template; cause at least in part the design elements used to populate the first iteration of the first template to be printed or embroidered on a physical instance of the first product.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product to be displayed on the first user device via a product customization user interface, wherein the image of the first product is associated with a first template; receive from the first user via the first user device a selection of a first design area of the first template via the product customization user interface; cause a menu of design elements associated with the first design area selected by the first user to be presented via the product customization user interface; receive a selection of the first user of a first design element from the menu of design elements associated with the first design area; cause the first design element selected from the menu of design elements associated with the first design area to be displayed on the image of the first product at a location corresponding to the first design area; determine if the first design element selected from the menu of design elements associated with the first design area is linked to a first item of video content;

at least partly in response to determining that the first design element selected from the menu of design elements associated with the first design area is linked to a first item of video content, cause the first item of video content to be played back via the first user device; and cause at least in part the first design element to be printed or embroidered on a physical instance of the first product at the location corresponding to the first design area.

An aspect of the present disclosure relates to a computer system comprising: a computing device; a non-transitory data media configured to store instructions that when executed by the computing device, cause the computing device to perform operations comprising: enable an image of a first product to be displayed on a first user device via a product customization user interface, wherein the image of the first product is associated with a first template; receive from the first user via the first user device a selection of a first design area of the first template via the product customization user interface; cause a menu of design elements associated with the first design area selected by the first user to be presented via the product customization user interface; receive a selection of the first user of a first design element from the menu of design elements associated with the first design area; cause the first design element selected from the menu of design elements associated with the first design area to be displayed on the image of the first product at a location corresponding to the first design area; determine if the first design element selected from the menu of design elements associated with the first design area is linked to a first item of video content; at least partly in response to determining that the first design element selected from the menu of design elements associated with the first design area is linked to a first item of video content, cause the first item of video content to be played back via the first user device; and cause at least in part the first design element to be printed or embroidered on a physical instance of the first product at the location corresponding to the first design area.

An aspect of the present disclosure relates to a computer-aided design (CAD) computer system comprising: a computing device; a network interface; a non-transitory data media configured to store instructions that when executed by the computing device, cause the computing device to perform operations comprising: provide for display on a device of a first user a product selection user interface enabling a first user to select a product image; receive over a network using the network interface, from the device of the first user, a selection of an image of a first product via the product selection interface; cause the image of the first product to be displayed on the first user device via a product customization user interface, wherein the image of the first product is associated with a first template; receive from the first user via the first user device a selection of a first design area of the first template via the product customization user interface; cause a menu of design elements associated with the first design area selected by the first user to be presented via the product customization user interface; receive a selection of the first user of a first design element from the menu of design elements associated with the first design area; cause the first design element selected from the menu of design elements associated with the first design area to be displayed on the image of the first product at a location corresponding to the first design area; and cause at least in part the first design element to be printed or embroidered on a physical instance of the first product at the location corresponding to the first design area and determine remittances due to a plurality of different entities related to the first design element being printed or embroidered on the physical instance of the first product at the location corresponding to the first design area and cause the transfer of the determined remittances to the plurality of different entities.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 3A-3G illustrate example interfaces.

FIGS. 13A-13D illustrate example user interfaces.

DESCRIPTION

Figure 1A:
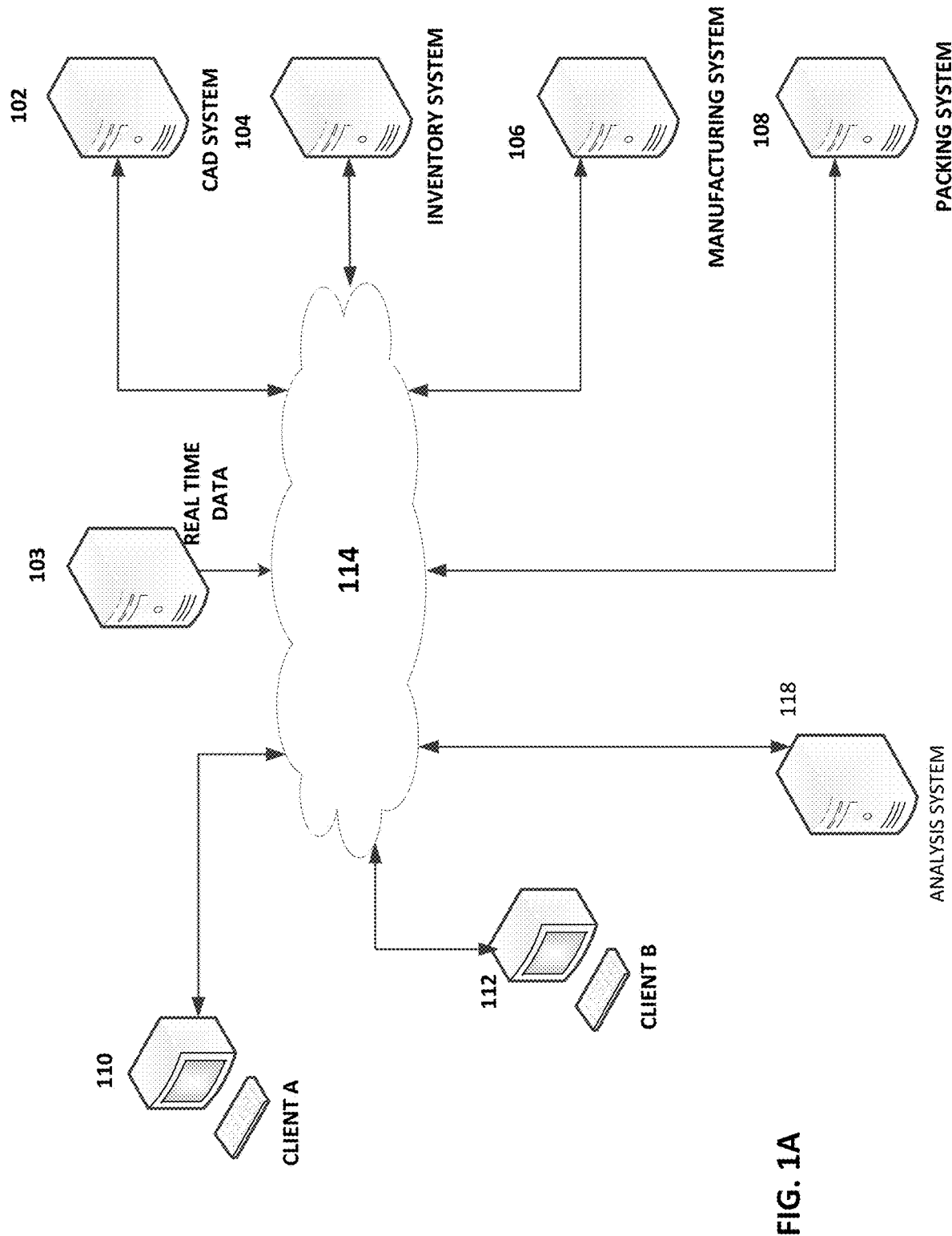
FIG. 1A is a block diagram illustrating an example embodiment of an operating environment.

Systems and methods are described that provide computer aided design of customized items (e.g., physical or digital objects). Non-limiting examples of such items may include t-shirts, hoodies, shirts, jackets, dresses, pants, glasses, phone cases, laptop skins, backpacks, laptop cases, tablet cases, hairbands, wristbands, jewelry, digital content, and the like. Techniques, processes and user interfaces are disclosed that enable more efficient and accurate generation, editing, and printing or embroidering of design elements. Because the resulting customized items will more closely reflect user-desired customizations, there may be less wastage of materials (e.g., item fabric, ink, etc.), as there will be fewer defective or unsatisfactory customized items.

The user may utilize the CAD system to select an object to customize (e.g., t-shirts, hoodies, shirts, jackets, dresses, pants, glasses, phone cases, laptop skins, backpacks, laptop cases, tablet cases, hairbands, wristbands, jewelry, digital content, and the like) from an interactive catalog of objects, and may then customize the object using design elements/templates from a library of design elements/templates (e.g., tournament/match brackets, sport paraphernalia (e.g., sport clothing, sports equipment (e.g., basketball, baseball, football, soccer ball, hockey puck, basketball hoop, basketball net, football goal post, hockey goal, baseball bat, hockey stick, etc.), team names, team logos, league names, league logos, and/or the like), and/or user-provided content (e.g., uploaded images or text).

Where the customized object is a digital object (e.g., a displayable electronic image customized by the user), the user-customized object may be transmitted to and displayed by a display (e.g., a large screen display at a venue during an event) and/or shared via social media or other communication channels (e.g., short messaging service messages, email, or otherwise).

Optionally, the CAD system may enable an item (e.g., a product) provider to submit (e.g., via an upload or by providing a link) one or more images of the item (e.g., a photograph or graphic image of the front, back, left side, right side, top view, bottom view, and/or interior view of the item) and/or portions of the item (e.g., left sleeve, right sleeve, shoe lace, strap, etc.) for posting to an online interactive catalog of one or more items. The CAD system may enable certain customization options to be enabled for users and may enable the definition of certain areas of the item which may or may not be customized by users. Optionally, the system may enable an item provider to specify a custom, product-specific, announcement bar for each item. The announcement bar may comprise text positioned at the top, bottom, or side of an item detail page. The announcement bar may include information regarding current availability, a promotion/sale, or other information.

An example CAD system may provide a user interface including a design area and a set of tools via which a product provider can specify and/or apply design elements (e.g., text, image, and/or a graphic design elements) to an object product, specify areas to which an end user may specify design elements to be applied (e.g., printed or embroidered), specify permitted end user modifications to a design element originally specified by the product provider (that the system may perform in response to an end user request), specify permitted design element types and characteristics that the system may apply to the product in response to an end user request, and specify defaults and permitted modifications to such defaults (e.g., with respect to text alignments, colors, design elements, etc.). For example, the item provider (or other authorized administrator) may specify image filters that end users are permitted to apply to images (e.g., vintage filters, vivid filters, sepia, black and white, pop-art/saturated colors, graphite, invert colors, texture, grain, etc.).

Optionally, as noted above, the CAD system may provide predefined templates for customizing objects which the user may edit. Optionally, rules may be defined that limit modifications the user may make to the template. Examples of CAD systems, and examples of such rules, and systems and methods for enforcing and implementing such rules are described in U.S. application Ser. No. 16/690,029, filed Nov. 20, 2019, titled COMPUTER AIDED SYSTEMS AND METHODS FOR CREATING CUSTOM PRODUCTS, the contents of which are incorporated herein by reference in their entirety.

As discussed above, rules may be defined (e.g., via a rules definition user interface) that inhibit a user from using certain types of user-supplied images (e.g., images of specified subject matters) in a template slot and/or in conjunction with other predefined design elements in customizing a product. For example, a user may be prohibited from combining certain photographs or other images of faces with certain pre-defined design elements included in a template when customizing a product. A library of facial fingerprints may be generated and stored of faces that may not be combined with pre-determined design elements. By way of further example, a user may be prohibited from customizing a template or template slot using specified subject matter (e.g., a logo of a specific team, a specific item from a specific brand, or other object), or an object type (e.g., cigarettes, alcohol, drugs, etc.).

An example process may be utilized for searching for images whose subject matter an entity may which to prohibit in being used to customize a template or item and for generating fingerprints of a corresponding subject matter image. Optionally, images of a prohibited person or object may be provided by an entity (e.g., an entity whose content is being used to populate one or more template slots).

Image search image criteria may be accessed or received (e.g., via a user interface). For example, the criteria may include tags that are expected to be associated with images of people or types of people that rules specify may not be utilized in customizing a template, a specific template slot, or a product-type the may be customized using a template. For example, the search terms/tags may include category tags or group tags (e.g., sports team name, performance group name, movie name, play name, television show name, movie star tag, television star tag, celebrity tag, model tag, politician tag, congress tag, senate tag, president tag, vice president tag, CEO tag, etc.). In addition, the search criteria may include tags or file name suffixes that identify images in general (e.g., img tags).

Various websites and/or data stores may be crawled to locate images matching the search criteria. As similarly discussed above, certain webpages may be rendered (without necessarily being displayed) in order to identify images. The located images may be processed as discussed elsewhere herein to locate faces with the images, and to generate facial feature data (e.g., location, distance, and/or size information with respect to eyes, nose, mouth, etc.) that may be used as a facial fingerprint (e.g., using computer vision techniques described elsewhere herein, such as by using a deep neural network or other trained learning engine or artificial intelligence engine).

The facial feature data and tags may be stored in memory. Optionally, a third party database storing images and/or facial fingerprints (e.g., of celebrities or other classes of people, landmarks, objects, etc.) may be used instead of or in addition to using the facial fingerprints generated using the search process.

Optionally, an entity that is defining certain prohibition rules may generate a blacklist of specific people whose images and likeness may not be used with a particular template, set of templates, template slots, and/or item being customized. For example, such an entity may upload one or more images of a given person whose image may not be used. The images of the person may be used to train an artificial intelligence learning engine (e.g., a deep neural network) to recognize the person's face in images provided by end users in customizing a template. The entity may tag the image with the name or other identifier of the person whose likeness is in the image. The tag may be used by the search engine to search one or more sites for images that are similarly tagged, and corresponding located images may be used to further train the artificial intelligence learning engine to recognize the person's face.

Optionally, in addition to or instead of utilizing a blacklist, an entity may defined a white list for a template as a whole, for a set of templates, or on a template slot-by-slot basis. For example, if the entity is defining a white list for a sports team, the whitelist may include, for a given template slot, the name of the city where the team is based, and so only that city name may be used to populate a slot. By way of further example, a whitelist for a given slot may include the names of team members, where only those names may be used to populate the slot. By way of yet further example, a whitelist for a given slot may include the names of teams in a league, where only those team names may be used to populate the slot. By way of still further example, if the entity is a city, a whitelist may include zip codes that are present in the city.

Optionally, prior to the entity uploading images of the person whose images and likeness may not be used, the entity may provide a name of the person. The system may determine whether it already has images of the person (e.g., any images or sufficient images to train the learning engine), and if not, the system may prompt the entity to provide a specified minimum number of images of the person (which may be greater than one) to train the learning engine. The entity may then upload the images of the person which may then be used to train the learning engine to recognize the person.

Optionally, an entity that is defining certain prohibition rules may generate a blacklist of specific objects (non-human objects, such a logos or competitor products) whose images and likeness may not be used with a particular template, set of templates, template slots, and/or item being customized. For example, such an entity may upload one or more images of a given object whose image may not be used. The images of the object may be used to train an artificial intelligence learning engine (e.g., a deep neural network) to recognize the object in images provided by end users in customizing a template.

An example process may be utilized for determining if a face in an image corresponds to a prohibited face. Certain techniques described herein may optionally be used in performing the process. A user, customizing a template slot of a template configured to customize a physical or digital item, may upload an image to the design system from a user device or other storage system. The presence of a face in the image may detected. Optionally a third party face detection service may be accessed via an API (e.g., the FACE API) that detects one or more faces in an image and returns a face bounding boxes identifying the location of the faces, optionally in conjunction with face attributes including predictions of facial features. The face attribute features may include age, emotion, gender, pose, smile, and/or facial hair as well as multiple landmarks for each face in the image.

With respect to a detected face, certain facial features of the face are identified (e.g., the distance between the eyes, or the position or distance of the mouth relative to the nose). Optionally, the face may be aligned to a desired position. For example, an affine transformation may be used in rotating the face to desired orientation. The image may optionally be reduced in size (e.g., 96×96, 128×128, 192×192, or other number of pixels) for input to a trained CNN feature extractor.

Facial embeddings (feature vectors) may be generated and may be used in generating a facial fingerprint. If the user-provided image is to be used to customize a slot that prohibits the inclusion of certain faces or categories of faces, the facial fingerprint of the user-provided image may be compared to the facial fingerprints of prohibited specified people or categories of people. The closest matching face may be identified as a match. If the closest matching face is that of a prohibited specified person or prohibited category of people, a warning or rejection indication may be generated, inhibiting the use of the user-provided image in customizing the slot. Otherwise, the user-provided image may be used to customize the slot.

Figure 21:
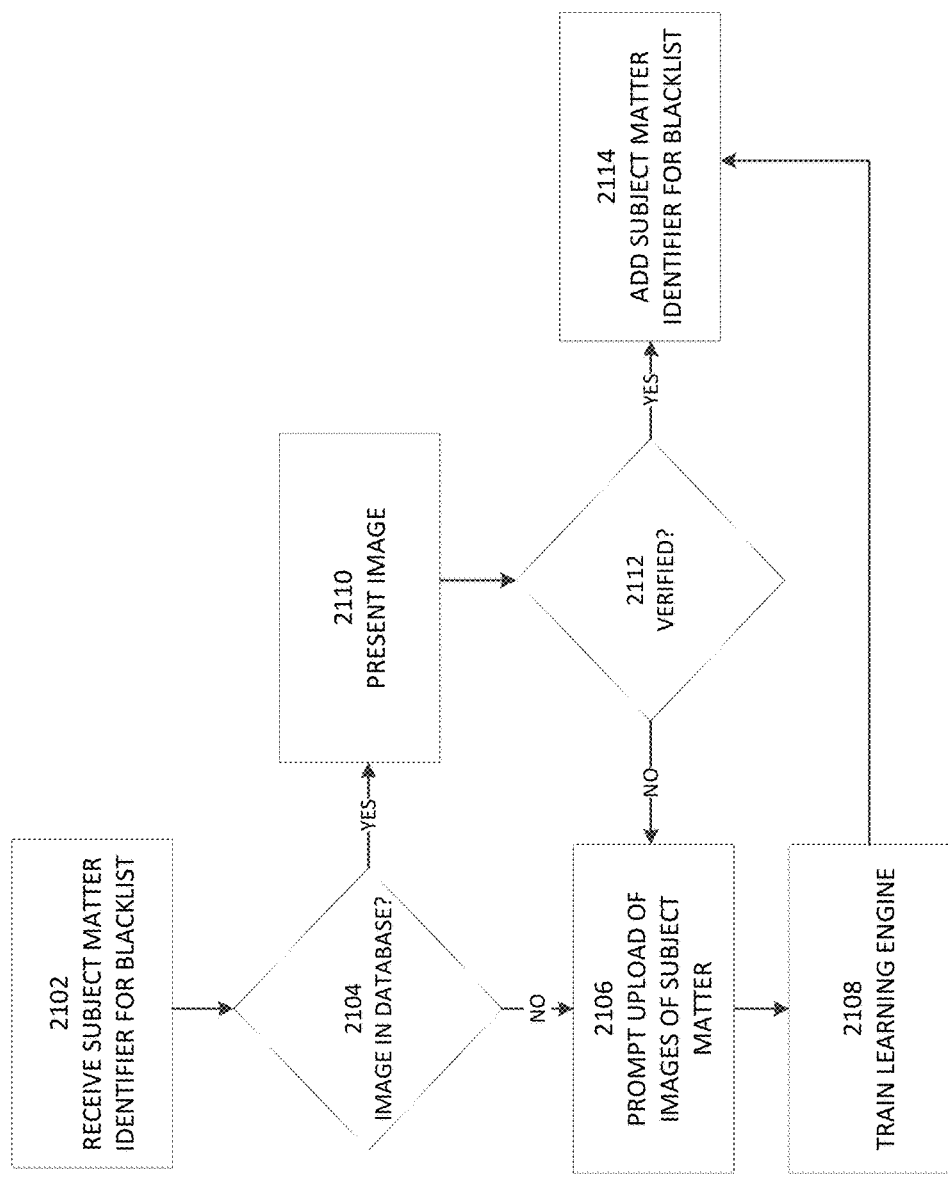

FIG. 21 illustrates an example process of enabling an entity to provide images of people or objects that may be prohibited for use in one or more specific templates, template slots, and/or for use in combination with specific other content items (where the subject matter may be placed on an electronic blacklist, optionally in association with one or more blacklist rules indicating under what circumstances the subject matter may not be used).

At block 2102, a subject matter identifier of a subject matter whose use is to be prohibited (e.g., in one or more specific templates, template slots, and/or in combination with specific other content items) may be received via a user interface presented on a user device (e.g., a user interface presented via a browser hosted on a user device or a dedicated application hosted on the user device).

For example, the identifier may be the name of a well-known person (e.g., a celebrity, an athlete, a politician, an actor, etc.) or of an object (e.g., a brand name, or a logo). Optionally, additional information may be provided to aid in performing disambiguation (where two or more people may have the same name). For example, if the subject matter identifier includes the name of an athlete, the name of the team may also be provided to enable the system to correctly identify which person is being referred to. By way of further example, if the identifier is a logo, the name of the company and/or brand may be provided. Optionally, in addition or instead of providing a textual identifier, an image of the subject matter may be provided.

At block 2104, a determination is made as to whether a candidate image of the prohibited subject matter is already present in a data store (e.g., a subject matter image data store). For example, images (which may be the actual images, and/or "facial fingerprints" of people or "fingerprints" of objects in the images, generated as similarly discussed elsewhere herein) in a data store may be stored in association with metadata that identifies one or more subject matters in the images (e.g., a name and/or related identifying data). The subject matter identifier and associated information may be compared to that stored in the data store to determine if a match is found. If the user submitted an image of the subject matter, a fingerprint of the subject matter in the user-provided image may be generated (as similarly discussed elsewhere herein) and compared against subject matter fingerprints stored in the data store.

If a determination is made that one or more candidate images of the identified subject matter are in the data store (e.g., with a certain level of confidence as determined based on a similarity score generated at block 2104), at block 2110 one or more of the images may be accessed and provided for display on the user device via a user interface. The candidate image(s) may be displayed in association with a corresponding verification control, via which the user can indicate whether or not the image is an image of the subject matter the user intends to add to the blacklist.

At block 2112, a determination may be made as to whether the user verified that the candidate image(s) correspond to the subject matter via the verification control. If, at block 2112, the user verifies (by activating the verification control) that the displayed image(s) are of the identified subject matter, at block 2114 the subject matter (e.g., the image(s) and/or a subject matter identifier which may include the identifier provided by the user and/or may include a unique computer generated alphanumeric identifier) may be stored on a blacklist associated with the entity on whose behalf the user is acting.

Optionally, the subject matter may be stored in association with links/pointers to image(s) of the subject matter in the data store. Optionally, one or more usage rules specified by the user with respective to the subject matter may be stored in association with the image, with one or more templates, and/or with one or more template slots. For example, a rule may specify that the subject matter may not be used in one or more templates, template slots, and/or in combination with specific other design elements. Optionally instead of or in addition to storing the subject matter in a blacklist, the subject matter may be added to a menu of subject matters, which a user can select from in specifying exception rules for a template.

If, at block 2112, a determination is made that the user did not verify that the displayed candidate image(s) are of the identified subject matter (e.g., by activating a control that indicates that the candidate image(s) do not correspond to the subject matter) or if, at block 2104, a corresponding candidate image was not located in the data store, the process may proceed to block 2106.

At block 2106, the user may be prompted to upload a specified number of images of the subject matter. For example, the number of images may be determined based on the number of images needed to train a facial or object recognizer (e.g., ten image, a hundred images, a thousand images) such as those described elsewhere herein (e.g., convolutional neural networks), to recognize the subject matter in new images (e.g., submitted by end users who are using templates to customize items as described elsewhere herein). The number of needed images may be reduced if the neural network is pre-trained.

The uploaded images may be received, at block 2108, and the recognizer may be trained to recognize the face or object to be added to the blacklist or menu of subject matters. If number of uploaded images is determined to be less than that of the requested number of images, optionally a notification may be generated instructing the use to upload a number of images sufficient to make up the difference.

The subject matter may optionally be added to the blacklist at block 2114 as similarly discussed above. The blacklist may then be used to selectively reject end user-provided content that includes the subject matter, to prevent the end user content from being used to customize a template or template slot, as similarly discussed elsewhere herein.

Optionally, if end user-provided content is rejected (whether after a real time or batch mode analysis), the end user may be offered the option to obtain a non-customized version of the item (e.g., via an app notification, webpage notification, email, text/mms short messaging service message, or otherwise) or an alternative to the item (e.g., a limited edition version of the item with rare content printed thereon). A control may be provided that enables the end user to confirm that the end user wants the non-customized version of the item or limited edition version of the item. In response to the end user activating the control, the corresponding item may be manufactured and delivered to the end user. The notification may include an image of the non-customized item and/or the reason(s) the user's customization was rejected. Optionally, the notification may include a link to the customization user interface via which, when activated, the end user may attempt to customize the item again, in a manner that complies with the corresponding rules/permissions.

Optionally, when end user content is rejected, a corresponding ticket is opened and stored in memory, where the ticket records information regarding the end user order, content, and the reason(s) the content was rejected. Optionally, in addition to or instead of certain other notification features discussed above, a notification may include a link to the ticket, which when activated, causes the ticket record to be accessed, where some or all of the ticket data is presented to the end user via the end user device. A communication interface may be provided (e.g., a chat interface, a text messaging interface, an email interface, a VoIP interface) via which the end user may discuss the reasons for rejection with support personnel or a support chat bot (e.g., argue that the end user-provided content is appropriate and should not be rejected or ask for more details regarding the rejection). Optionally an interface may be provided via which the end user may submit one or more candidate content items to be used for customization, and ask that the candidate content items be reviewed and that an approval or rejection notification be provided to the end user.

An example item customization process will now be described. A user (e.g., an end user) selection of item from a catalog of items is received over a network (e.g., at a computer aided design system via a network interface) from a user device. The item may be a product (e.g., a t-shirt, jacket, backpack, cup, phone cover, laptop cover, or other product) or the item may be a digital item (e.g., a sticker or gif useable in an electronic communication, such as an SMS/MMS or email message). The user selection may be made via a dedicated application configured to enable items to be customized or via a website hosting item customization user interfaces.

Associated pre-defined design elements (e.g., default design elements specified as part of a template as described herein) are identified for respective slots/design areas on the product or other item. Optionally, a set of design elements may be associated with a slot, where one design element is designated as a default design element, which the user may swap with other design elements in the set of design elements if swapping is enabled. In addition, an identification of user-customizable design slots may be received. The selected item and the default design element may be displayed via a design customization user interface.

An image of the item may be rendered on the user device, including the default design elements positioned in corresponding template slots. Optionally, user-customizable design slots may be identified using an outline, color, flash of light, animation (e.g., a wiggling slot outline), and/or otherwise.

Customization rules for the template as a whole and/or for individual template slots may be accessed from memory. Examples of customization rules are described elsewhere herein, but may include, without limitation, rules specifying that a user self-portrait may be used to customize a user customizable slot, but that the faces of classed of people (e.g., celebrities, sports figures, and/or politicians) or individually specified people and/or objects cannot be so used to customize a user customizable slot. By way of further example, customization rules may specify permitted text and image alignments (e.g., left, right, center (vertically and/or horizontally).

In response to the user activating the customizable control for a given slot, the user interface may be re-rendered to display, for that slot, corresponding moderation controls, auto-cropping controls, automatic background removal control, and a fit image to container control. The moderation, auto-cropping, automatic background removal, and/or fit to container may be optionally implemented using techniques, systems, and processes described in U.S. application Ser. No. 16/690,029, filed Nov. 20, 2019, titled COMPUTER AIDED SYSTEMS AND METHODS FOR CREATING CUSTOM PRODUCTS, the contents of which are incorporated herein in their entirety In this example, the moderation controls may include a moderation stage control and moderation type controls. For example, the moderation stage control enables the user to specify at what stage the moderation is to be performed (e.g., no moderation; when the end user activates a save control to save the end user's customization of the item; when the end user submits a user content asset for a slot, but before the user interface renders the user content asset in the slot; after the user interface renders the user content asset in the slot, but before the end user adds the item being customized to a shopping cart; after the end user adds the item being customized to a shopping cart, but before the end user begins a checkout process; after the end user begins the checkout process, but before the order is accepted; after the order is accepted, but before the end user-provided content asset is printed on the physical item; and/or at other stages). Optionally, a control may be provided that enables the moderation stage to be dynamically modified in real time based on one or more criteria such as network bandwidth utilization, processing resources utilization, image size of a user-provided image, and/or other criteria. Examples of such dynamic modification of moderation stages are described elsewhere herein.

The moderation controls may include a menu of permitted and/or prohibited subject-matter types of user-provided content assets. For example, a list (which may be in the form of a table or a drop down menu) of subject-matter types may be presented via which the administrative user select (e.g., medium single person image (SPI), full body SPI, celebrities, logos, drug paraphernalia, alcohol, cigarettes, public photo (found on social networking source or search engine), other examples described herein, etc.) to thereby indicate if the subject matter is permitted or prohibited.

In addition, moderation specification controls may be provided. A moderation stage control enables the user to specify when moderation of an end user-provided content item is to be performed (e.g., no moderation; in real time, while the end user is modifying the slot; when the end user activates a save control to save the end user's customization of the item; when the end user submits a user content asset for a slot, but before the user interface renders the user content asset in the slot; after the user interface renders the user content asset in the slot, but before the end user adds the item being customized to a shopping cart; after the end user adds the item being customized to a shopping cart, but before the end user begins a checkout process; after the end user begins the checkout process, but before the order is accepted; after the order is accepted, but before the end user-provided content asset is printed on the physical item; and/or at other stages).

A moderation settings interface enables the user to select a preset set of moderation settings (e.g., from a menu of presets. A custom moderation interface enables the user to specify custom moderation functions. Examples of such custom moderation functions include select medium single person image (SPI), full body SPI, celebrities, public photo (found on social networking source or search engine), marijuana, alcohol, electronic cigarettes, nudity, offensive symbols, violence, offensive text, weapons, artificial text, illustration, other examples described herein, etc. Optionally, a control may be provided in the template definition user interface via which the user can edit an existing preset set of moderation settings or create a new preset set of moderation settings.

Optionally, when a user selects a template (which may have multiple customizable slots), or an item associated with a template, the template may be displayed, with corresponding slots optionally populated with default design elements. One of the editable slots may be automatically highlighted as ready to customize, and a collection of design elements associated with the editable slots may be automatically displayed, prompting the user to select from among the collection to customize the editable slot. Optionally, an entity whose design elements are being used to customize the editable slot and/or other template slot may specify, via a corresponding user interface, which editable slot is to automatically highlighted as ready to customize.

Figure 19:
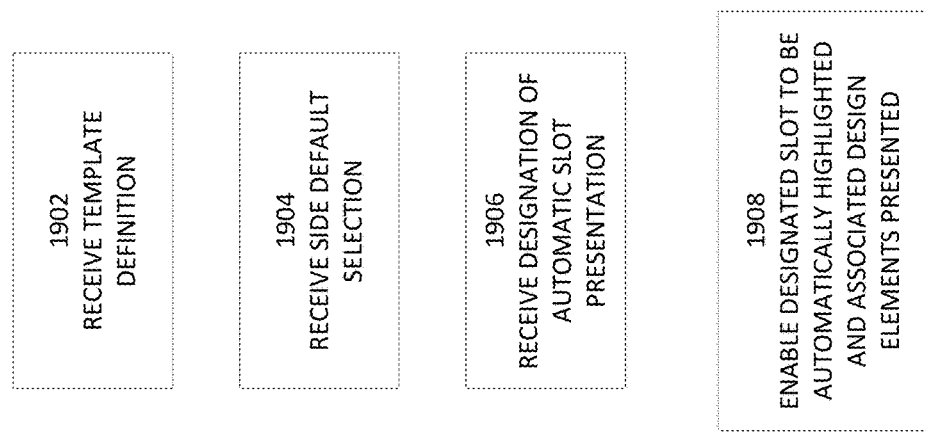

Referring now to FIG. 19, an example process of the automatic slot election is described. At block 1902, a template definition is received as similarly described elsewhere herein. For example, the template definition may optionally be received via a user interface, one or more template slots may be specified, and one or more collections of design elements may be associated with a given slot (where a user may be enabled to select a design element from an associated collection to populate the slot), and a default design element may be designated to populate the slot.

At block 1904, if a template has slots for two or more sides corresponding to two or more sides of an item that may be customized (e.g., the front and back of a t-shirt or other garment), a side default selection may be received via a corresponding user interface control. The side default selection may designate which side of the item will be initially displayed to an end user (e.g., via an online catalog or item customization interface). At block 1906, a designation may be received via a corresponding user interface as to which slot will be initially emphasized to an end user and/or which collections(s) will be initially displayed to the end user (where multiple or all items from the collection(s) associated with the designated slot may be displayed).

At block 1908, in response to an end user accessing a catalog or other customization interface for an item being customized using the template (or for the template itself), the slot designed at block 1906 may be emphasized (e.g., via a slot border, via a blinking default design element positioned at the slot, via text, and/or otherwise), and corresponding design elements from one or more associated collections may be displayed. The end user may then optionally select a design element from the displayed design elements, and the selected design element may be displayed in the slot. The resulting template may then be used to customize an item as discussed elsewhere herein.

As similarly discussed above, templates, including image templates, text templates, and templates that include both image(s) and text may be presented by the CAD system to an end-user to provide the end-user with a starting point for customization of an object, thereby simplifying the customization process. A given template may include one or more design areas, sometimes referred to herein as slots. The template may optionally include non-removable or non-editable design elements, and/or removable or editable design elements in respective slots. A template, by way of example, may include text, a digital sticker (e.g., a licensed cartoon character image), a logo, an image of a person (e.g., images of the user, an athlete, a team, performers, and/or the like), a graphic (e.g., a tournament/match bracket, graphics/images of sport paraphernalia (e.g., sport clothing, sports equipment (e.g., basketball, baseball, football, soccer ball, hockey puck, basketball hoop, basketball net, football goal post, hockey goal, baseball bat, hockey stick), team names, team logos, league names, league logos, and/or the like), etc. A template may be editable by the end-user in accordance with item provider and/or template provider restrictions.

A template may be associated with rules that may automatically propagate user template edits or selection to other slots and/or design elements of the template and where the template may be associated with rules that may prevent user modifications of the template that would be incompatible with what a design element corresponds to.

For example, if a user enters text or causes text to be entered into a template field (e.g., the name of a sports team), a color of another design element (e.g., a basketball) may be automatically changed to match the sports team's color. By way of further example, if the template includes a tournament/match bracket where the user may select a winning team in one round, a rule may be prevent the user from inserting the losing team at a later round. By way of further example, if a match has already taken place and the template is prepopulated with the match winner at the corresponding bracket branch, the user may be inhibited from changing the match winner.

By way of yet further example, a rule may be defined which links a design element to one or more item (e.g., garment) colors. The link may be a negative link (e.g., specifying that a design element color may not be used with specified item colors) or a positive link (e.g., specifying that a design element color must always be used with a specified item color.

By way of further example, with respect to entertainment applications, if a user selects from a gallery of images an image of an actor in or host of a show, the name of the show and/or show logos may automatically populate corresponding template slots. By way of yet further example, if a user selects, with respect to a template slot, an image of a movie or show character from a gallery of character images, other slots may be populated with images of other characters from the show or movie.

A user interface may be provided via which an item provider may specify which colors in a given image can or cannot be changed. By way of further example, a user interface may be provided via which an item provider may specify which portions of an image may or may not be edited. By way of still further example, a user interface may be provided via which an item provider may specify design element size change restrictions (e.g., a maximum and/or a minimum height or width), restrict adding one or more specified colors to a design element, restrict changes to design element orientation (e.g., maximum and/or minimum rotation angle), restrict changes to text content (e.g., prevent changes to one or more words in a text design element), restrict changes to a design template height/width ratio, restrict changes to one or more fonts, restrict the use of one or more effects (e.g., text curvature effects, 3D effects, etc.), and/or the like. By way of yet further example, a user interface may be provided via which a user may specify placement/movement restrictions for templates, images and/or text.

By way of further example, a user interface may be provided via which a user may specify that certain text and/or image notifications (e.g., copyright notices, trademark notices) or logos may not be removed and/or altered. By way of additional example, a user interface may be provided via which a user may specify that the certain design elements may not be used together to customize an object. By way of further example, a user interface may be provided via which a user may specify that the certain types of design elements (e.g., images of alcohol, drugs, drug paraphernalia, religious symbols, celebrities, etc.) may not be used to customize an object.

By way of yet further example, a user interface may be provided via which a user may specify propagation rules, wherein if a user selects, enters, or modifies a given design element, other template design elements may automatically be replaced or modified accordingly.

For example, as described elsewhere herein, a template may include a tournament bracket that may be customizable by a user. The tournament bracket may correspond to a multi-stage sports, game show, talent competition, or other tournament, where the top or winning participants (e.g., sports teams or individuals) of one stage progress to the next stage, while the losing participants may be eliminated from further play in the tournament. A tournament may be an elimination tournament (e.g., a single elimination tournament, a double elimination tournament, etc.). By way of illustrative example, the user may, via a corresponding user interface, customize a bracket by selecting winners of each stage of the competition, and where the identifiers associated with the winners (e.g., a team name, nickname, logo, image of a team player, and/or the like) will be respectively displayed on corresponding branches of the bracket.

By way of illustration, the NCAA (National Collegiate Athletic Association) Division I men's basketball tournament is a single-elimination tournament of 68 teams that compete in seven rounds for the national championship. The penultimate round, with only four teams remaining, is commonly referred as the Final Four. The stage at which there are only eight teams remaining is often referred to as the Elite 8, and the stage at which there are only sixteen teams remaining is often referred to as the Sweet 16.

The teams that participate in the tournament include automatic qualifiers (where the 32 Division I conferences all receive an automatic bid, which they each award to the team that wins the corresponding postseason conference tournament) and at-large bids (where a selection committee selects 36 teams that are not automatic qualifiers to be invited to participate in the tournament). The 68 teams are divided into four regions and organized into a single-elimination "bracket", which pre-determines, when a team wins a game, which team it will face next. Each team is "seeded", or ranked, within its region from 1 to 16. Teams, seeded by rank, proceed through a single-game elimination bracket beginning with a "first four" consisting of 8 low-seeded teams playing in 4 games for a position in the first round before the first round begins, a first round consisting of 64 teams playing in 32 games, then the second round of 32 teams in 16 games, followed by 16 teams in 8 games (the "Sweet 16"), following by 8 teams in 4 games (the "Elite 8"), the "Final Four" round, with one from each region (East, South, Midwest, and West), and then the national championship game with the two winners of the Final Four.

The tournament and its progression may be represented by a graphic, known as a bracket which may be in the form of a tree diagram that represents the series of games. In the NCAA basketball tournament, the bracket is a horizontal tree-like grid of all the teams in the tournament and the path the teams have to follow to be in the Sweet 16, Elite 8, and Final Four, and in the final game (the championship game). The outermost bracket is optionally filled using the seeding of the 64 teams. Fans enjoy filling out the remainder of the bracket using their predictions as to which team will win each game at each stage. However, given the complex number of possible permutations, no one has successfully filled out a perfect bracket.

Certain aspects of the disclosure will now be discussed with reference to the figures.

An example system architecture that may be utilized to provide computer aided design and manufacturing services will now be discussed with reference to FIG. 1A. The various systems and devices may communicate with each other over one or wired and/or wireless networks 114. In the illustrated embodiment, a computer aided design (CAD) system 102 may be hosted on one or more servers. The CAD system 102 may be cloud-based and may be accessed by one or more clients 110, 112 (e.g., associated with an item provider or end user) over a network 114 (e.g., the Internet, Ethernet, or other wide area or local area network). Client terminals 110, 112 may be able to share software applications, computing resources, and data storage provided by the CAD system 102.

The client terminals may be in the form of a desktop computer, laptop computer, tablet computer, mobile phone, smart television, dedicated CAD terminal, or other computing device. A client terminal may include user input and output devices, such a displays (touch or non-touch displays), speakers, microphones, trackpads, mice, pen input, printers, haptic feedback devices, cameras, and the like. A client terminal may include wireless and/or wired network interfaces via which the client terminal may communicate with the CAD system 102 over one or more networks. A client terminal may optionally include a local data store that may store CAD designs which may also be stored on, and synchronized with, a cloud data store.

User interfaces described herein are optionally configured to present user edits or customizations (e.g., edits to images, text, item colors, or the like) in real time as applied to an item image to thereby ensure enhanced accuracy, reduce the possibility of user error, and so make the customization process more efficient. The user interfaces may present controls and renderings to further ease the specification of customization permissions by item providers, and to ease customizations of items by end users.

Optionally, a version of the user interfaces described herein may be enhanced for use with a small screen (e.g., 4 to 8 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger). For example, if a user touches an image template in a template gallery, it may be inferred that the user wants to add the image template to a previously selected item design area and to then edit the image template, and so the selected image template may be automatically rendered in real time on the selected item design area on a model/image of a product in association with permitted edit tools.

Further, optionally user interfaces described herein may enable a user to expand or shrink a design element using a multi-touch zoom gesture (where the user touches the screen with two fingers and moves the fingers apart) or a multi-touch pinch gesture (where the user touches the screen with two fingers and moves the fingers together) to further ease editing of a design element and ease specification of a design area or editing restrictions. Optionally, a user interface may enable a user to resize a design element using a one finger icon drag/pull.

Optionally, a resizing control may be provided which enables the user to quickly resize a design element to an appropriate size. For example, if an existing design element is sized for a shirt pocket, the resizing control may enable the user to instruct the system to automatically resize the design element for another selected area, such as a chest area or a sleeve area.

Optionally, user interfaces may be configured to respond to a user swipe gesture (e.g., a left or a right swipe gesture using one or more fingers) by replacing a currently displayed design element (e.g., a template) on an item model with another design element (e.g., another template in a set of templates), sometimes referred to herein as performing a swapping operation. Optionally, if a user has edited a first design element and then used a swipe gesture to replace the design element with a second design element, some or all of the edits made to the first design element (e.g., height edit, width edit, color edit, or the like) may be automatically applied to the second design element.

Optionally, in response to a swipe gesture (e.g., an up or down swipe gesture) a user interface may display metadata related to the displayed item and/or item customizations (e.g., cost, shipping time, item size, etc.) or other notifications.

Optionally, in response to a gesture (e.g., an up/down or left/right swipe) the product on which the design element is displayed is changed. For example, if a design element is displayed on a model of a jacket, the gesture may cause the same design element (optionally with any user edits) to be displayed in real time on another item model (e.g., a t-shirt or a different jacket style) in place of the original jacket model.

When selecting a moveable design slot, or a moveable design element positioned in a slot, in order to swap the design element or change the design element color, it may disadvantageous to require a user to actually touch the moveable design slot, or the moveable design element positioned in a slot, as the user may inadvertently move the slot or design element. In order to enable the user to modify a design element in a slot (e.g., swap the design element for a different design element, change image properties of the design element (e.g., color, hue, saturation, and value, brightness, contrast, text), scale the size of the design element, etc.), without inadvertently moving the design element, each slot may be accessed via a slot menu presented adjacent to the template (e.g., below the template). The slot menu may enable the user to select a template slot, and an interface may be provided that enables the user swap or modify the design element for that the selected template slot. The modifications may be stored in memory. Any swaps or modifications made by the user may be automatically rendered on the template (reflecting the modifications stored in memory) without the user actually having touched the template slot or moved the slot or design element.

Optionally, to ensure that the user does not inadvertently move or modify a design element, touch selection and editing of the template itself may be disabled, and the user may be limited to performing design element and slot selection and edits using the slot menu and associated interfaces.

Optionally, the slot menu and related edit tools may be used to incorporate edit rules. For example, if a rule requires that the user select design elements for at least a first slot and a second slot, the system may monitor the user inputs and inhibit the user from ordering am item using the template until the system detects that the user has selected design elements (from a design element collection) or uploaded design elements for the first slot and the second slot.

The CAD system 102 may provide tools to graphically construct computer models of and to modify computer models of products such t-shirts, hoodies, shirts, jackets, dresses, pants, glasses, phone cases, laptop skins, backpacks, laptop cases, tablet cases, hairbands, wristbands, jewelry, and the like.

The CAD system 102 tools may include tools for specifying and/or applying design elements (e.g., text, image, and/or a graphic design elements) to a product, specify areas to which an end user may apply design elements, specify permitted end user modifications to a design element and/or specify permitted design element types and characteristics that the system may apply to the product in response to an end user request. Optionally, collaboration tools are provided that enable users (e.g., end users, or a graphic designer and an item provider) to collaborate with each other and/or the item provider on customizations for a given product.

The CAD system 102 may optionally generate, based on an end-user design or design modification, corresponding order forms and/or manufacturing instructions. Some or all of the information generated by the CAD system 102 may be provided to an inventory/ordering system 104, a manufacturing system 106, a packing/shipping system 108, and/or an analysis engine 118. Some are all of the foregoing systems may optionally be cloud based. Optionally, the CAD system 102, inventory/ordering system 104, manufacturing system 106, packing/shipping system 108, and/or analysis engine 118 may be the same system and may be operated by the same entity, or may be separate systems operated by separate entities.

Optionally some or all of the services provided by the CAD system 102, inventory/ordering system 104, manufacturing system 106, packing/shipping system 108, and/or analysis engine 118 may be accessed via one or more APIs by authorized third party systems. For example, a sports league or federation may provide access to the services (including some or all the user interfaces) to enable visitors of their website to use logos, team names, brackets, and images of players to customize physical and/or digital items. By way of further example, a third party CAD system used to customize physical and/or digital items may access the services to access restrictions and/or permissions (rules) specified for design elements that users of the third party CAD system are modifying or otherwise using. For example, the third party CAD system may generate a request for usage rules, where the request may identify the design element that a user wishes to use (e.g., customize, combine with other content, electronically distribute, print, etc.). The CAD system may generate a corresponding response to the query that includes usage rules. The third party CAD system may utilize the services to determine if a given modification or other use satisfies the rules.

The CAD system 102 may also enable conditional rules to be defined (e.g., if-then rules) that enable a user input/customization with respect to one design element in a slot to cause another slot to be customized in accordance with the conditional rules.

The CAD system 102 may optionally generate directives in the form of manufacturing machine instructions for applying (e.g., printing or embroidering). For example, design files may be provided that include an image file (e.g., in raster graphics file format, such as a portable network graphics file) and screenshots of the user customized item. Optionally the image file may support RGB color spaces and/or non-RGB color spaces (e.g., CMYK color spaces). Optionally, the image file may be in SVG, PDF, GIF, Encapsulated PostScript, AutoCAD DFX, or ADOBE ILLUSTRATOR format. Optionally, one or more files may be compressed (e.g., losslessly compressed) and transmitted to the manufacturing system 106 in the form of a zip file, jar file or other file format. The manufacturing system 106 may then decompress the file using an appropriate decompression module.

The inventory/ordering system 104 may receive and process an order for a customized item, generate prices for a customized item (e.g., based on a base item price, the number of customizations, and/or the type of customizations), maintain a user shopping cart, and generally interact with a user ordering an item and managing the ordering process. The inventory/ordering system 104, when receiving an order for a customized item customized using the CAD system 102, may determine if the item being designed/modified is in stock, and order items that are below a specified threshold (e.g., zero or some number greater than zero).

The packing/shipping system 108 may generate packing instructions to efficiently package the items being shipped to the user. For example, the instructions may specify package sizes and which items are to be shipped in which package. The packing/shipping system 108 may further generate shipping labels and/or other shipping documents.

One or more data source systems 103 may provide real time and/or non-real time data which may be accessed by the CAD system 102 via an API or otherwise. Such data may be utilized in populating and customizing templates as described elsewhere herein. For example, the data may include sports scores, player and team statistics, award show announcements, weather information, news data, and/or other data.

An analysis system 118 may be configured to analyze user modifications to design elements and/or user added or selected content (e.g., images and/or text) associated by the user with the design elements. The analysis system 118 may be configured to receive a query generated by the CAD system 102 that specifies one or more different feature types to be detected. The CAD system 102 may generate the query based at least in part on rules specified by a source of the design elements. The rules may indicate how a design element may be modified and what content may be used in conjunction with the design element (e.g., overlaying the design element, or directly to one side of the design element). The analysis system 118 may generate a likelihood indication/value as to whether a given feature type is present. The likelihood indication/value may be provided to the CAD system 102, which may determine, using such indication, whether or not the modification and/or associated user added or selected content may be used and/or shared by the user.

The analysis system 118 may utilize artificial intelligence and/or machine learning in performing text, image (e.g., using computer vision), and/or audio analysis to determine the likelihood that given a feature type is present (e.g., the presence of a face by performing face detection) and/or to perform face recognition. For example, the analysis system 118 may utilize a deep neural network (e.g., a convolutional deep neural network) and/or a matching engine in performing facial, image, text, and/or audio analysis.

For example, a deep convolutional neural network (CNN) model may be trained to identify matching faces from different photographs. The deep neural network may include an input layer, an output layer, and one or more levels of hidden layers between the input and output layers. The deep neural network may be configured as a feed forward network. The convolutional deep neural network may be configured with a shared-weights architecture and with translation invariance characteristics. The hidden layers may be configured as convolutional layers, pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

The CNN may be trained using image triplets. For example, an image triplet may include an anchor image, a positive image, and a negative image. The anchor image is of a person's face that has a known identity A. The positive image is another image of the face of person A. The negative image is an of a face of person B.

The CNN may compute feature vectors (sometimes referred to as "embeddings") that quantify a given face in a given image. For example, 128-d embeddings may be calculated (a list of 128 real-valued numbers that quantify a face) for each face in the triplet of images. The CNN weights may be adjusted using a triplet loss function such that the respective calculated embeddings of the anchor image and positive image lie closer together, while at the same time, the calculated embeddings for the negative image lie father away from those of the anchor and positive images.

For example, the triplet loss function may be defined as:

$$Loss = \max(d(a,p) - d(a,n) + \text{margin}, 0)$$

Where the loss is minimized, thereby causing d(a,p) to be pushed towards zero, and to be greater than (d(a,p)+margin; and were the margin is the desired distance between the negative image embeddings and those of the anchor and positive images.

Optionally, instead of triplet loss function, a softmax cross entropy loss function may be used to adjust weights.

Using the foregoing techniques, the CNN may be trained to quantify faces and return highly discriminating embeddings that enable accurate face recognition.

A CNN may likewise be trained and used to identify and classify objects and/or text, other than faces, such as the example prohibited and/or required design elements discussed herein, or in order to provide item, template, and/or design element recommendations to a user (e.g., based in part on objects in images uploaded by the user in customizing items).

Thus, the CNN (or other artificial intelligence engine, including trainable artificial intelligence engines) may be utilized to determine whether user-provided images, text, or other design element content satisfy customization rules, and if so, may approve the utilization of such user-provided content in customizing a product. Optionally, if the CNN approves the user-provided content, the user-provided content may be presented to a human for human review and approval (e.g., via an approval user interface) prior to printing the product with the user-provided content. A confidence score associated the CNN evaluation/classifications may be generated and presented to the human reviewer.

Figure 1B:
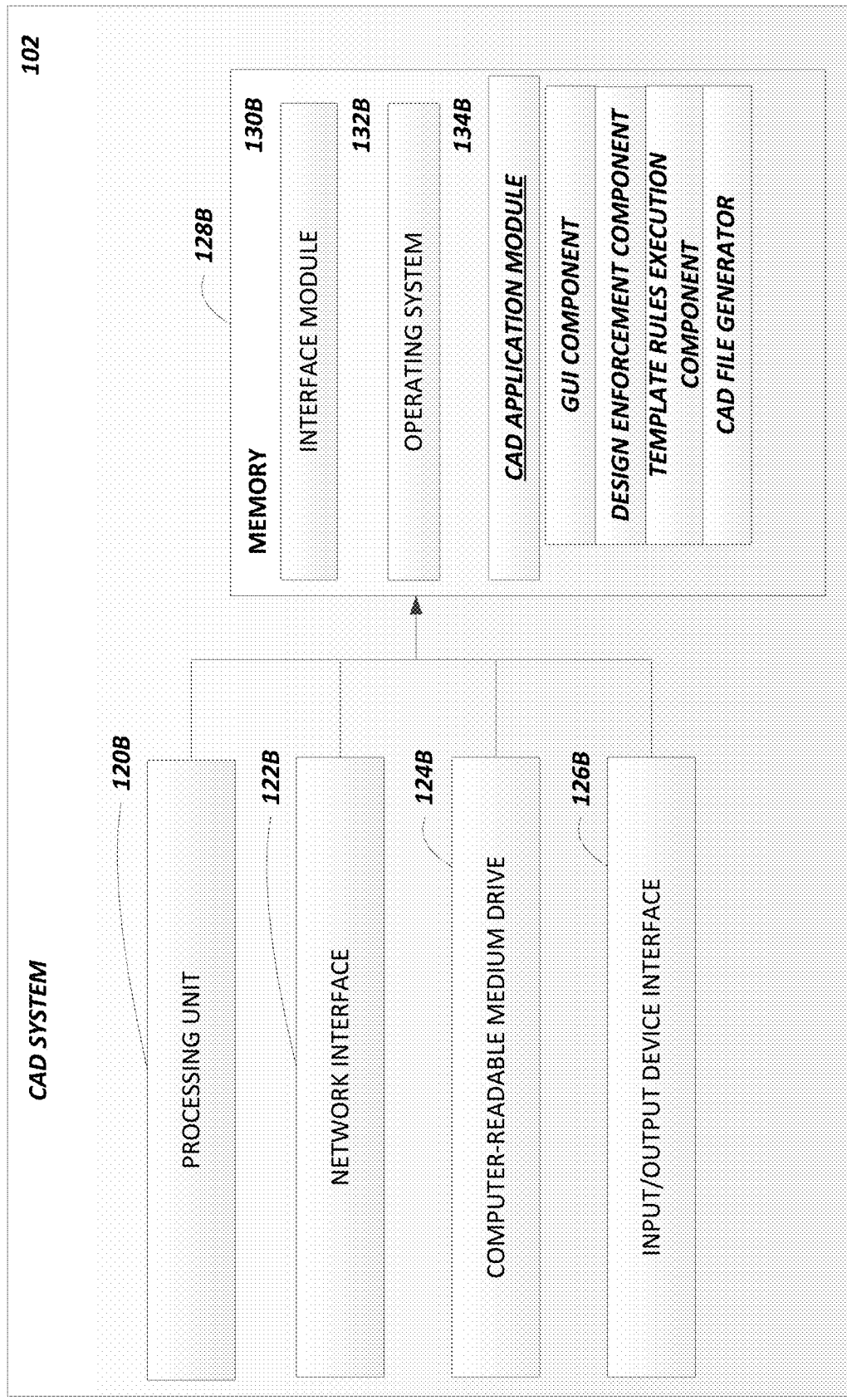
FIG. 1B is a block diagram illustrating an embodiment of example components of a computer aided design (CAD) computing system capable of providing product customization services.

FIG. 1B is a block diagram illustrating an embodiment of example components of the CAD system 102. The example CAD system 102 includes an arrangement of computer hardware and software components that may be used to implement aspects of the present disclosure. Those skilled in the art will appreciate that the example components may include more (or fewer) components than those depicted in FIG. 1B.

The CAD system 102 may include one or more processing units 120B (e.g., a general purpose process and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide the CAD services with connectivity to one or more networks or computing systems. The processing unit 120B may thus receive information and instructions from other computing devices, systems, or services via a network. The processing unit 120B may also communicate to and from memory 12B4 and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of the CAD application module 134B, including it components. The memory 128B may store user accounts, including copies of a user's intellectual property assets (e.g., logos, brand names, photographs, graphics, animations, videos, sound files, stickers, tag lines, etc.) and groupings thereof (with associated group names). Optionally, in addition or instead, the intellectual property assets are stored remotely on a cloud based or other networked data store.

The copies of the intellectual property assets and captured images may optionally be stored in a relational database, an SQL database, a NOSQL database, or other database type. Because the assets may include BLOBs (binary large objects), such as videos and large images, which are difficult for conventional database to handle, some (e.g., BLOBs) or all of the assets may be stored in files and corresponding references may be stored in the database. The CAD application module components may include a GUI component that generates graphical user interfaces and processes user inputs, and a design enforcement component to ensure that user designs do not violate respective permissions/restrictions.

A template rules execution component is utilized to execute rules associated with a template. For example, a rule may specify how to propagate user template edits to one design elements to other design elements of the template. By way of further example, a template rule may specify that if a user makes a first type of edit to a first template design element, the user may be prevented from making certain edits to other template design elements (e.g., edits that would be logically incompatible with the edit to the first design element). A rule may be defined using if-then statements comprising Boolean condition (including a variable and an operator, such as equal, not-equal, greater then, less then, etc.)) and a consequent.

A CAD file generator may be configured to generate data files for an inputted user design, and/or an image generator that generates image data files for printing and/or sewing/embroidering machines.

The printing machines may utilize, by way of example, 3D additive printing, heat transfer vinyl, screen printing, direct to garment printing, sublimation printing, and/or transfer printing to print design elements on an item. By way of further example, embroidery machines may be used to embroider design elements on an item. The memory 128B may further include other information for implementing aspects of the present disclosure.

The memory 128B may include an interface module 130B. The interface module 130B can be configured to facilitate generating one or more interfaces through which a compatible computing device, may send to, or receive from, the CAD application module 134B data and designs.

The modules or components described above may also include additional modules or may be implemented by computing devices that may not be depicted in FIGS. 1A and 1B. For example, although the interface module 130B and the CAD application module 134B are identified in FIG. 1B as single modules, the modules may be implemented by two or more modules and in a distributed manner. By way of further example, the processing unit 120B may include a general purpose processor and a graphics processing unit (GPU). The CAD system 104 may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the CAD system 102 and their components can be implemented by network servers, application servers, cloud-base systems, database servers, combinations of the same, or the like, configured to facilitate data transmission to and from data stores, client terminals, and third party systems via one or more networks. Accordingly, the depictions of the modules are illustrative in nature.

Figure 2A:
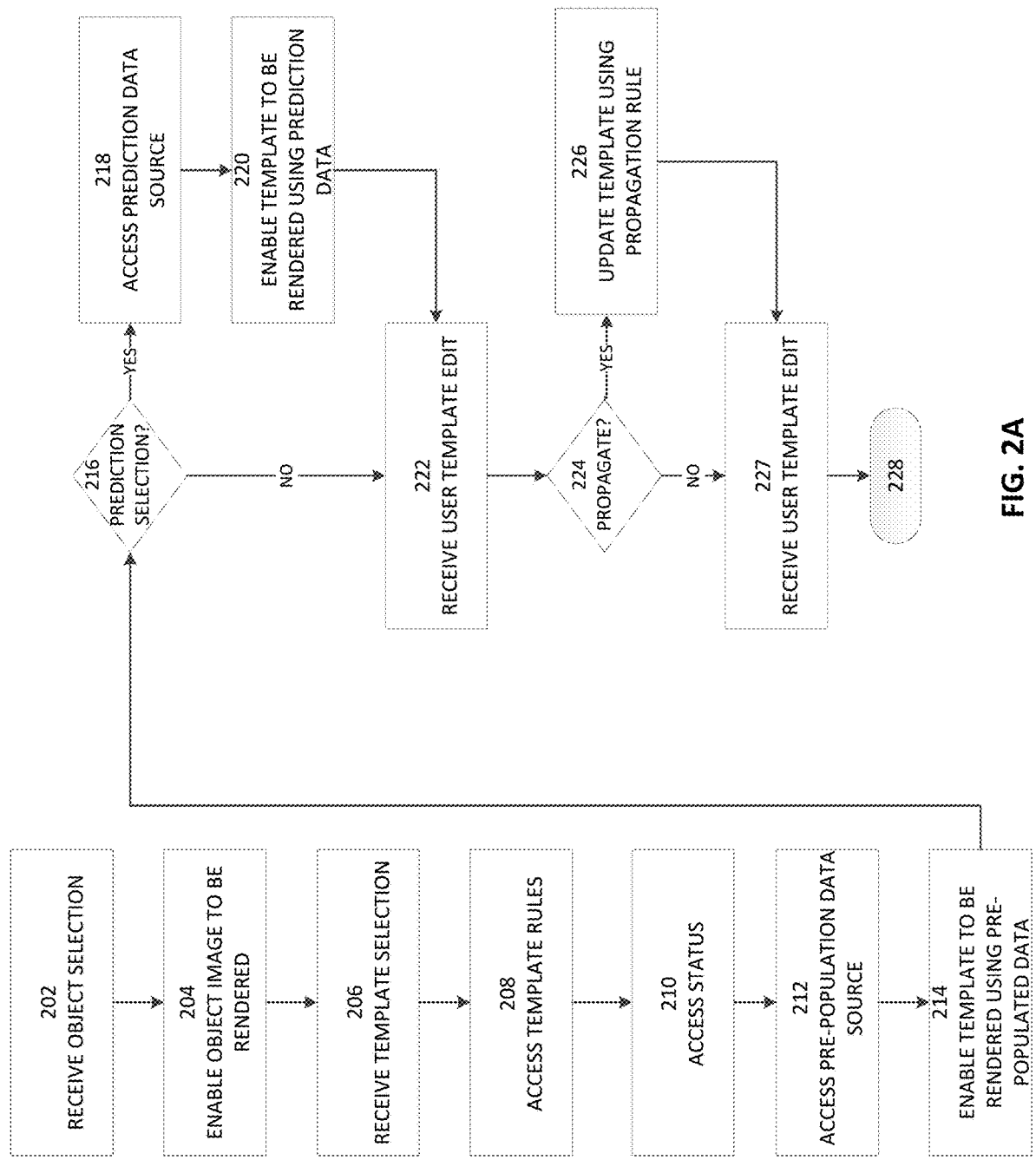
FIGS. 2A-2B illustrate an example process.
Figure 2B:
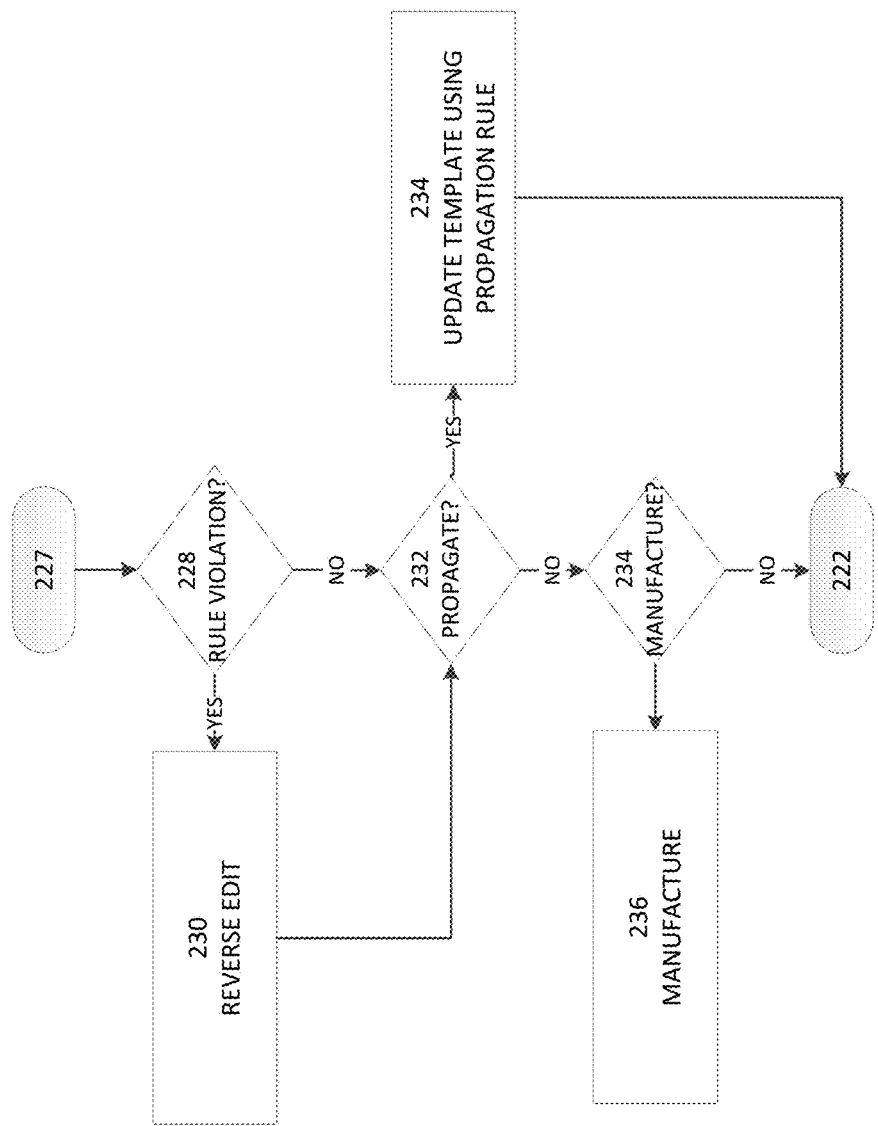

FIGS. 2A-2B illustrate example operations that may be performed with respect to an end user in customizing an item using a template associated with template rules. In this example, the template relates to a tournament, such as the NCAA Division I men's basketball tournament, but the process may similarly be used with respect to other types of templates and template rules.

At block 202, an interactive item selection interface may be enabled to be rendered on a user device (e.g., via a browser or dedicated application). The interactive item selection interface may display or provide access to a catalog of items and a user item selection is received via the interactive item selection interface. At block 204, a computer aided design (CAD) user interface is enabled to be rendered on the user device. For example, the CAD user interface may display an image of the item selected by a user and a menu of available templates.

By way of illustration, the menu of available templates may include templates that include tournament brackets (e.g., brackets for professional, college, or high school basketball tournaments, football tournaments, hockey tournaments, baseball tournaments, tennis tournaments, and/or the like), and associated design elements. For example, the design elements associated with a bracket may include one or more tournament logos, one or more versions of basketballs for a basketball tournament bracket, one or more versions of basketball hoops for a basketball tournament bracket, one or more versions of hockey pucks for a hockey tournament bracket, one or more versions of basketball nets for a basketball tournament bracket, one or more versions of baseballs for a baseball tournament bracket, one or more versions of baseball bats for a baseball tournament bracket, one or more versions of footballs for a football tournament bracket, one or more versions of football goal posts for a football tournament bracket, one or more versions of soccer balls for a soccer tournament bracket, one or more versions of hockey goals for a hockey tournament bracket, one or more versions of hockey sticks for a hockey tournament bracket, and/or the like.

At block 206, a user template selection may be received. In this example, it will be assumed that the user has selected a template comprising a tournament bracket and/or one or more related design elements (e.g., a basketball tournament bracket, a tournament logo, a basketball, and a basketball net, and/or a gallery of content that the user may select from (which may include design elements, such as text, team logos, tournament brackets (e.g., for one or more tournaments, band logos, etc.).

At block 208, rules associated with the template may be accessed from memory. For example, the rules may specify propagation rules, wherein if a user selects, enters, or modifies a given design element, other template design elements may automatically be added, replaced, or modified accordingly. By way of further example, the rules may include a rule that prohibits user modifications of the template that would be incompatible with what a design element corresponds to. For example, if the template includes a tournament/match bracket where the user may select, from a match between a first team and a second team, the first team as a winner in one round, a rule may be prevent the user from inserting the losing second team as a participant at a later round. By way of further example, if a match has already taken place and the template is prepopulated with the match winner at the corresponding bracket branch, the user may be inhibited from changing the match winner.

The template/tournament bracket may be associated with a locator (e.g., a URL or file path) for accessing the current tournament status. For example, the tournament status may be accessed, at block 210, from a tournament organizer website, a news website, a local data store, or otherwise (e.g., using an API, where the status may be accessed in JSON, XML, and/or CSV formats). By way of illustration, the status may be "not yet seeded," "seeded but no games played," first round played, second round played, etc.

Optionally, if the status is "not yet seeded," a corresponding notification may be provided to the user and optionally, the user may be inhibited from using and/or customizing the template for use in customizing a product.

At block 212, the bracket may be prepopulated in part or in whole with default data accessed from a source, optionally, based at least in part on the tournament status. For example, if the status is "seeded but no games played," the bracket seeding may be accessed from tournament organizer website (e.g., the NCAA website for a college tournament). By way of further example, if the status is "seeded but no games played," the outmost branches of the bracket may be prepopulated using the bracket seeds (e.g., accessed from the tournament organizer, news, or other website) the NCAA website for a college tournament), and the remainder of the bracket branches may be left blank (e.g., for the user to customize using user predictions).

At block 214, the pre-populated template (e.g., bracket and related design elements) may be rendered on the user device. For example, if the template includes a tournament bracket, the bracket may be pre-populated with the names and/or logos associated with the teams participating in the tournament.

At block 216, with respect to tournament rounds that have not yet occurred, a user interface may be presented via which the user may optionally select a source (e.g., a news source, a blog, etc.) for populating predictions from the source to populate some or all of the tournament bracket, where the user may then edit the populated values. If the user indicates that the user wants to populate the template using prediction data for a selected source, at block 218, the selected predication source is accessed (e.g., over a network). At block 220, the template may be rendered in a user interface on the user device using the actual tournament data (e.g., for tournament rounds that have taken place) and predicted tournament data.

At block 222, user template edits (which may be in the form of user selections) may be received from the user device via the user interface. For example, the user may select a winner of a match (e.g., by touching or clicking on an identifier associated with a match participant) in order to populate the next bracket round. At block 224, a determination may be made as to whether there is a propagation rule associated with the user edits. If there is a propagation rule, at block 226, the template may be updated in accordance with the propagation rule. For example, if the user selects a winning team for a match, a color of another design element (e.g., the corresponding bracket branch) may be automatically changed to match the sports team's color.

At block 227, a further user template edit may be received. For example, the edit may be a user specification of a tournament match round to a later round than the round associated with the previous user edit. At block 228, a determination may be made as to whether the user edits violates a rule. For example, if the template includes a tournament/match bracket where the user may select, a first team as a winner in one round, a rule may be prevent the user from inserting the losing second team as a participant at a later round. Thus, at block 228, if the process detects that the user has selected a team, that was eliminated from the tournament (e.g., as a result of losing a match), as a winner at a later round, a determination may be made that a rule violation occurred. By way of further example, if a determination is made that the user has changed a winner of a match that has already occurred, a determination may be made that a rule violation occurred. Optionally, edit tools may instead be disabled where any edit would violate a rule.

If a rule violation occurred, at block 230, the user edit may be automatically reversed and a notification of the rule violation may be presented to the user.

If the user activates an order/manufacturing control, at block 236 (and optionally in response to a determination that the customizations comply with design rules), the item may be accordingly customized and provided to the user.

For example, one or more files including the object data and/or the customization data may be transmitted over a network to printing machine for printing. The customized template design elements may be printed or embroidered on the item. For example, the printer may use heat transfer vinyl, screen printing, direct to garment printing, sublimation printing, and/or transfer printing. By way of further example, the printer may be a 3D printer that prints the customized item.

Figure 3A:
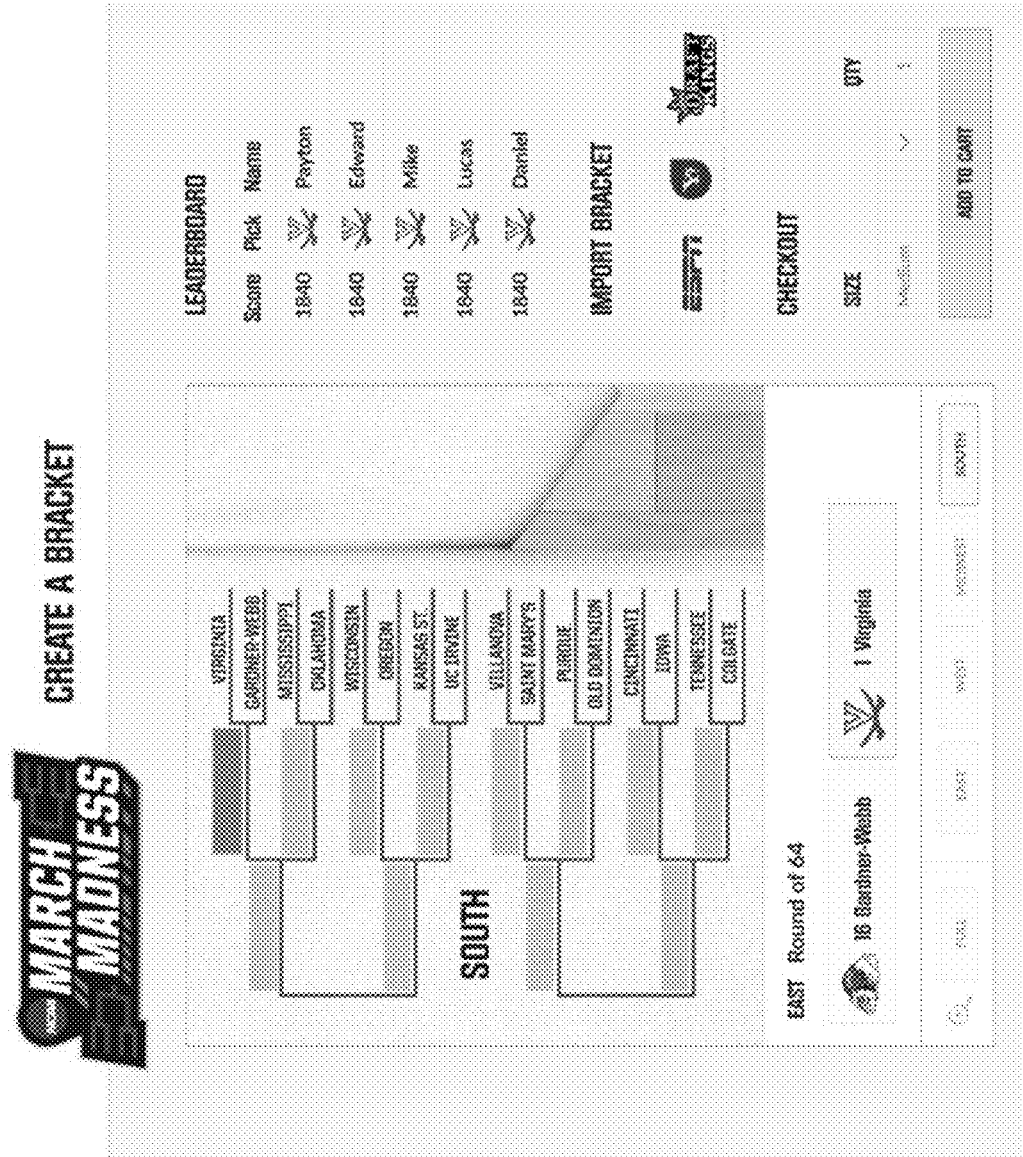

FIG. 3A illustrates an example portion of a template for a sports tournament. The example template includes a bracket and a tournament logo. In this example, only a portion of the bracket is displayed (for a southern conference). Conference controls (East, West, Midwest, South) are provided that, when activated causes the user interface to display a zoomed portion of the bracket corresponding to the selected conference. A full control is provided that when activated cause the user interface to zoom out to show the entire bracket. Thus, the foregoing user interface enable a use to efficiently navigate and edit even a complex, detailed template on a relatively small display device (e.g., a phone with a touch display in the range of 4-7 inches in the diagonal).

Descriptive text is automatically updated to indicate the conference corresponding to the displayed portion of the bracket, and the accessed tournament status (e.g., round of 64, round of 32, Sweet 16, Elite 8, Final 4, Championship). The user interface may automatically select a match or the user may select a match via the bracket (e.g., by touching a corresponding bracket branch). Identifiers (e.g., team name and/or logo) corresponding to the teams participating in the selected match may be automatically be presented in a match field, optionally in association with the seeding/ranking of each team. An import menu interface may be provided via which the user can import bracket match predictions, which may be used to populate the bracket.

The system may analyze the accuracy of predictions of different users with respect to predicted match winners. The system analysis may be used to generate a leaderboard with identifiers of the top predictors (e.g., the top 5, top 10, or top 20 predictors) in association with the prediction accuracy scores, and winner predictions.

A size control may be provided via which the user can select a size (e.g., small, medium, large, extra-large, extra-extra-large, etc.) of the object (e.g., hoody, t-shirt, bag, etc.) being customized. A quantity control may be provided via which the user can specify a quantity of the object being ordered. An add to cart control may be provided which, when activated, causes the object to be added to an electronic shopping cart, with an association to the selected object size, quantity, selected template, and user template customization. A checkout control may be provided, which when activated, enables a purchase process to be initiated via which the user can purchase the customized object. Once the order is completed, the object may then be customized using the user template customization as described elsewhere herein.

Figure 3B:
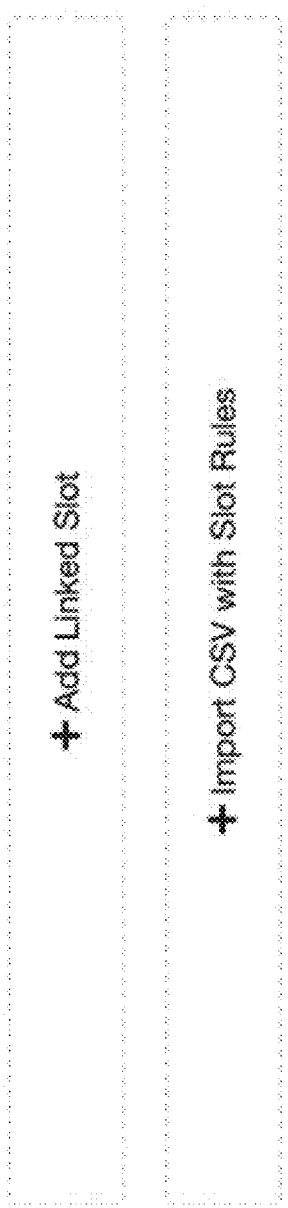

FIG. 3B illustrates an interface that includes a link to an "add linked slot" control and an "import CSV with slot rules" control. User activation of the "add linked slot" control may cause the user interface illustrated in FIG. 3C to be presented, which, as will be described, enables the user to define rules (e.g., conditional statements, such as if-then rules) associated with one or more slots of a template. User activation of the "import CSV with slot rules" control may cause the user interface illustrated in FIG. 3E to be presented, which, as will be described, enables the user to import slot rules in the form of a CSV (comma separated values) file (e.g., generated using a spreadsheet or other application).

Figure 3C:
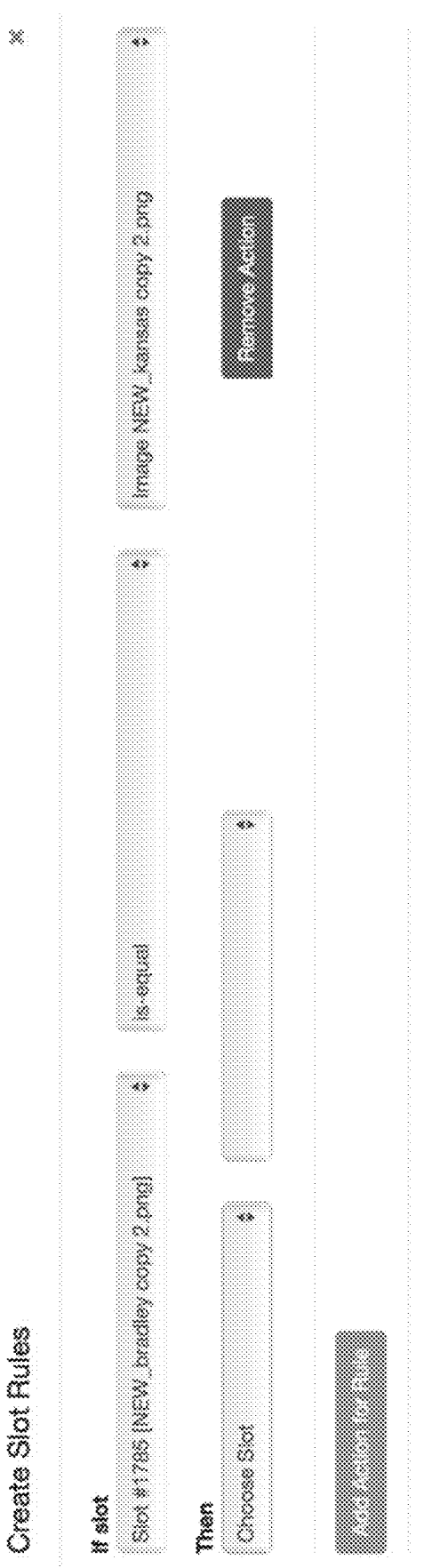

FIG. 3C illustrates an example rule definition user interface. For example, the rule definition user interface may enable a conditional statement, such as an if-then statement comprising an in "if" portion (e.g., Boolean condition (including a variable and an operator, such as equal, not-equal, greater then, less then, etc.)) and a "then" portion (a consequent). Interfaces may be provided via which the user can specify rule triggers (e.g., "If" statement). For example, a slot control is provided which when the user can specify from a menu of slots for which tournament bracket slot/match the rule is to be associated with. An operator control may be provided via which the user can specify a rule operator (e.g., equal, not equal, etc.) from a menu of operators. An asset interface is provided via which the user can specify an asset (e.g., a team name) from a menu of assets.

Interfaces maybe provided via which the user can specify what action (e.g., a "then" consequent statement) is to be taken in response to the "if" conditional statement being satisfied. For example, a slot control is provided which when the user can specify from a menu of slots for which tournament bracket slot/match the rule action is to be associated with. An operator control may be provided via which the user can specify a rule action operator (e.g., equal, not equal, greater than, or less than, etc.) from a menu of operators. For example, a rule may specify an "if" statement where if a given slot/bracket branch has a specified image, graphic or text, then another slot will be populated with a specified image or text, or a color of an image, graphic, or text may be changed to a specified, different color.

Optionally, a rule may be based on real time, real event data, such as a current score, an inning result at a baseball game, a halftime result at a football game, an announcement of a most valuable player designation, and or the like. The real time data may be accessed via an API over a network from one or more remote sources (e.g., a news feed, a sports feed, etc.) using one or more formats (e.g., JSON, XML, and/or CSV formats). Thus, a template may change in real time based on user modifications and/or real time external event data.

Optionally, a rule may include a chain of conditional and consequent statements (e.g., "if" and "then" statements). For example, a rule may specify:
If slot "A" has an asset=asset #1; and
If slot "B" has an asset≠asset #2; and
If value in Slot "F">20;
Then:
Slot "C"=asset #5; and
Color of asset in Slot "D"=blue.

For example, the value in slot "F" may correspond to a score from a tournament match.

Optionally, a rule may include an event type (e.g., a particular play) detected during a match (e.g., via a sports news feed). For example, a rule may specify for a baseball game:
If slot "A" has an asset=asset #1; and
If "triple play";
Then:
Slot "B"=asset #2; and
Color of asset in Slot "C"=gold.

Optionally, where the template relates to an award ceremony or a like, a rule may include an event type (e.g., a grant of an award to a performer, such as a singer, musical group, actor, etc.) detected during the ceremony. For example, a rule may specify for a musical award ceremony:
If slot "A" has an asset=asset #1; and
If best_new_artist award announced
Then:
Slot "B"=name_of_best_new_artist.

Example rules and templates need not be associated with a competition or tournament. Rules may involve such events as album releases, comments or a web blog, weather conditions (e.g., temperature), ski conditions (e.g., the number of inches of snow on the ground in a selected ski area), news event, etc.

A "remove action" control may be provided which when activated deletes the most recently added "then" statement for the corresponding rule, where the system may store time tags and/or sequence indicators indicating the sequence in which "then" actions were added. For example, if the user activates the remove action control once, the system may access the sequence indicators, identify the most recently added "then" action, and then delete the most recently added "then" action from the user interface and/or memory. If the user activates the remove action control twice, the two most recently added "then" actions may be removed, and so on. Optionally, the user may be prompted to confirm or cancel a remove instruction. Optionally, a remove all control may be provided, which if activated, may delete all the "then" actions for the rule.

An "add action for rule" control may be provided which when activated causes an additional action field (via which the user can cause a specified action to be performed with respect to an associated template slot).

Figure 3D:
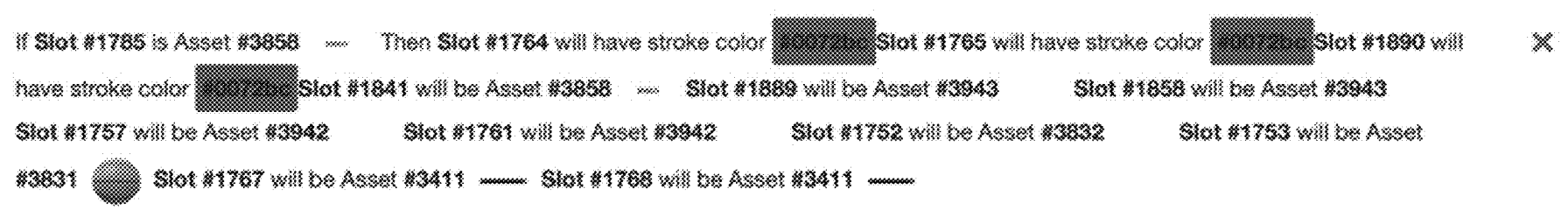

A control which may be provided which when activated causes rules defined using the user interface illustrated in FIG. 3C (or imported as a CSV file) to be visually and logically displayed (such as illustrated in FIG. 3D) to enhance the ability to understand and detect errors in the rule. Such a representation can be especially helpful with complex rules that include multiple "if" statements and multiple "then" actions. The user interface illustrating the rules may include text references to a visual asset (e.g., a graphic image, a photograph, etc.) and/or thumbnails of the visual assets to further enhance the ability to visualize the rules and detect errors.

Figure 3E:
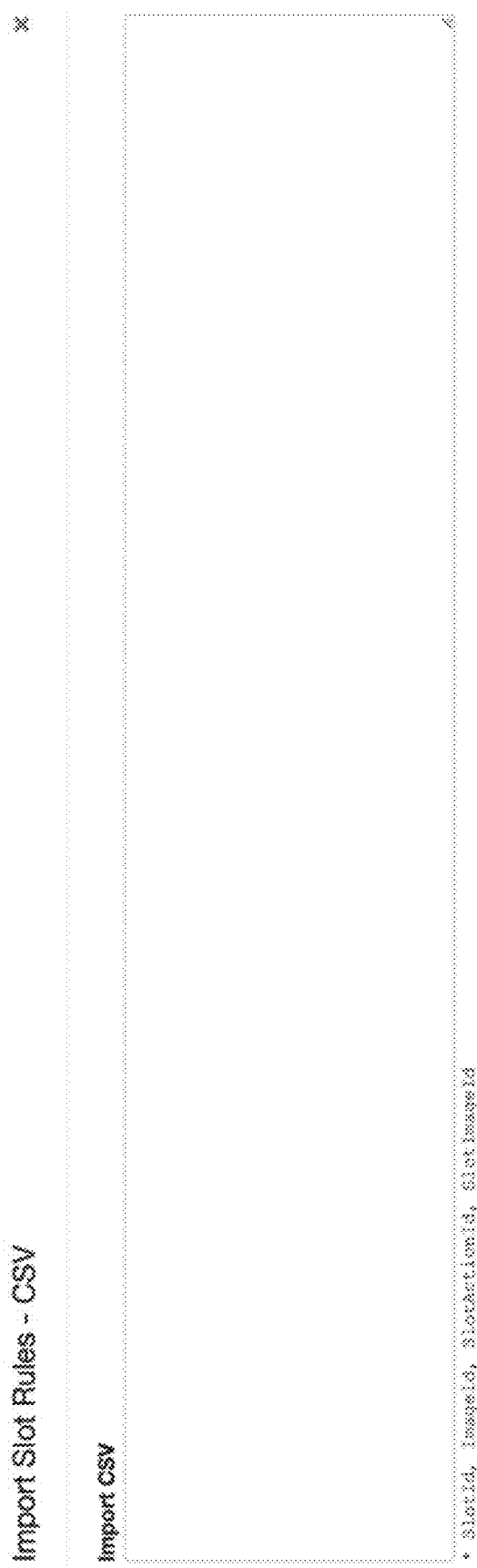

FIG. 3E illustrates an example CSV import field. The user may enter or navigate to an address (e.g., a URL or file path) to the desired CSV file. The contents of the accessed CSV file may then be displayed. By way of example, the CSV may include, for a given rule, a template slot identifier, a content item identifier, a slot action identifier and a slot image identifier, (e.g., a slotID, imageID, slotActionID, slotImageID).

Figure 3F:
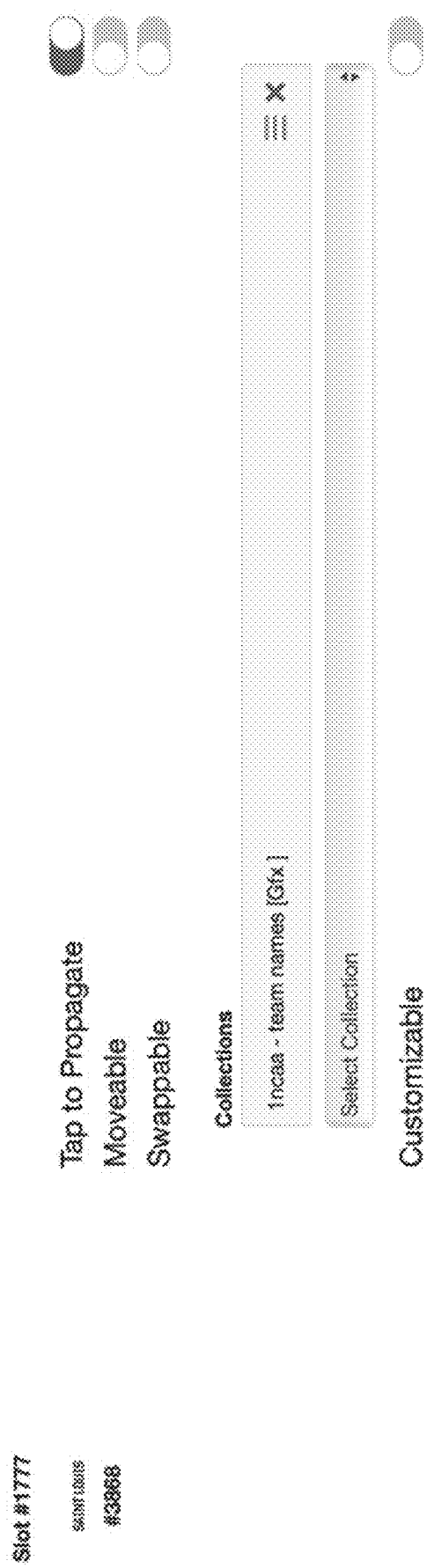

FIG. 3F illustrates an example configuration user interface. The example user interface includes a "tap to propagate" control that enables or disables a user's ability to initiate activation of a propagation rule by touch a slot or slot entry (e.g., tapping a team name on a tournament bracket). A "moveable" control enables or disables a user's ability to move a content item from one slot to another slot, and/or the ability to move the content item to any desired location on the template. A "swappable" control enables or disables a user's ability to swap/switch a current content item (e.g., a team logo) in a slot to a different content item (e.g., selected from a collection of content items specified via one or more collections user interfaces). A customizable interface enables or disables a user's ability to use user provided (e.g., uploaded or entered) content (e.g., a user selfie, other image, or text) to customize a template slot.

Figure 3G:
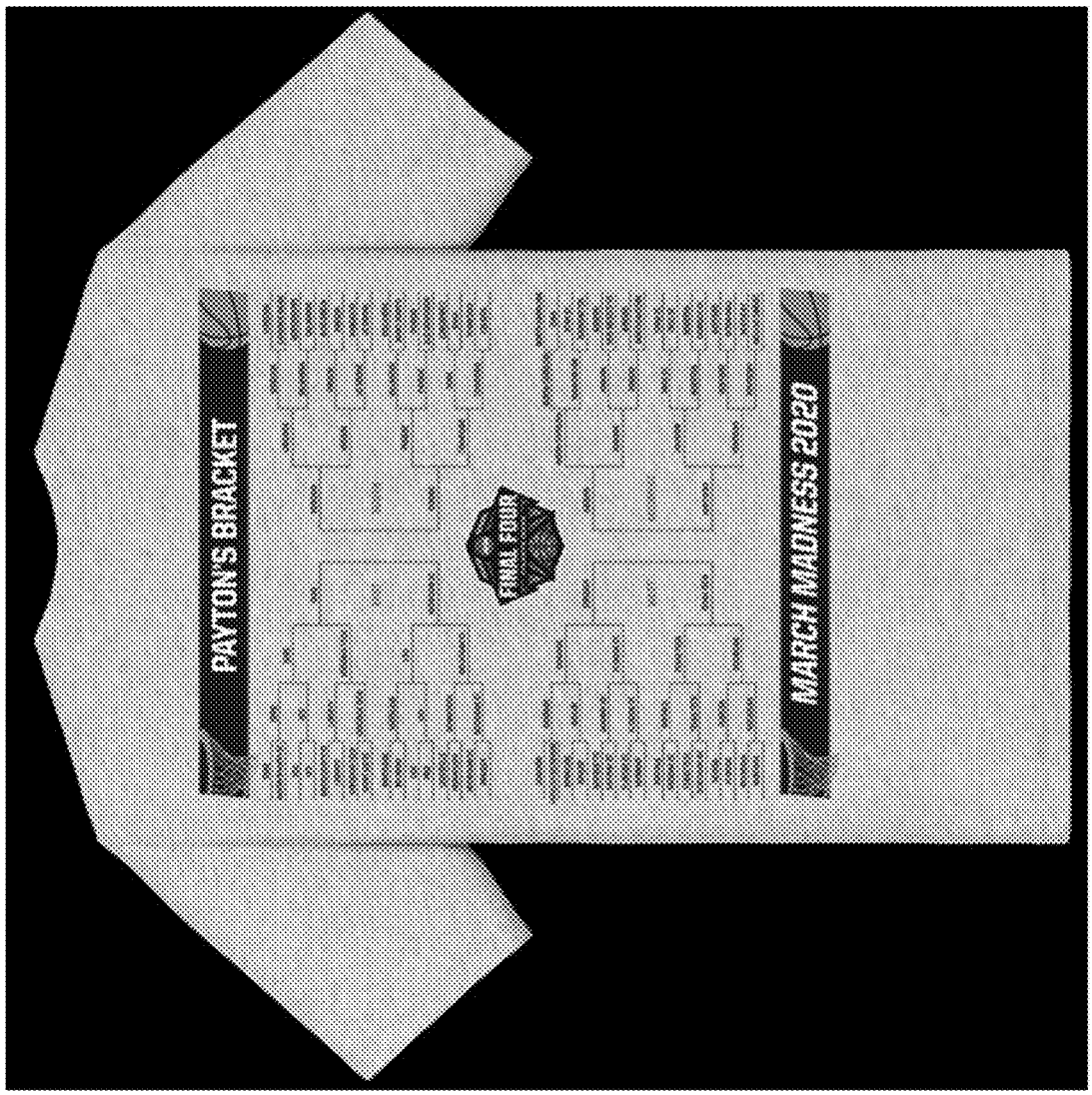

FIG. 3G illustrates an example object (a t-shirt in this example) with a user-customized template. In this example, the template includes a design element comprising a basketball hoop, net, and basketball, and user customized text (e.g., the user's name). A second design element includes a basketball hoop, net, and basketball, and a tournament name. A third design element may include a logo corresponding to a tournament stage. A fourth design element may include a tournament bracket with prepopulated team names on certain branches and user specified team names on certain other branches.

Optionally, once a template and its various rules and customization permissions are defined, a file may be generated that enables an authorized user (e.g., someone responsible for enforcing an entities brand rules) to review the defined template and its various rules and customization permissions. For example, a PDF file or other electronic document file format that enables the defined template and its various rules and customization permissions to be generated as an electronic image that a reviewer can view, navigate, print, or forward to someone else. Optionally, the reviewer is enabled to add notes or commentary, via which the reviewer may identify deficits in the defined template, rules, and/or customization permissions. Optionally, a given note/comment may be visually associated with an aspect of the template, rules, and/or customization permissions that is the subject of the note/comment (e.g., a comment regarding a corresponding deficit). The commented electronic document may then be transmitted back to the designer of the defined template, rules, and/or customization permissions (or to another user) for correction. The process may then repeat.

An example electronic document is illustrated in FIG. 13D. The document may include an image of the template (e.g., for an object front side, back side, interior, etc.), a template name (which may be a descriptive name provided by a user/designer), an indication as to whether the template has already been published or not (e.g., to an online catalog), a unique alphanumerical template identifier (which may be automatically generated by the system), permitted colors for the item being customized, what side of the template/item will be presented to an end user first (e.g., via an online catalog), whether zoom cycling is enabled for different sides of the item. Optionally, an entry may be made for each slot, depicting the designated default asset (if any) and an indication whether an end user is granted permissions to move the slot/default design element/asset, to swap the default design element with another design element from a collection of design elements assigned to the slot, to customize the slot using a design element (e.g., an image, text or graphic) provided by the end user, or whether a tap (or otherwise indicating) the slot will cause propagation rules to be executed to propagate, based on the content of the design element in the current slot, color changes and/or design elements with respect to other slots.

Figure 17:
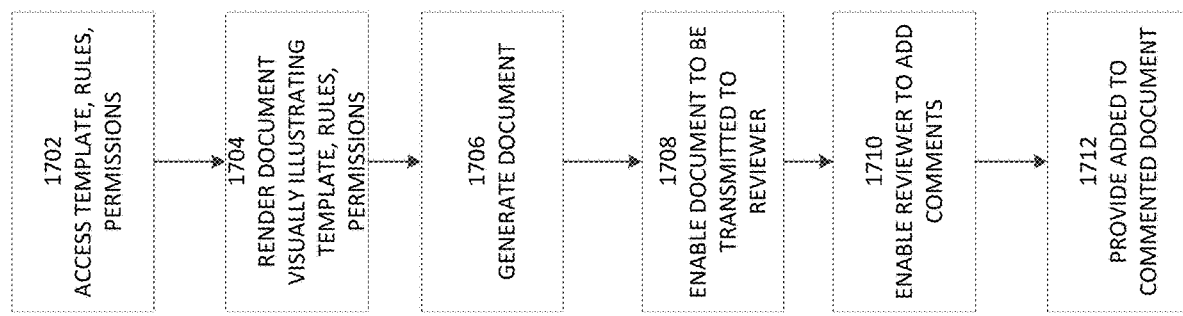

An example process is illustrated in FIG. 17. At block 1702, a template having one or more slots and associated rules and permissions (such as those described elsewhere herein) are accessed from memory. The template and associated rules and permissions may have been designated by a user (who may be referred to as the template designer) on behalf of an entity, such as a brand owner whose intellectual property (e.g., design elements, characters, etc.) may be used in the template, where the template may in turn be used to customize a physical or digital item.

At block 1704, an interface (e.g., an HTML document or other format) may be rendered that visually illustrates the template and associated rules and permissions for modifying the template (e.g., for an end user or other user-type). At block 1706, the rendered document may be exported using a different file type (e.g., a PDF file) to generate a shareable document configured to accept comments and that may be navigated through. At block 1708, the designer or other authorized user may be enabled to transmit the generated shareable document or a link thereto to a destination, such as a user authorized to review, approve, or disapprove the template and associated rules and permissions for modifying the template. The generated shareable document (an example of which is illustrated in FIG. 13D) or a link thereto may be shared via a template design application, via email, via a short messaging service, and/or otherwise.

At block 1710, upon receipt of the shareable document, the recipient (the reviewer) is enabled to view, navigate, print, or forward the shareable document. In addition, the recipient is enabled to add commentary, via which the recipient may identify deficits in the illustrated template, rules, and/or customization permissions. Optionally, a given comment may be visually associated with an aspect of the illustrated template, rules, and/or customization permissions that is the subject of the comment (e.g., a comment regarding a corresponding deficit). At block 1712, the commented shareable document may then be transmitted back to the recipient (or to another user) for correction. Once the deficits have been addressed, the recipient may transmit the corrected template, rules, and/or customization permissions back to the reviewer. The process may be repeated until the deficits are corrected to the satisfaction of the reviewer.

Certain additional processes and user interfaces will now be described that enable items to be customized using templates and design elements, and enabling the items to be printed on or embroidered by printers or embroidering machines using the customized templates and design elements. In addition or instead, the processes and user interfaces may be used to customize digital assets.

As noted above, various user interfaces may be provided that enable various palette types to be defined. Example palettes (sometimes referred to herein as collections) may include color palettes, content palettes, asset (e.g., logos, images, text, brands, etc.) palettes, font palettes, effect palettes, and the like. In addition, user interfaces may be provided that enable a user to specify assets that may not be used together, content that may not be used together, colors that may not be used together, fonts that may not be used together, and/or effects that may not be used together.

Certain user interfaces and processes enable one or more collections to be assigned to a group. For example, one or more groups of collections may be defined for a given brand, sub-brand, league, team, musical group, performer, or product, and the group of collections may be assigned an identifier to enable a user to quickly locate the appropriate collections.

Certain collections or groups of collection of design elements/assets may be assigned to a specific template design area (sometimes referred to herein as a "slot").

For example, an example user interface may be provided that enables a user to assign palettes/collections that may be used for a specific slot. The user interface may enable a user to specify which asset from the assigned collections are to be used as a default asset for the slot (where when an end user view the template via a user interface), the default asset will be initially displayed in the corresponding slot. After a user selects an item (e.g., a physical product or a digital asset) for which end user permissions are to be specified, the system accesses associated metadata for the item (e.g., of a template associated with the item), including the number of design areas/slots, the position of the slots with respect to the item, one or more images of the item (e.g., an image of the front of the item (e.g., the front of a t-shirt), an image of the back of the item (e.g., the back of the t-shirt), and/or an image of the interior an item, such as an inward facing surface of an item of clothing). The item images may be rendered in the user interface. Metadata indicating pre-specified permitted colors for the item may be accessed and corresponding menu entries rendered (e.g., with corresponding colored discs or other icons). The item color specified when the design was created and saved may be used as the default garment color for the item template.

A list of slots identified for the item may be displayed in association with corresponding controls. A given slot may have a slot name displayed (e.g., slot 1, left arm slot, chest slot, etc.) in association with an asset specified as a default asset. For a given slot, the controls may enable a user to select one or more previously specified collections/groups of assets via a select collection control. Optionally, the user may be enabled to select collections from multiple stores/brands, as discussed elsewhere herein. When the user selects the select collection control, a menu of previously defined asset collections may be accessed, and one or more of the names of the asset collections may be displayed from which the user can select. Controls may be provided that enable a user to scroll through the names of the asset collections. The names of the asset collection may include a text description (e.g., a team name, a roster year, a series name, etc.) and/or a unique identifier. A "swappable" control may be provided for each slot that enables the user to specify whether an end user can or cannot swap an asset.

An exception interface may be provided via which the user can select assets which may not be combined for a given slot or for all slots. For example, the user interface may enable the user to specify that if design element "A" is used in slot 1, then design element "B" may not be used in one or more other slots. For example, a sports league may specify that if the logo of a first team is used in slot 1, then a logo of a specified second team may not be used in slot 2.

In addition, a control may be provided that enables a user to delete an exception. The user inputs may be stored in association with the template. Optionally, the user may save different versions of a given template with different collections assigned to a given slot and/or different exceptions. A control may be provided which enables the user to specify a default template, which will be displayed to end users when they access a corresponding online store.

A user (e.g., an end user) may access the template via an online or downloaded interactive catalog. The template may be displayed overlaid on an image of an item (e.g., a t-shirt or other item being customized). A user selection of a template slot is detected. For example, if the user is accessing the user interface via a device equipped with a touch screen, the user may select a slot by tapping on a slot (e.g., by tapping on an design element displayed at the slot). The process may detect the X,Y coordinates of the user touch (or other pointing mechanism) and compare them to the X,Y coordinates of slots, and when an overlap is detected, the process determines that the coordinate of the slot that overlaps that of the pointing coordinate is the selected slot. The selected slot may optionally be emphasized (e.g., with a border surrounding the slot). A slot identifier associated with the selected slot is utilized to identify design element collections assigned to the selected slot. The slot identifier associated with the selected slot is utilized to identify design element combination exceptions assigned to the selected slot.

A menu of design elements included in the collection(s) assigned to the slot may be generated. Other design elements displayed with respect to the item image may be identified. Using the identified design element combination exceptions assigned to the selected slot and the identified other displayed design elements (e.g., in other slots), a determination may be made as to whether there is an exception/prohibition on combining any of the design elements included in the collection(s) assigned to the slot with any of the other displayed design elements. Based on any identified prohibitions, the prohibited design elements in the collection are excluded from a menu of available design elements being displayed on the user device. Optionally instead, such prohibited design elements are displayed but graphically indicated as being unavailable (e.g., for example, such prohibited design elements may be greyed out). The menu of design elements may be a rotatable/scrollable (in a backwards or forwards direction) menu which the user can scroll through by swiping the menu backwards or forward with a finger or other pointing device. A user selection of an available design element from the design element menu is detected. The user may make the selection by tapping the design element. The image of the item, with the selected design element in the selected slot, is rendered on the user device, where the selected design element replaces the previous (e.g., default) design element in that slot. Optionally, design element controls are provided which enable the user to edit the design element (e.g., rotate, resize, move, change color, other edits described herein, etc.). The foregoing process may be repeated for the previously selected slot or for other slots.

If the user activates an acquisition control (e.g., a purchase control), a print file may be generated for printing the design elements (including any user customizations) on a physical embodiment of the selected item. The print file may include separate image files for each design element or a single image file corresponding to a plurality of assists. The print file may be used by a printer to print the design elements on the item.

A given design element may be stored in association with metadata that indicates the content, type, or color of the design element. For example, if a design element is a logo of a sports team, the metadata may include the team name, the name of the city in which the team is based, the names of team players, the color of the logo, and/or other metadata. Optionally, a search interface may be provided via which a user can search for a design element by entering one or more search terms of by selecting one or more predefined search terms. Optionally, the search engine may automatically limit the search to the currently selected slot. The search engine may then search for design elements assigned to the selected slot having metatags corresponding to the search terms, identify matching design elements, rank the closeness of the matching design elements, and cause the search results to be presented via the user device in ranked order. The ranking may be based on the number of metatags associated with a given design element that match the user query search terms. Optionally, the ranking may be based in part on the popularity of the design elements (e.g., where the popularity may be determined using criteria and processes described herein). Optionally, an administrator or other authorized user may turn on or off the search function on a slot-by-slot basis.

Optionally, different entities (e.g., different brands, different athletes, different teams, different actors, etc.) may use the same template, where the template has a specified slot layout, and where the design elements used for a given slot need to satisfy specified dimensions (e.g., height and width) or dimension range (e.g., minimum_height≤height of design element≥maximum_height, minimum_width≤width of design element≥maximum_width). However, the different entities may be enabled to perform certain limited customizations. Optionally, certain template slots may be designated as fixed, wherein an entity may not replace the content assigned to the slot.

Advantageously a template may be shared by different entities. For example, the entities that share a given template may have a common characteristic or association. By way of illustration, sports teams in the same sports league may want to utilize the same template to ensure substantial uniformity in appearance, but may want to make limited customizations to the template that are specific to a given team. For example, a league team may want to include their own logo in a prominent logo slot but maintain the other names of the league teams in other logo slots, and maintain the league name in a league name slot.

By way of further example, an item (e.g., a garment, such as a t-shirt, or a backpack) may be assigned a non-customizable template for a first side (e.g., the front or back) and a customizable template for a second side (e.g., the front, back, or interior (e.g., to customize a printed/embroidered garment tag or tag-less label, such as one printed on the area of a t-shirt adjacent to the rear neck area or elsewhere)). Thus, for example, members of a musical group or other set of performers may have a common, non-customizable template for the front of a t-shirt and a customizable template for the back of the t-shirt that may be customized by a member of the set of performers (e.g., where the back may be customized using a logo of a performer's selected charity).

By way of yet further example, an entity (e.g., a company) may have several brands and may want each brand to use a common template, where certain slots may be customizable by each brand and certain slots are fixed and non-customizable by a given brand. Thus, for example, a brand may be responsible for marketing the shared template with certain of the brand's design element assets assigned to certain slots of the template. The brand may be enabled to sell items customized with the brand's assets directly to end users. Optionally, the brand may be enabled to specify that certain slots are customizable by the brand's end users.

Optionally, when a given template is to be used for multiple entities, where common elements may be used for certain slots, and entity-specific design elements may populate certain other slots, a stock version of the template may be created. The stock version may, for example, have a background slot, a text slot, and a graphic image grid (which may include multiple image slots). Different slots may be designated with a color type, such as primary or first color, secondary or second color, and so on. The stock version may be uploaded and/or stored as a black/white or grey template (without colors).

The colors for the foregoing may then be set separately for each entity. For example, if the template is intended for a school graduating class, the template colors (e.g., primary and secondary colors) may be set to correspond to the school colors. By way of further example, if the template is intended for teams in a sports league, the template colors may be set to correspond to a given team's colors.

Optionally, the colors may be manually set. Optionally, each entity may be associated with a unique identifier and a table may be generated and accessed that associates a given entity unique identifier with one or more colors (e.g., a primary color and a secondary color, which may be identified by name, RGB values, YUV values, and/or the like) and the accessed colors may be used to color design elements (e.g., text, graphics, images, etc.) in corresponding slots. Optionally, a learning engine (e.g., a neural network) may be trained to identify colors associated with an entity (e.g., by examining images tagged with the entities name and a key phrase such as "jersey" or "school colors"), and the identified colors may be used to color design elements (e.g., text, graphics, images, etc.) in corresponding slots.

Optionally, an entity may enable (grant permission to) one or more third parties (such as one or more influencers) to customize one or more slots that the entity is permitted to customize. Thus, for example, an influencer may customize a template slot (e.g., on the front or back of a garment or on an interior garment label) using an image or name of the influencer. Thus, not only may a template be shared among a top tier of entities for their limited customization, but such top tier entities may enable a second tier of entities to perform limited customization of the shared template using a subset of the slots (interior and/or exterior slots) that the top tier entities were enabled to customize. The influencer may then share a link to the influencer's version of the template via social media, microblogs, email, messaging services, or otherwise.

Optionally, the number of times a given influencer's link is activated and/or the number of items sold customized using each influencer's customized template may be tracked and reported in order to determine which influencer has more influence (is more effective) in aiding in the popularity, distribution, and/or sale of items.

Optionally, a user, such as an influencer, may share a template (e.g., via the customization application, via a website, via one or more social media platforms, via a link, or the like) with other users and may enable users to communicate regarding the template. For example, a text and/or video chat interface may be provided via which users can comment on the template, make suggestions on modifying the template, or actually modify the template. For example, the user that created the template may enable, via a corresponding control, other users to modify the template, add images to the template, edit or add text to the template, and/or the like. The modified template may optionally be saved as a different version, so that each version may be later accessed and used for customization of one or more items. Optionally, an undo control, which activates, undoes the previous edit. Thus, multiple activations of the undo control may cause a corresponding multiple number of edits to be undone.

Optionally, an administrative user may control for how long and/or how many times a template (or link thereto) may be shared. For example, a user interface may be provided that enables an administrative user to specify an expiration date for a template link or specify how many days, weeks, or months the template link may be shared. By way of further example, a user interface may be provided that enables an administrative user to specify a number of times a template link may be shared (e.g., 10 times, 20 times, etc.). Once the end date or number of permitted shares is reached the link template (and optionally other sharing techniques) may be disabled to prevent further sharing.

Optionally, a given customizable slot may be configured to receive only a certain type or types of design elements (e.g., text, a logo, an image of a face, an image of a specific type of clothing article, an image of a specific type of sports equipment, an image of team player, etc.). As similarly discussed above, certain slots may be associated with edit permissions enabling an entity to customize the slots using entity selected and/or provided content, and certain slots may be designated as non-editable.

Advantageously, using such a shared template reduces the amount of memory that would otherwise be needed to store separate templates for each entity, reduces the amount of processing resources that would otherwise need to be utilized to generate multiple unique templates using the computer aided design system, and ensures consistency in design style among entities that want or need to share a common style. Further, such a shared template enables assets licensed from different sources to be used together in a controlled, rule-based manner. Yet further, different entities are enabled to provide different permissions to consumers with respect to editing or otherwise customizing the template.

Certain example aspects of utilizing a shared template will now be described in greater detail.

For a given template, one or more of the following permissions may be assigned to a given template slot or the template as a whole:

permission to swap a default slot design element with a design element from one or more sets of design elements associated with the slot (e.g., e.g., swap a default logo in a slot with the logo of team I, swap a default team name with a name of team 2, swap a default player image with a another player image, swap a default character image with a different character image, etc.);

permission to designate a default design element for a given slot;

permission to submit/upload a design element to be added to a slot (e.g., a photograph of a sporting event, a player photograph, a clothing item image, a sporting equipment image, etc.), where the submitted/uploaded design element may optionally be swapped with a default design element associated with the slot of the shared template;

permission to specify a template or slot color from one or more sets of colors associated with the template or slot, where the specified color may optionally be swapped with a default color associated with the shared template or shared template slot;

permission to designate selected slots as customizable by an end user (e.g., an item purchaser being customized using the template), including one or more of permitting an end user to swap a given design element in a given slot with a design element from one or more sets of design elements associated with the slot, enabling an end user to use end user-supplied content to customize a slot (e.g., an uploaded or otherwise provided image/photograph (e.g., a selfie, an image the user captured at a concert, sporting event, or other event), or user enter text)), enabling an end user to change from a default color to a color from a color palette associated with the template or given slot, and/or other customizations discussed herein.

Once a given entity (e.g., a brand, an athlete, a performer, a team, etc.) has customized a shared template, the customized template may be stored and may be made accessible via a webpage or a dedicated customization application hosted on end user devices. In general, the user interfaces described herein may be rendered by a browser or a dedicated application hosted on the user device. The entity may generate a network resource locator (e.g., a Uniform Resource Locator, a shortened URL, etc.) that provides access to the entity-customized template. The resource locator may point to a website operated by or on behalf of the entity (e.g., a webpage hosted by the entity, or an online storefront for the entity operate by a service that hosts storefront for multiple entities). Optionally instead, the resource locator may be associated with an interactive electronic catalog entry operated by a third party ecommerce store.

The locator may be shared by the entity with potential purchasers (e.g., members of a fan club, purchasers of previous items from the entity, ticket purchases to sporting events or concerts associated with the entity, followers on a social media site, etc.). For example, the locator may be shared via social media (e.g., a content sharing site, a microblog, etc.), email, short message service message, pop-up notification on a user device, a dedicated application installed on a user device, or otherwise.

Optionally, as discussed above, the entity may grant permission to one or more third parties (e.g., influencers) to customize the shared template by modifying one or more slots (e.g., to include content of the influencer, such as an image or name of the influencer). Thus, for example, if the entity is permitted to customize x of y slots (e.g., 4 of 8 slots), the entity may customize a subset of the x slots and permit one or more third parties to customize another subset of the x slots. By way of example, a garment label may have a slot for a garment size and a slot customizable by the entity or a third party.

A unique locator may be generated for each third party, and each third party may separately share their respective locators (e.g., via their own social network presence/page, such as on a microblog, an image sharing program, a video sharing program, etc.). Optionally, the number of times a given third party's link is activated and/or the number of items sold customized using each third party's customized template may be tracked and reported in order to determine which third party has more influence (is more effective) in aiding in the sale of items.

Optionally, if the resource locator is directed to a third party ecommerce site, once the purchase is completed on the third party site by the user, the user's browser (or dedicated application) may be automatically redirected to another site, such as that of the entity's (e.g., a performer's website, a team's website, an athlete's website, a TV series website, etc.). Optionally, a locator may be a deep link that points to content inside a dedicated application, wherein when the user activates the deep link (e.g., by clicking on the deeplink), the user is navigated to the corresponding content in the dedicated application.

Optionally, the locator may be a deferred deep link that, when activated, routes the user's device (e.g., a mobile device, such as a smart phone, tablet computer, or laptop computer, or a non-mobile device such as a desktop computer) to content inside a dedicated application even if the dedicated application is not yet installed when the link is activated. When the deferred deep link is activated, the link will first redirect the user device to an application store supported by the user device to download the application to the user device, and then navigate the user device to the specific entity-specific template and associated customizable item entry in the application.

Figure 4:
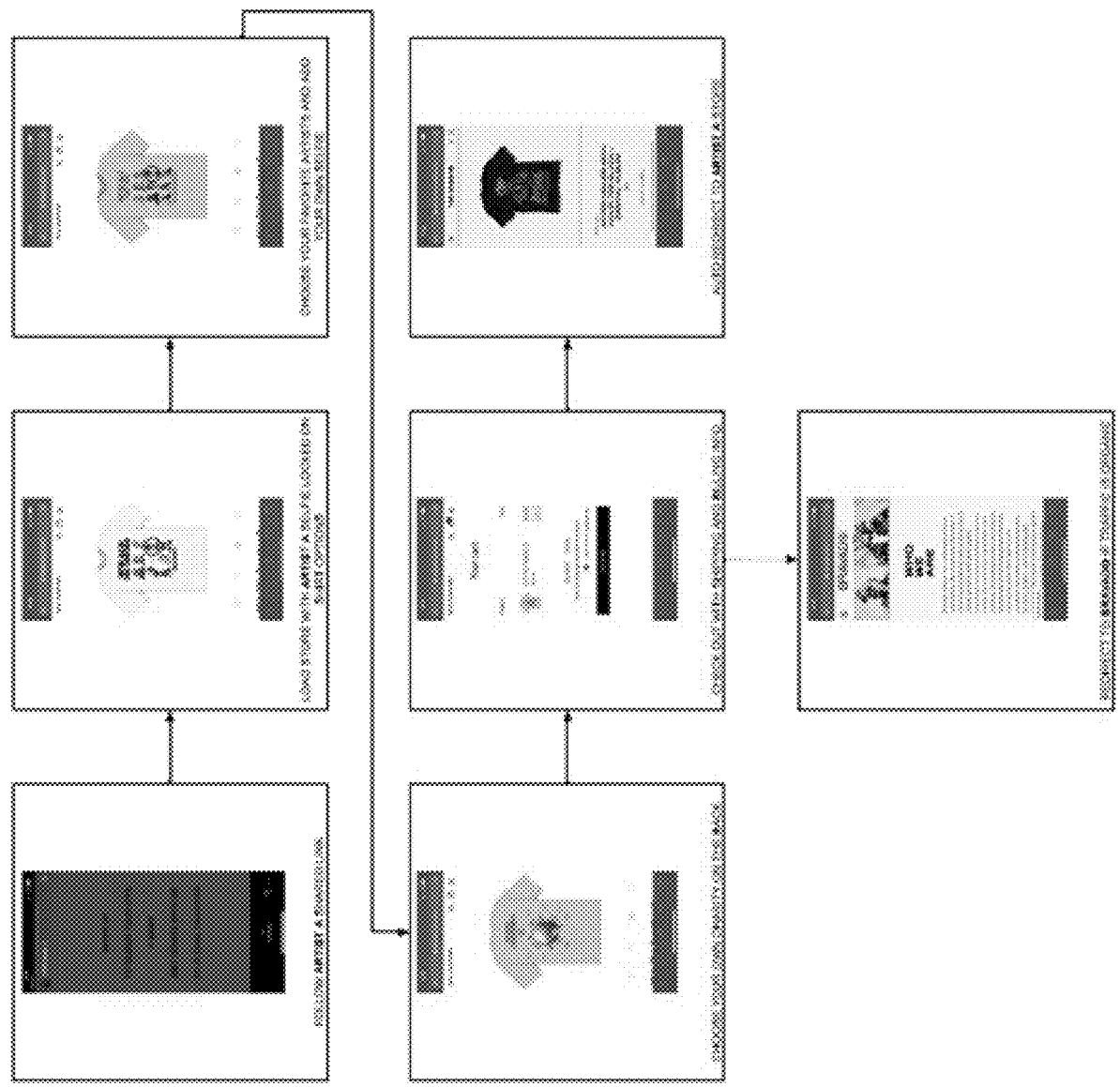
FIGS. 4-12 illustrate example processes.

Referring now to FIG. 4, an example process of enabling a shared template to be used to customize items is illustrated. At block 402, a locator (e.g., a URL or other link) to an item that may be customized using a template shared by multiple entities is received by a user device and the illustrated user interface is displayed in response. In this example the shared template is used by multiple artists (e.g., musical performers) to promote and raise funds for different charities. As similarly discussed elsewhere herein, the link may have been received by the user device via messaging service (e.g., a short messaging service, a multimedia messaging service, etc.), email, or a dedicated application. By way of further example, the link may have been accessed from a social media page. In this example, user instructions are provided to swipe up (e.g., using a finger swipe on the user device touch display) in order to access a computer aided design customization user interface for customizing an item (e.g., a t-shirt). In this example, the user device may belong to a fan of the artist that may be interested in purchasing a t-shirt customized by the artist.

In response to a user action (e.g., swiping up on the user interface presented by the user device touch screen), the process may proceed to state 404. At state 404, a user interface is populated using the template customized by/for the artist, where the artist-customized template is depicted on an item being customized (e.g., a t-shirt). In this example, the template is displayed on the front of the t-shirt, and designated default images of several different artists are rendered at respective template slots (where the slots may or may not be indicated via a slot border), including an image of the artist that shared the link to the template.

In this example, the slot depicting the image of the artist that shared the link to the template is locked, in that the image may not be swapped by the user with the image of another artist. The locked status of the slot may optionally be indicated textually and/or graphically (e.g., a circle or other geometric shape around the image, greying out the image, an icon (such as a lock) depicted over or adjacent to the image, or otherwise). Optionally, the images of artists in other slots may be user editable, in that the user may swap a given artist image with the image of another artist from a collection of artist images associated with the slot. In addition, in this example, one slot may be customized by the user using an image uploaded or otherwise provided by the user (e.g., a self-portrait (selfie) of the user). Optionally, a text and/or graphic indication may be provided indicating that the user may customize the slot using user-provided content and optionally, indicating the permitted content type (e.g., a selfie of the user).

At block 406, the item is rendered in the user interface in substantially real time utilizing an uploaded image (a selfie) of the user (e.g., from the user device or other data store of images). Optionally, the user may also be enabled to change the item color by selecting the item color from a palette of permitted colors. The item may be re-rendered in substantially real time using the user-selected color. Optionally, the color of the item may be automatically changed based on the images of artists selected by the user.

Once the user has indicated that the user has finished editing the template on the front of the t-shirt (e.g., by activating a done control), at block 408, the rear of the t-shirt is displayed via the user interface, with a rear side template (including default text and/or images at respective slots) overlaying the t-shirt. In this example, a collection of images and text associated with different charities are associated with the rear template slots. The charities in the collection may have been pre-selected by respective artists or other entities. The rear template slots may be prepopulated with default text and images of a charity selected by the artist that sent the link to the user. If the user selects a different charity from the available charities, the rear template will be populated in substantially real time with the corresponding text and images. Optionally, the color of the item will automatically change based on the selected charity, where different colors may be linked to different charities.

Once the user has indicated that the user has finished editing the rear template (e.g., by activating a done control), at block 410, a checkout user interface is provided on the user device. The checkout user interface in this example displays a thumbnail image of the customized item (front and/or back of the item), the item size, and the item cost. An edit control is provided that enables the user to edit the item size and/or to delete the customized item from a user shopping cart.

In response to the user activating a checkout control, the process may proceed to block 412 or block 414. If the artist has an online storefront, the process proceeds to block 412 and a user interface of the online store of the artist is presented (optionally including artist branding), and the user may complete the purchase. If the artist does not have an online storefront, the user may be navigated to a user interface of an entity that hands purchase transactions for multiple entities. The user may complete the purchase via either the user interface illustrated in block 412 or the user interface illustrated in block 414. Deep linking or deferred deep linking may be utilized to access the user interfaces of block 412 or block 414.

Optionally, an administrator may specify (e.g., via an administrator user interface) whether end users/consumers are to be directed to an artist storefront/website or that of another entity. By way of example, different players on a team may each have their own customized version of a shared template. However, some players may have their own website and some players may not have their own website. An administrator may specify that end users utilizing a template customized by a player that has her/his own website will be navigated to the player's website, and that users utilizing a template customized by a player that does not have her/his own website will be navigated to the player's team website to complete the purchase.

Optionally, the purchase may be completed at block 410, and once the purchase is completed the user device browser or dedicated application may be directed to the artist website or other artist document, or the user device browser or dedicated application may be directed to a third party website site or document.

Once the purchase is complete, a print file (corresponding to the customized front and rear templates), may be generated and transmitted to a printer/embroidering machine. The printer/embroidering machine which may print or embroider the customized front and rear templates on the item.

Optionally, an artificial intelligence learning engine may be trained to determined that most cost effective and/or highest quality printing technique for printing a template on a given product being customized. For example, the artificial intelligence learning engine may select from silk printing, Direct-to-garment (dtg) printing, flexography, etching, rotogravure, and/or the like. The artificial intelligence learning engine may be in the form of a neural network (including an input layer, one or more hidden layers, and an output layer).

The screen printing process involved pushing ink through a woven screen (sometimes referred to as a called mesh stencil) onto the fabric of the garment, and the ink lays on top of the fabric. Typically, a screen is made for each element of a design, and the colors and elements of the design are applied layer by layer onto the fabric. Thus, the more layers needed to print a design, the more time it takes to setup the mesh stencils, the longer the printing process takes, and the thicker the printed design will feel on the fabric. Further, from a reproduction quality and accuracy standpoint, ink screen printing tends to work better with solid graphics (geometric designs, symbols, and shapes). Still further, ink jet printing is typically limited to relatively few colors (e.g., less than 9 colors). Because of the cost and time involved in creating the mesh stencils and setting up the printing process, ink screen printing may often be more suitable for bulk orders of multiple copies of a given customized garment, and for designs with relatively simple designs with relatively few colors.

Direct-to-garment (dtg) printing involves spraying ink onto the garment fabric, and the ink then soaks into the fibers of the garment fabric. Advantageously, dtg printing involves relatively little setup, and so is suitable even for orders of a single customized garment. In addition, dtg printers can print large numbers of colors (more than the maximum 9 colors typically offered by ink screen colors) and can print detailed and photorealistic images. However, disadvantageously, dtg printing does not handle transparencies (less than 100% opaque) well, and instead need to use half-toning to imitate semi-transparency.

Thus, the AI engine may analyze an image to determine the presence of small details, whether the image is a photograph, whether there is any transparences in the image, and may determine the number of colors in the image. In addition, the AI engine may input the number of copies of the customized garment being ordered. Based on the foregoing factors, the AI engine may generate a recommendation as to what printer and printing process is to be used for a given order of a customized item.

Figure 22:
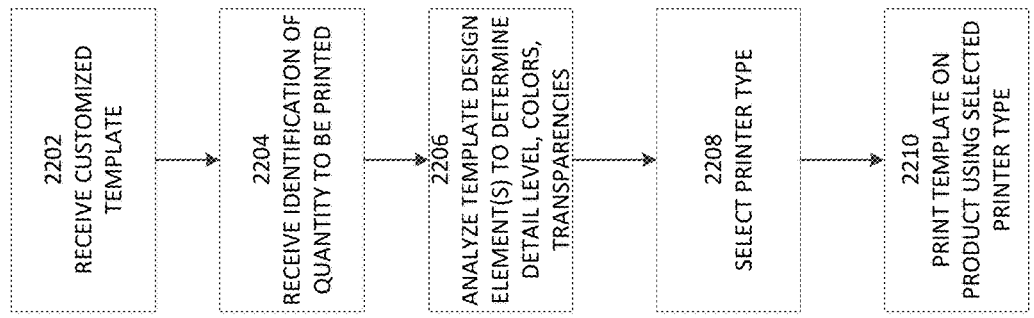

Referring to FIG. 22, an example printer selection and print process is illustrated. At block 2202, the process accesses a template. The template may have been customized by an end user, as described elsewhere herein. For example, an end user may had uploaded one or more images to populate one or more template slots. By way of further example, the end user may have selected one or more images or text items from one or more collections to populate one or more template slots.

At block 2204, the process determines the quantity of a given item (e.g., a garment, such as a cotton garment, a polyester garment, a wool garment, or a garment made of a blend of natural and/or artificial fibers) being ordered by the end user that is to be customized using the template by have the template (e.g., template images or text), printed thereon. In addition, the process may access the item top (e.g., a t-shirt, hoodie, etc.) and the item size (e.g., small, medium, large, x-large) and gender if relevant.

At block 2206, the template design elements are analyzed to determine the number of colors, the colors themselves, the level of detail present, and the presence of any transparencies. The level of detail may be measured using one or more techniques. For example, the amount of contrasting colors, shades and/or edges may be determined and used to scoring the amount of detail. By of illustration a moving window (e.g., a rectangular or square window, such as a 16×16 or 64×64 pixel window) may be used and moved across a design element (e.g., an image). At a given positioning of the window adjacent pixel colors may be compared, and if they differ by more than a threshold amount, an edge or detail feature may be detected. For example, the closeness in the HSV (Hue, Saturation, and Value) color space, the HSL (hue, saturation, lightness or luminance) color space, the CIELAB color space, and/or other color space of the pixel values may be determined.

Edge detection may be performed by detecting changes in brightness or intensity. For example, an edge detection process may detect edges by identifying the maximum and minimum in the first derivative of the image. By way of further example, an edge detection process may utilize a Laplacian process that searches for zero crossings in the second derivative of the image to identify edges.

A transparency may be located by examining the alpha channel until an entry is identified that is not completely opaque.

Based on some or all of the following criteria a determination may be made as to which printer type (e.g., silk screen, dtg, flexography, etching, or rotogravure printer types) is to be used (or recommended to be used) to print the template: quantity of items on which template is to be printed, the amount of detail in the template design elements, the number of colors in the template design elements, and the presence of any transparencies in the design elements. For example, if a user is ordering more than a first threshold number of items, silk screen printing may be used or recommended or recommended for use. On the other hand, if a template has a design elements with large amounts of details, and only one item is being ordered, btg printing may be used or recommended or recommended for use.

Optionally, the different types of printers may be ranked as to most highly recommended to least recommended.

At block 2210, the printer file corresponding to the template is transmitted to a printer of the selected type in association with data indicating the quantity of items on which the template is to be printed. In addition, where the item is a garment, the type of garment (e.g., a t-shirt, hoodie, etc,) and size of the garment (e.g., small, medium, large, x-large, etc.).

Optionally, benefits (e.g., discounts on items or design elements, free items or design elements, coupons, etc.) may be provided to a user based at least in part on a dollar value of items purchased, a quantity of items purchased, the number of orders placed, the design elements used to customize items, and/or the types of items purchased. For example, if an end user customized an item with an end user-provided image of a dog (e.g., as determined using computer vision techniques described herein), the end user may be provided with a discount coupon or a coupon for a free product for use at a designated pet store. By way of further example, if a user customizes at ten items during the month of October using Halloween-themed stickers, the user may be provided with a discount on a future purchase.

As noted above, different default design elements may be designated for different slots (where end users may be enabled to replace the default design element with another design element). Optionally, one or more default design elements may be selected for one or more slots by a learning machine based on one or more criteria. By way of illustration, the criteria may relate to or be based on analytics that indicate where the design elements are or have been used, how they are or have been used, how they are or have been interacted with, how they are or have been modified, with what content they are combined with.

For example, the criteria may include popularity of design elements as measured by utilization or cumulative purchase prices of items customized using design elements. The popularity may be determined using rankings generated based on the numbers of items customized using a given design element for a given time period, the number of customer supplied design elements used in combination with a given design element for a given time period, the percentage of purchasers that customized an item using a given design element are in one or more specified demographic categories (e.g., age group(s), geographical area(s), gender(s), order how many customized items a year, etc.). The example analytics may include a "popular combinations" determination that indicates, for a given design element, the design elements the given design element was most often paired/combined with.

In addition, where computer vision is used to identify objects in images uploaded by end users to customize items, those objects may be assigned corresponding descriptive tags. Analytics may be generated using such tags indicating how many end user-provided images include a given object over a given period of time (e.g., how many end user-provided images include dogs, a sunset, a picture of a child, etc.). For example, a report can be generated that indicates how many times a given tag was assigned over a given time period. Further, orders customized using end user-provided images can be sorted by tags (e.g., show orders ordered by most popular tags to least popular tags, alphabetically, show orders with female faces first, or otherwise).

Optionally, default design elements for respective slots may be periodically automatically rotated by the system. For example, one of the five most popular design elements may be designated as a default design element for a specified template slot for a specified period of time (e.g., two days or other time frame), and then a different one of the five most popular design elements may be designated as the default design element for the specified template slot for the specified period. Optionally, sets of design elements may be periodically automatically rotated by the system. For example, one of the five most popular combinations of design elements may be designated as default design elements for respective specified template slots for a specified period of time (e.g., two days or other time frame), and then a different combination of the five most popular combinations of design elements may be designated as the default design elements for respective specified template slots for a specified period of time.

Figure 5:
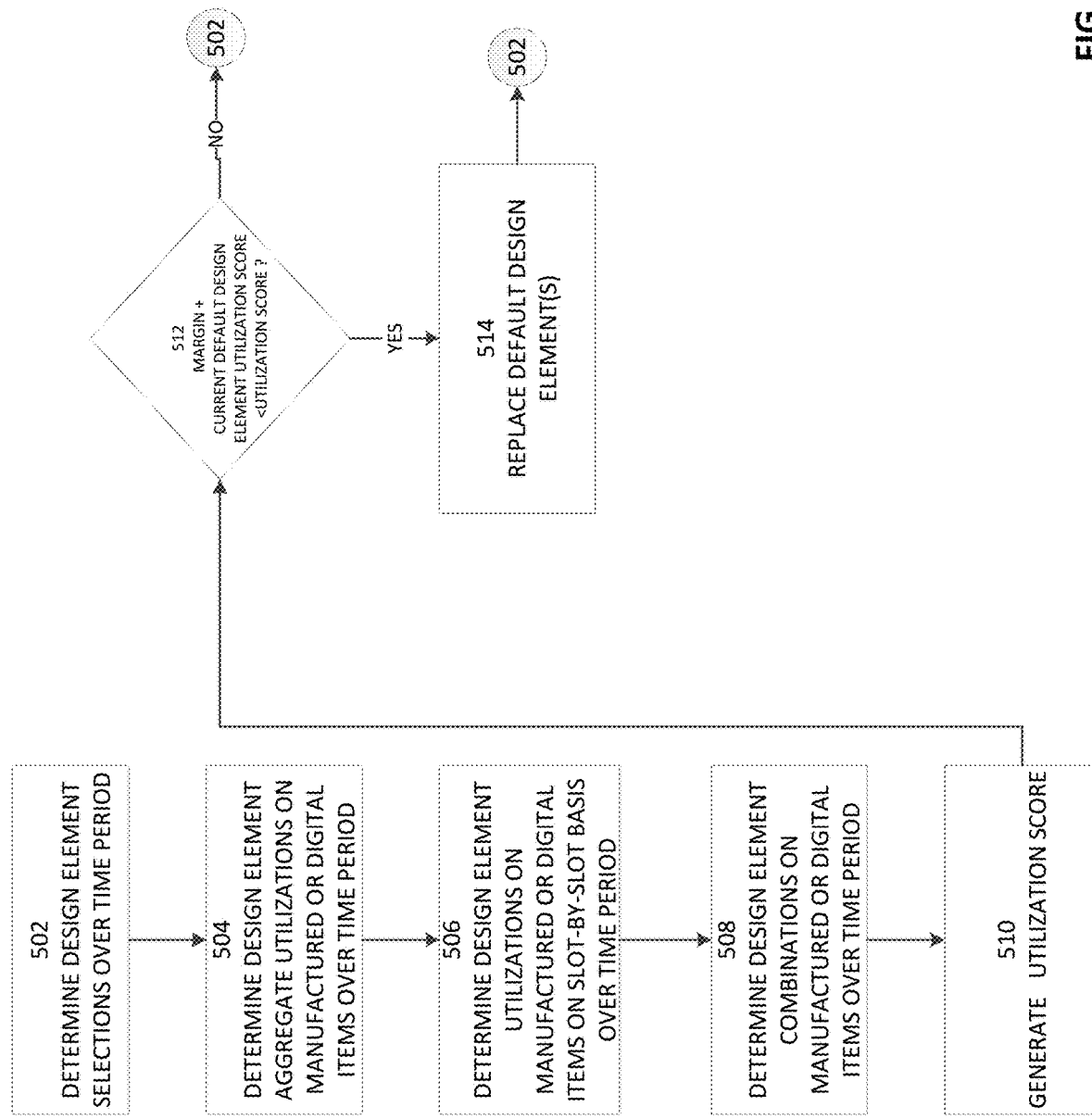

FIG. 5 illustrates an example process for designating default design elements. Various determinations may be made with respect to design element utilizations in customizing items (e.g., physical products or digital content). A user interface may be provided which enables a user (e.g., an administrator) to specify what determinations are to be made, how often the determinations are to be made, and/or over what time periods the determinations are to be made.

At block 502, a determination is made as to what design elements were selected by users for customizing a template during a customization process (but which did not result in a purchase of an item customized using the selected design elements) over a specified period of time (e.g., the previous 1 day, 3 days, 1 week, 1 month, etc.). The determination may be made by monitoring user interactions with design elements via user devices. The determination may access specified filters (e.g., specified by an administrator) from memory, and use the accessed filters to filter the monitored interactions so that only user interactions with specified design elements (e.g., of a particular brand, team, band, etc.), with specified templates, and/or with templates being used to customize specified items (e.g., a clothing product, such as a t-shirt, a backpack, or other specified item), over a specified period of time, are included in the determination. The filters may be specified via a filter user interface.

At block 504, a determination is made as to what design elements, in the aggregate, were selected by users for customizing a template during a customization process that did result in the purchase of manufactured physical item or digital item with the selected design elements. As similarly discussed above with respect to block 504, the determination may access specified filters from memory, and use the accessed filters to filter the monitored interactions so that only interactions with specified design elements (e.g., of a particular brand, team, band, etc.), with specified templates, and/or with templates being used to customize specified items, over a specified period of time, are included in the determination.

At block 506, a determination is made as to what design elements were selected by users for customizing, on a slot-by-slot basis, a template during a customization process that did result in the purchase of manufactured physical item or digital item with the selected design elements. As similarly discussed above, the determination may access specified filters from memory, and use the accessed filters to filter the monitored interactions so that only interactions with specified design elements (e.g., of a particular brand, team, band, etc.), with specified templates, and/or with templates being used to customize specified items, over a specified period of time, are included in the determination.

At block 508, a determination is made as to what combinations of design elements were selected by users for customizing a template during a customization process that did result in the purchase of manufactured physical item or digital item with the selected design elements. As similarly discussed above, the determination may access specified filters from memory, and use the accessed filters to filter the monitored interactions so that only interactions with specified design elements (e.g., of a particular brand, team, band, etc.), with specified templates, and/or with templates being used to customize specified items, over a specified period of time, are included in the determination.

At block 510, design element evaluations may be performed where a utilization score may be calculated based on some or all of the determinations made at blocks 502, 504, 506, 508, and optionally on other criteria. Different weightings may be applied to different determinations to reflect the importance of a given determinations in calculating an overall utilization score.

For example, the process may use a formula such as that provided below, to determine a utilization score:

$$\text{Utilization Score} = w_1 n_1 \text{Determination}_1 + w_2 n_2 \text{Determination}_1 + \ldots w_n n_n \text{Determination}_n$$

Select Algorithm if Relevancy value Algorithm threshold
Where:
w=weight
n=normalization factor
Determination$_\#$=utilization determinations (e.g., determinations made at blocks 502, 504, 506, and/or 508)

Optionally, the design elements may be ranked based on the utilization scores (e.g., from highest to lowest).

At block 512, a determination is made, for one or more templates, whether a utilization score (optionally plus a margin value) for a current default design element is less than the utilization score of another design element. For example, the utilization score of a current default design element may be compared to utilization score of the highest ranked design element. Optionally, a margin value may be used to ensure that the current default design element is not replaced by another design element with only a slightly greater utilization score.

If the utilization score for the highest ranked evaluated design element is greater than that of the current default design element utilization score (optionally plus the margin value), then at block 514, the default design element is replaced with the highest ranked evaluated design element.

The process may then be repeated for another template or template slot.

Certain processes will now be described with reference to linking colors of design elements and items. As similarly, discussed above, a rule may be defined which links a design element to one or more item (e.g., garment) colors. The link may be negative link (e.g., specifying that a design element color may not be used with specified item colors) or a positive link (e.g., specifying that a design element color must always be used with a specified item color). Optionally, reverse linking may be provided, specifying that an item color may only be used with certain design elements. Optionally, multiple design elements may be linked to a color rule, where if a certain item color is chosen, the multiple design elements may not be used.

For example, a rule may state that if a user selects a design element whose color (e.g., whose predominant color) is the same or similar to the current item color of the item being customized, the item color will be automatically changed to a different color (e.g., a color that is complementary/opposite to and different than the selected design element color). For example, complementary/opposite color pairs may include, according to the RGB additive color model or CMY subtractive model, red-green, yellow-purple, and blue-orange, black-white. By way of further example, according to opponent process theory, the most contrasting color pairs are red-green, yellow-purple, and blue-orange.

Such links of design element colors may ensure that a design element selected to customize an item will be visible against the color of the item being customized. By way of further example, such links may ensure that certain design elements will not be used with an item color that the design element finds objectionable (e.g., where the design element may be a sports team log, and wherein prohibited item colors may be those colors of another team).

Optionally, if a user is enabled to customize a slot with a user-provided image, the image color palette may be analyzed to determine whether the color of the user-provided image will be visible against the color of the item being customized.

Color similarity may be determined one or more different techniques.

For example, a measurement of color similarity may be based on the closeness in the HSV (Hue, Saturation, and Value) color space, the HSL (hue, saturation, lightness or luminance) color space, the CIELAB color space, and/or other color space.

By way of further example, a measure of color distance may be determined in RGB space, using the following formula:

$$\text{Distance} = \text{Square Root}((R2-R1)^2 + (G2-G1)^2 + (B2-B1)^2)$$

By way of further example, the CIEDE2000 Color-Difference formula may be utilized.

By way of yet further example, color histograms may be generated for each design element, and the design color histogram may be compared to that of item colors to determine if the color distance rule is satisfied.

Thus, for example, a rule may specify that the color distance of a design element from an item color must be greater than a specified threshold value to be utilized.

By way of illustration, when a user selects a template slot to customize via a computer aided design customization user interface, the corresponding color rules associated with the item color may be accessed from memory. The associated design element collections associated with the slot may be accessed from memory and presented via the user interface, with an indication as to which design elements may not be used with the current item color (e.g., where the indication may be provided by greying out or fading the prohibited design elements, where the prohibited design elements may be crossed out, and/or otherwise). If the user selects a different item color from an item color menu presented via the user interface, the corresponding color rules may be accessed and an indication as to which design elements may not be used with the new item color may be provided in real time. The resulting populated template may be printed or embroidered on an item (e.g., a clothing item, backpack, or other item).

Figure 6:
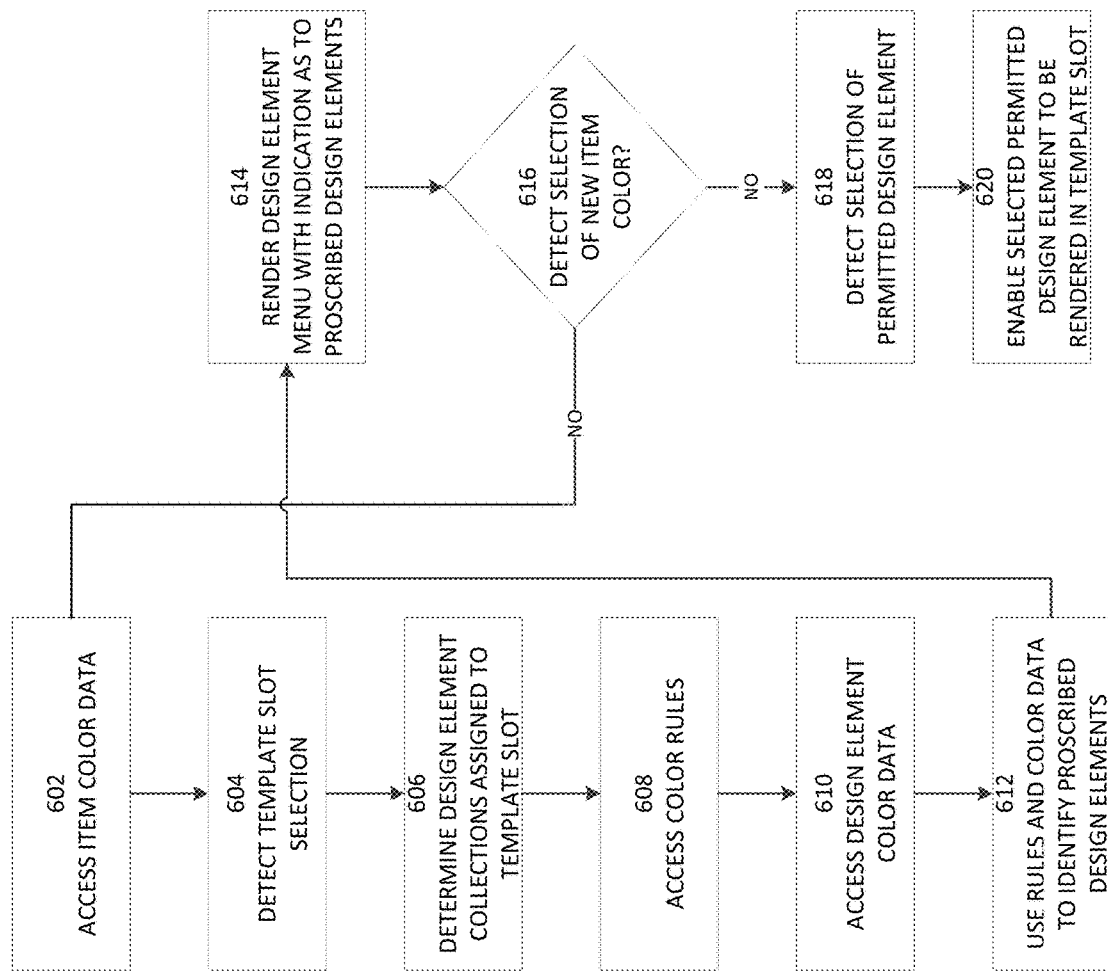

FIG. 6 illustrates an example process for implementing color linking. At block 602, an item being customized by a user via computer aided design system is detected and the associated color data (e.g., item RGB values, CMY values, HSV values, HSL values, CIELAB values, other color space values, a color histogram (e.g., generated using the color space values), color clustering data, and/or other color data) is accessed from memory. For example, the user may have selected the item from an interactive online catalog and may be customizing the item via a computer aided design customization user interface using a template as described elsewhere herein. At block 604, the process detects a user selection of a template slot. At block 606, based at least in part on the slot detection, the application determines what collections of design elements are assigned to the selected slot for template slot customization.

At block 608, color rules associated with the item color and/or the design elements in the collections assigned to the selected slot are accessed from memory. For example, the color rules may specify for a given item color what colors of design elements may not be used with the item color. By way of further example, the color rules may specify for a given item color what colors of design elements must be used with the item color.

At block 610, color data associated with the design elements assigned to the slot is accessed from memory. Color data may include RGB values, CMY values, HSV values, HSL values, CIELAB values, other color space values, a color histogram (e.g., generated using the color space values), color clustering data, and/or other color data.

At block 612, a determination is made, based on the item color data, the design element color data, and the color rules, as to which design elements may not be used with the current item color.

At block 614, a menu of the design elements from the collections assigned to the selected slot are enabled to be rendered on the user device, where an indication may be provide as to which design elements may not be used with the current item color. The indication may be provided by greying out the proscribed design elements, with a graphic overlaying or adjacent to the design element, via a text notification, or otherwise. Optionally, if the user selects a proscribed design element to customize the select slot, the design element will not appear in the slot, or will display in slot momentarily and then be removed from the slot, or will be displayed in the slot with an indication that the item may not be ordered or manufactured unless either the design element is changed or the item color is changed. Optionally instead, proscribed design element will not be displayed in the design element menu.

At block 616, a determination is made as to whether the user has selected a different item color (e.g., from an item color menu presented via the computer aided design customization user interface). If a determination is made that the user has selected a different item color, the process may proceed back to block 602, and the new item color data may be accessed, associated color rules may be accessed, and so on.

If a determination is made that the user has not selected a new item color, at block 618, a determination is made that the user has selected a permitted design element from the menu of design elements assigned to the slot. At bock 620, the selected permitted design element is enabled to be rendered on the user device in the selected template slot. The user may then order the item customized using the user customized template, the print/embroidering instructions corresponding to the customized template may be transmitted to a printer/embroidering machine, and the customized template may be printed/embroidered on the item accordingly.

In order to facilitate user customizations of an item a search function may be provided that enables a user to search for design elements assigned to a template slot.

Figure 7:
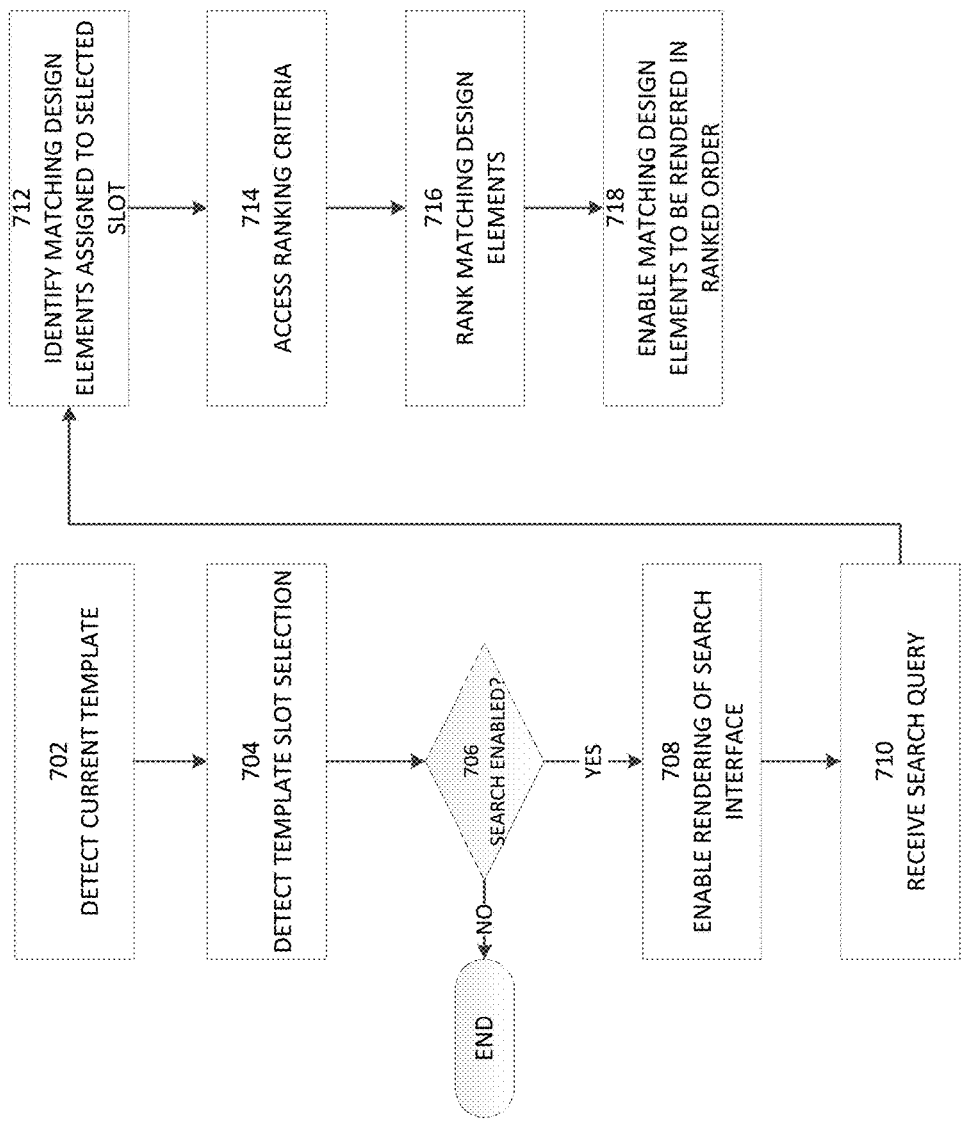

FIG. 7 illustrates an example search process. A user may have selected an item from an interactive online catalog and may be customizing the item via a computer aided design customization user interface (rendered via a browser accessing a webpage or a dedicated customization application) using a template as described elsewhere herein. The template may include multiple user-customizable slots. A given slot may have one or more associated collection of design elements. Different slots may optionally have different associated collections of design elements.

At block 702, the process detects the current template being used to customize the item. At block 704, a user slot selection is detected (e.g., by the user touching a portion of a rendering of the item corresponding to the slot). At block 706, a determination is made as to whether design element search has been enabled for the selected slot (e.g., enabled by an administrator). If search is not enabled, the process may end. If search is enabled for the slot, the process may proceed to block 708.

At block 708, a design element search interface is rendered on the user device. For example, the search user interface may include a text field configured to receive a textual query and/or search filter controls (activation of which may correspondingly limit the search). At block 710, the search query is received. At block 712, design elements associated with the selected slot may be searched for based on the search query via a search engine, where the search or search results may be limited to the collections of design elements associated with the selected template slot (and not the design elements assigned to different template slots). For example, the query terms may be compared by the search engine to metadata associated with the design elements to identify one or more design elements with one or more items of metadata that match one or more query terms.

At block 716, search ranking criteria are accessed and used to rank the search results. For example, the criteria may include the quantity of items of metadata that match the query terms, whether the first query term is matched, whether the second query term is matched, the popularity of the design element (e.g., as determined using techniques described herein), the amount charged for use of the design element in customizing an item, the royalty due to another entity for the use of the design element, and/or other criteria. Optionally, the ranking criteria may be utilized to generate a matching score for each matching design element, and the matching score may be used to rank the matching design elements.

At block 718, the matching design elements may optionally be displayed on the user device in the determined rank order. Optionally, only a certain number of matching design elements are displayed (e.g., the top ranked 3, 5, 10, 20 or other number of matching design elements). Optionally, only design elements having a matching score above a threshold score are included in the search results displayed on the user device. The user may then select a design element from the search results for customizing the selected template slot. The design element may then be displayed in the selected template slot. The resulting populated template may be printed or embroidered on an item (e.g., a clothing item, backpack, or other item) via a corresponding printer or embroidering machine as similarly discussed elsewhere herein.

Optionally, if an end user customizes a template (e.g., by providing or selecting images, graphic, and/or text for one or more slots), the end user may assign one or more labels (e.g., a hashtag and/or descriptive name) to the customized template. The template may optionally be associated with a specific item, such as a t-shirt or which may be used on different types of items, such as a t-shirt, hoodie, or backpack.

For example, if an end user designed or customized a template for a holiday, such as Halloween, the end user may add a label #Halloween or #scary. Optionally, an end user may assign a label to a given end user-provided design element. For example, an end user may assign a label #basketball to a basketball design element. Optionally, an end user customized template may be associated with multiple end user-provided labels.

Optionally, an end user customized template may be associated with an end user-provided label, and each end user-provided design element that populates a given customized template slot may also be associated with an end user-provided label. Thus, for example, if an end user customized a template to be sports oriented, the template may be assigned a label #sports and if a design element used in the template is a basketball, the design element may be labeled #basketball.

The end user's customized template may then be made available to other end users for their use and/or further customization/modification via an online catalog, dedicated application, or via a link posted to a social media site or microblog. Other end users may search for templates of interest by entering a textual or image search term into a search field or by selecting a predefined search term.

For example, an end user may be able to select a predefined search term from a list/menu of search terms. The list/menu of search terms may include a set of the most searched terms, such as the 5 or 10 most searched terms over a given period (e.g., the past hour, the past day, the past week, the past month, the past year, or other time frame). In response to a search query, a search engine will identify matching end user template designs and/or design elements (and optionally non-end user designs) and display them in a set of search results. The end user may select a desired template or design element from the search results and use it to customize an item (optionally with further customization of template slots or colors by the end user).

Optionally, the end user-provided labels may be used to create predefined categories (directed to related subject matter) of an online catalog that an end user can access via a table contents menu (where a given category may be assigned a name that is the same or similar to the labels of the included end user customized templates or end user-provided design elements). For example, end user customized templates with the label #anniversary may be organized into an anniversary category, and end user customized templates with the label #birthday may be organized into a birthday category. The end user may select a desired template from a given category of end user designed templates and use it to customize an item (optionally with further customization of template slots or colors).

Optionally, two or more template slots of the same template or of different templates may be linked. For example, two slots may be linked wherein, based on a user selection or provision (e.g., upload) of a first design element (e.g., an image, text, graphic, etc.) to populate a first slot, a linked second slot is automatically populated with a second design element paired with the first design element. By way of further example, three slots may be linked wherein, based on a user selection or provision of a first design element to populate a first slot (e.g., selected from one or more collections assigned to the first slot), a linked second slot is automatically populated with a second design element, and a linked third slot is automatically populated with a third design element (wherein the first, second, and third design elements may be grouped as a triplet). Optionally, two or more slots may be linked in a mirrored fashion, wherein based on a user selection or provision of a first design element to populate a first slot (e.g., selected from one or more collections assigned to the first slot or uploaded by the user), a linked second slot is automatically populated with the same first design element (optionally, scaled in size to be larger or smaller than the depiction of the first design element in the first slot).

Thus, by way of illustration, a first slot on a template assigned to a front of an item (e.g., a t-shirt) may be linked to a second slot on a template assigned to the back of the item. Then, when a user selects, enters, or uploads a first design element (e.g., text, graphic, photograph) to populate the first slot from a collection assigned to the first slot (e.g., as described elsewhere herein), the second slot on the back of the item is automatically populated with a second design element paired with the first design element. The resulting populated template may be printed or embroidered on an item (e.g., a clothing item, backpack, or other item).

Figure 8:
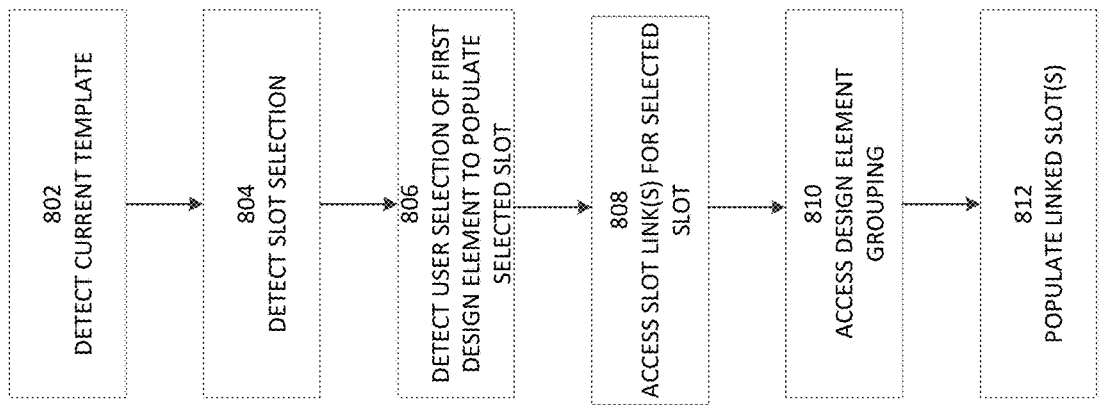

FIG. 8 illustrates an example process for implementing slot linkages to customize an item. As similarly discussed above, a user may have selected the item from an interactive online catalog and may be customizing the item via a computer aided design customization user interface (rendered via a browser accessing a webpage or a dedicated customization application) using a template as described elsewhere herein. The template may include multiple user-customizable slots. A given slot may have one or more associated collections of design elements from which a user may select. Different slots may optionally have different associated collections of design elements.

At block 802, the process detects the current template that is being used to customize the item. At block 804, a user template slot selection is detected (e.g., by the user touching a portion of a rendering of the item corresponding to the slot). At block 806, a user selection of a design element to populate the selected slot is detected. For example, the design element may be selected from a menu of collections associated with the slot. At block 808, link(s) associated with the selected template slot are accessed. As similarly discussed above, slots may be linked wherein, based on a user selection of a design element to populate a given template slot, one or more linked slots are automatically populated with pre-specified design elements.

At block 810, a design element grouping is accessed for the selected design element. The design elements in the design element grouping may then be used to populate the respective linked slots. Optionally, each design element in the design element grouping may be associated with corresponding metadata that indicates which template slot the design element is to populate. The resulting populated template may be printed or embroidered on the item (e.g., a clothing item, backpack, or other item) via a corresponding printer or embroidering machine as similarly discussed elsewhere herein.

Optionally, to further facilitate the customization of an item using a template, a form comprising fields mapped to template slots may be utilized. Advantageously, the user of such a form reduces that amount of processor device bandwidth utilization as compared to a real time interactive touch-based graphical interface.

For example, if a template is being used for a college sports team sweatshirt, an associated template form may include a field (e.g., a menu or text field) for a school name, a field (e.g., a menu or text field) to designate a team type (e.g., baseball, football, hockey, swimming, soccer, etc.), a field (e.g., a menu or text field) for a player name, and a field (e.g., a menu or text field) for a favorite color. Where menus are used, one or more menus presented to the user may be selected based on a user selection from another menu. For example, a school name, in a menu of school names, may be selected by a user. Based on the user selection, a menu of team types, corresponding to the team types that exist at the selected school, may be selected and presented to the user. Based on a user selection of the team type, a menu of the player names from the corresponding team type may be presented. Thus, based at least in part on a user selection of an identifier (e.g., a school name, team types, etc.,) from one menu, another menu may be selected from a set of menus and associated with another field. The form may be presented in an Iframe in conjunction with a computer aided design customization user interface that displays an image of an item being customized via a template.

The template may include a slot for a team logo, a slot for a player name, and a slot for a player number. The school name designated via the school field name may be utilized to select and access a school record from a database, and in turn, a team logo may be identified in the accessed school record. The identified team logo may be used to populate the team logo slot. The team type designation may be used to access a roster of players for that corresponding team type of the corresponding school, where each name in the roster may be associated with a corresponding player name. The player name may be used to identify the corresponding player number, and the identified player number may be used to populate the player number field. The color designated via the favorite color field may be used to determine the item color and/or the color(s) of the team logo, player name, and/or player logo displayed on the user device. The form may be used, for example, by the college to design their clothing or other items, which may then be offered to fans. By way of further example, the form may be used by a consumer. The resulting populated template may be printed or embroidered on an item (e.g., a clothing item, backpack, or other item).

Figure 9:
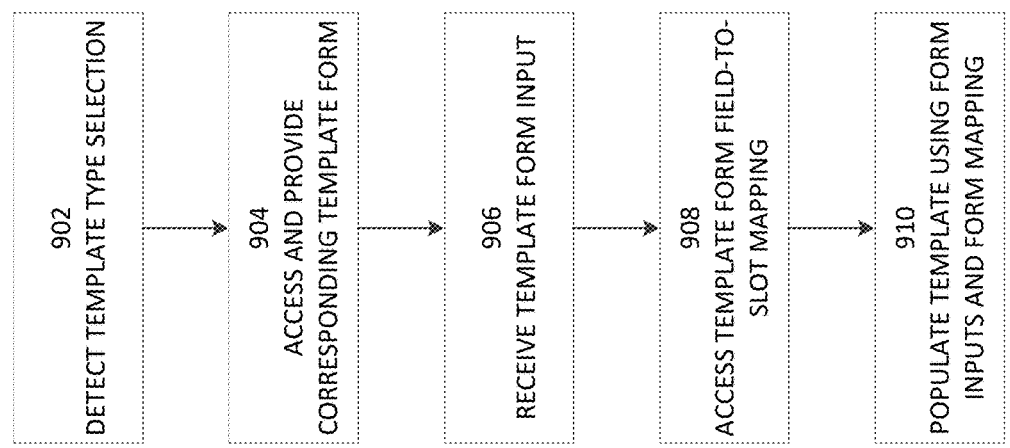

FIG. 9 illustrates an example process of utilizing a form to populate a template which may be used to customize an item. The process may be used, for example, by an administrator/designer or by a consumer/end user.

At block 902, the process detects a template selection. The template may have been selected by the user from a menu of templates, or the template may be associated with the item selected by the user from the interactive catalog, or the template may be associated with a link activated by a user. The template may be populated with design elements (which may be generic design elements) to provide an indication as to what types of design elements will be used to populate respective slots.

At block 904, the corresponding template form may be identified, accessed from memory, and provided for display on a user device. As similarly discussed above, the template form may include text fields, image fields, and/or menus configured to receive users inputs. At block 906, user inputs are received via the template form. For example, the inputs may be received as text entries, image uploads, and/or menu selections At block 908, a field-to-template slot mapping corresponding to the selected template and template form is selected. The mapping indicates which user form field inputs are to be used to determine what design element is to populate which slot. In certain cases, two or more form field inputs may be used in determining what design element is to populate a slot. For example, if the template is being used for a movie property, a movie name field and a movie character name field may be used to access an image of the character from the movie from a data store for populating a template character slot. At block 910, the template slots may be populated with corresponding design elements. The populated template may be displayed on the item via the user service. The populated template may be stored in memory with a corresponding name. Where the user is an administrator, the populated template may be automatically or manually published on an online interactive catalog. Optionally, an end user may purchase an item customized with the populated template. Optionally, the end user may be enabled to further customize the template as similarly discussed elsewhere herein. The resulting populated template may be printed or embroidered on an item (e.g., a clothing item, backpack, or other item) as similarly discussed elsewhere herein.

Optionally, various templates may be provided for various purposes (e.g., for a school sports team, a band, a television series, a movie, etc.). The templates may be unpopulated, but may have various slots designated for corresponding design elements. For example, a sports team template may include a slot for a team logo, a slot for a player name, and a slot for a player number. An entity (e.g., a sports league) may tag its design elements with corresponding tags for each player in the league. The corresponding design elements may be automatically be imported from the entity's data source and used to populate the template for each player. Consumers may then purchase an item populated with the design elements for a given team player. This process enables an entity to quickly use the same template to create various iterations with different sets of assets (design elements) of the entity.

Figure 10:
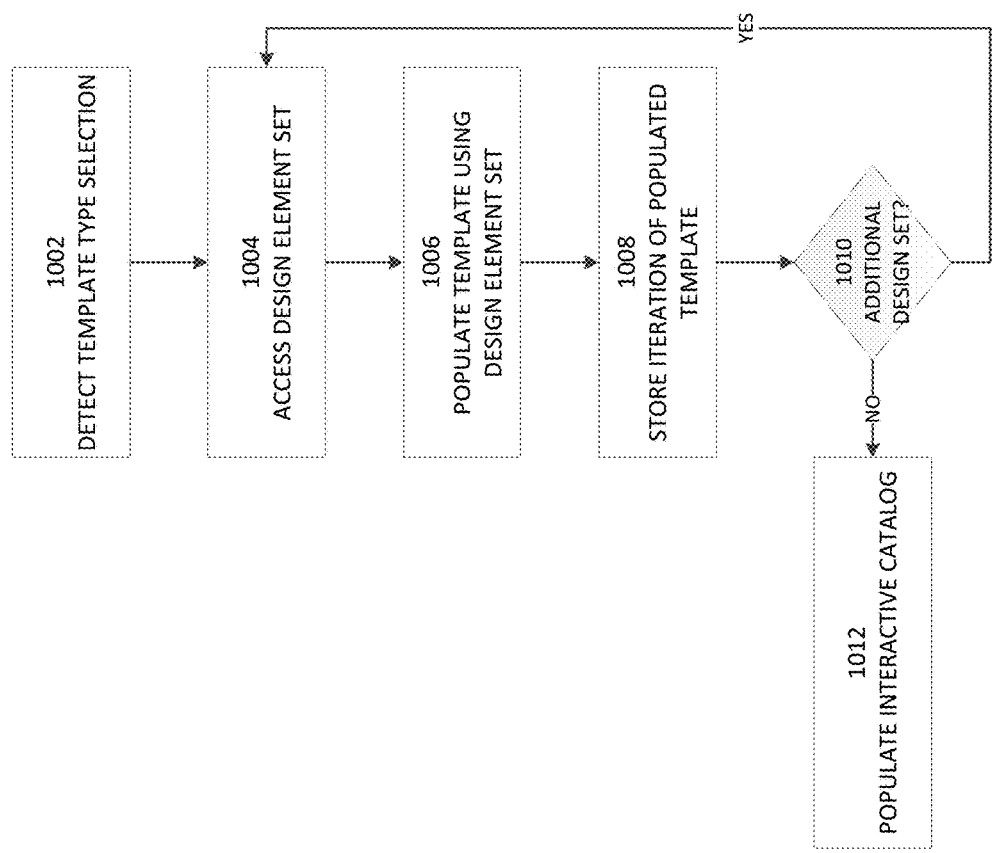

FIG. 10 illustrates an example process of populating iterations of a template using a plurality of design set. The process may access a data store of sets of design elements, wherein a given set of design elements is used to populate an iteration of the same template. At block 1002, the process detects a template selection. By way of example, the template may have been selected by the user from a menu of templates, or the template may be associated with a link activated by a user. At block 1004, a design element set to be used to populate an iteration the template is accessed from memory. At block 1006, the design element is used to populate the template. Optionally, the populated template is displayed on a user device. At block 1008, the populated template is stored in memory with an associated name. At block 1010, a determination is made as to whether another design element set remains to be populate another iteration of the template. If there is another design element set, the process may proceed to block 1004, and the process repeats. If all the design element sets have been used to populate an iteration of the template, some or all of the populated iterations of the template are used to populate an interactive online catalogs. An end user/consumer may access the catalog and may use an iteration of the template to customize an item. The template iteration may be printed or embroidered on an item (e.g., a clothing item, backpack, or other item) as similarly discussed elsewhere herein.

To further enhance a consumer's experience in customizing an item, optionally, a given design element and/or a template slot may be linked to a relevant item of video content which may be played back via a the computer aided design customization user interface (described elsewhere herein) used to customize an item. For example, if a design element (selected from a collection of design elements assigned to a template slot) is a face or player number of an athlete, the design element may be linked to a video of a famous performance of the player or of a game at which the image of the athlete was captured. A control (e.g., a play control overlaying the design element or positioned adjacent to the design element) may be provided in association with the design element which when activated causes the linked to video to be accessed (streamed or downloaded) and played back via a video player embedded in the computer aided design customization user interface. Thus, optionally, the user is presented with both the template being customized and the linked video (optionally overlaying an item being customized) to provide a multimedia experience.

Figure 11:
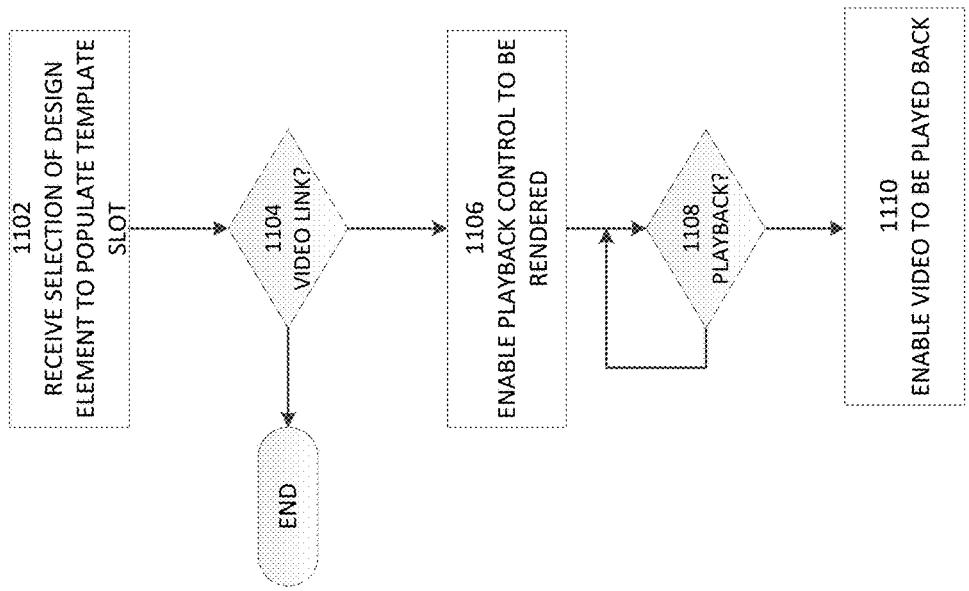

FIG. 11 illustrates an example process for displaying video content linked to a design element used to customize a template. As similarly discussed above, a user may have selected an item from an interactive online catalog and may be customizing the item via a computer aided design customization user interface (rendered via a browser accessing a webpage or a dedicated customization application) using a template. A given template slot may have one or more associated collection of design elements. Different slots may optionally have different associated collections of design elements from which the user may select in order to customize the template.

A user may be accessing a computer aided design user interface via a user device. At block 1102, a user selection is received of a design element from a menu of design elements to be used to populate a template slot via the user interface. The selected design element may be displayed at the corresponding slot location. At block 1104, the process determines if video content is linked to the selected design element. If there is not such a link, the process may end. If a determination is made that an item of video content is linked to the user-selected design element, at block 1106, the linked-to video content may be automatically played back via a playback window displayed via the computer aided design user interface or in a pop-up overlaying the computer aided design user interface. Optionally instead, a frame from the linked-to video content may be displayed in association with a video play control which the user may activate to initiate video playback. At block 1108, a determination is made as to whether the user has activated the playback control. In response to detecting that the user has activated the playback control, the video content is enabled to be played back. For example, the video may be streamed or downloaded from a remote data store to the user device for playback.

Certain aspect of allocating royalties for the use of design elements will now be discussed. A given item may be customized using design elements from multiple entities (e.g., different licensees, different brands, different sports teams, different players on a sports team, different movies, different performers, etc.). Use of a given design element may incur a royalty which may need to be remitted to the corresponding entity. Further, even a single use of even a single given design element may incur multiple royalties which may need to be remitted to corresponding entities. For example, an image of a sports team may incur royalties that need to be remitted to each player in the image, to the sports team owner, and to the league to which the sports team belongs to.

Figure 12:
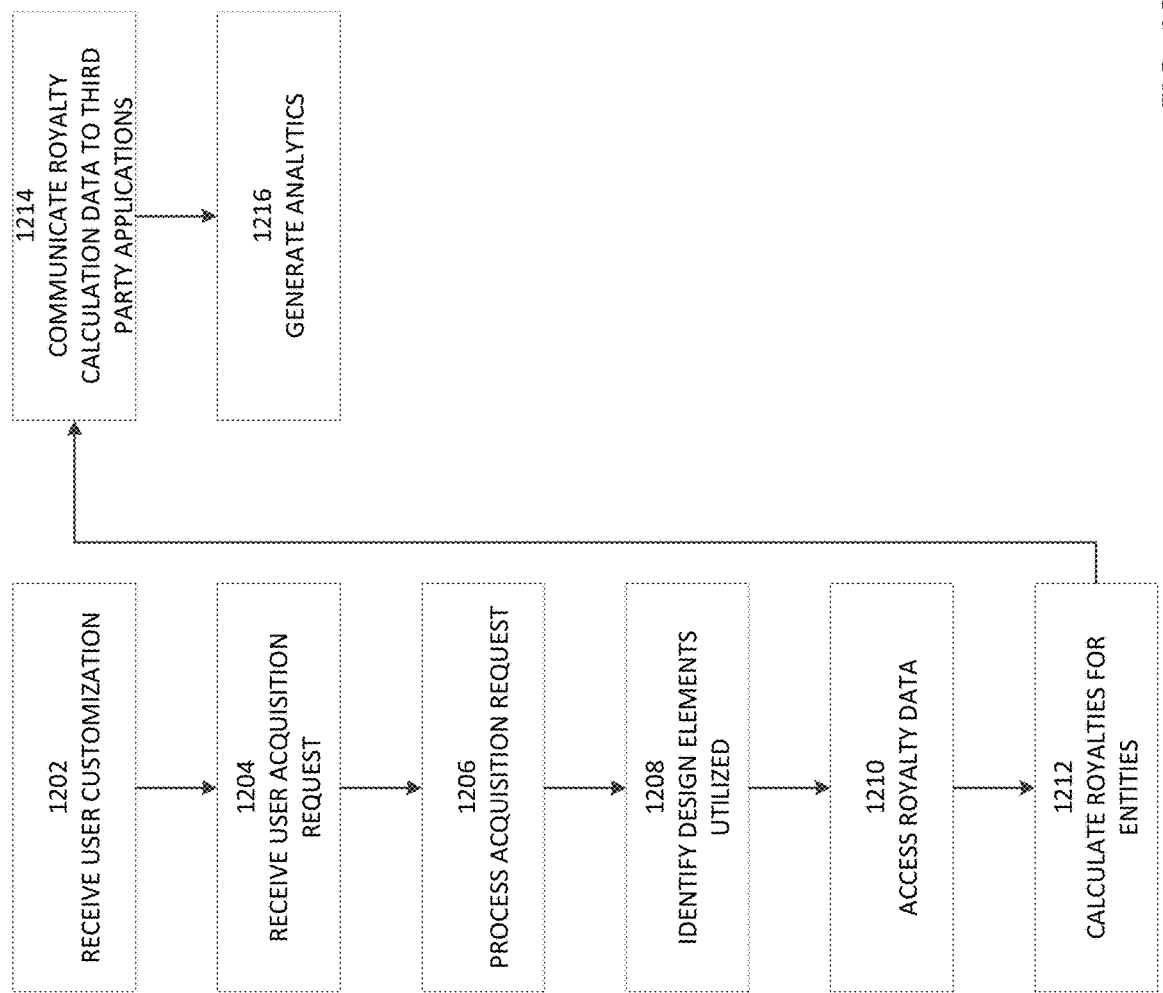

FIG. 12 illustrates an example process for royalty allocation. At block 1202, a user customization design for a product is received from a user device at the computer aided design system. For example, the customization may be performed using a template and design elements as discussed herein. At block 1204, an acquisition request (e.g., a purchase request) is received from the user of the user device. At block 1206, the acquisition request is processed. For example, the user's payment may be processed using a payment instrument of the user, and printing or embroidering instructions corresponding to the design elements may be transmitted to a printing or embroidering machine, and the design elements may be embroidered or printed on the product.

At block 1208, the design elements used in the customization may be identified for the purpose of determining royalty remittances. At block 1210, royalty data associated with the identified design elements may be accessed from memory. At block 1212, the corresponding royalties may be calculated for partners and design element providers as similarly discussed above (e.g., on a percentage or flat fee basis). At block 1214, the results of the royalty calculations are transmitted to applications hosted on one or more systems, where the calculations transmitted to the applications may be accessed by royalty recipients. At block 1216, royalty analytics may be generated, and the analytics may be transmitted as a report to one or more recipients.

Figure 13A:
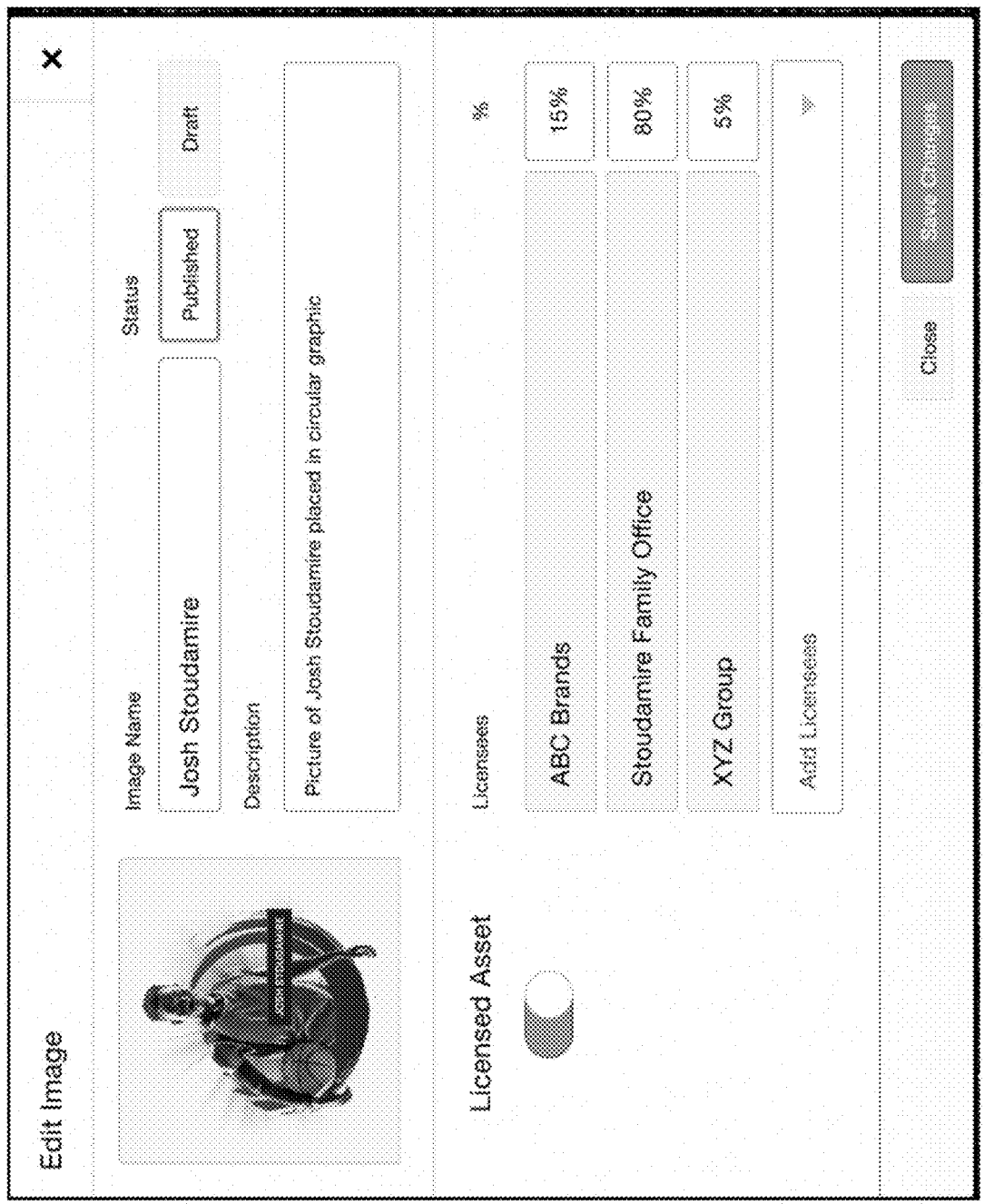

FIG. 13A illustrates an example user interface that enables royalty attributions to different entities to be specified for a given design element. The user interface may be populated in whole or in part using data accessed from a design element database. A subject design element is displayed (e.g., an image, a logo, a name, etc.). The design element may be selected from an electronic folder, uploaded from a remote source, or otherwise accessed. The design element may optionally be displayed as a thumbnail or otherwise reduced resolution version of the design element. A control is provided (e.g., a licensed asset/design element control) via which a user (e.g., an administrator) may specify that the design element is one for which royalties will be due to third parties. A name field is presented that includes a name assigned to the design element. Optionally, the user may enter or edit the name via the name field. A status indicator indicates whether the design element has already been published (e.g., to an interactive web-based and/or application-based catalog) or whether the design element is still in draft mode (unpublished). A description field is presented that includes a description assigned to the design element. Optionally, the user may enter or edit the description via the description field. A licensees pane lists the entities to whom royalties are due for use of the design element and corresponding royalty percentages or flat fees. A control is provided via which the user may add additional licensee and associated royalties. A control may be provided via which the user may delete licensees and associated royalties.

Figure 13B:
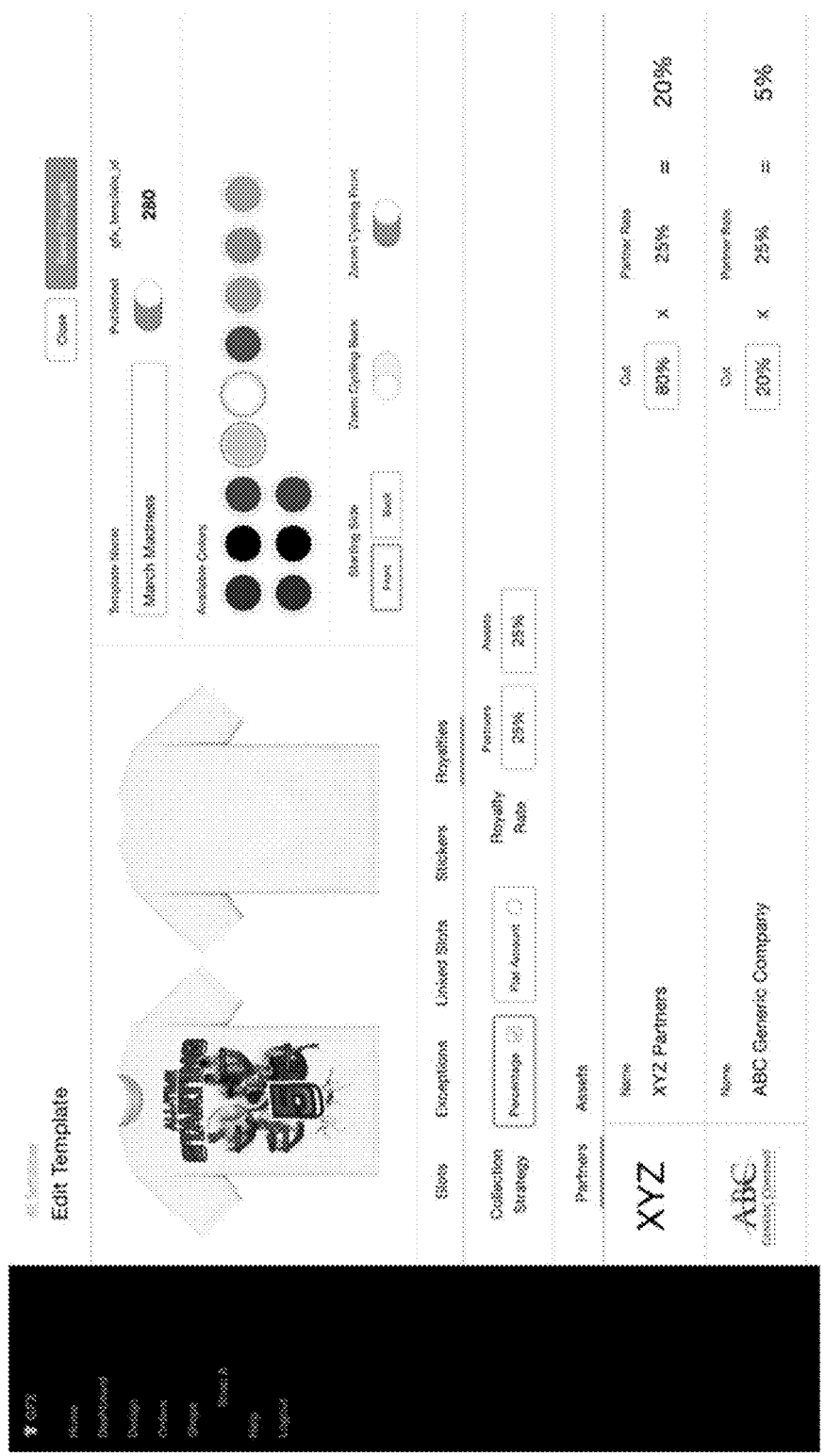

FIG. 13B illustrates an example user interface that enables royalty attributions to different entities to be specified for a given template. The user interface may be populated in whole or in part using data accessed from a template database. A subject template is displayed (optionally populated with fixed and/or default design elements). The template may be selected from a template library or otherwise accessed. The template may optionally be displayed as a thumbnail or otherwise reduced resolution version of the template. A name field is presented that includes a name assigned to the template. Optionally, the user may enter or edit the name via the name field. A unique template ID may be displayed (where the template ID may be automatically generated by the computer aided design system). A status indicator indicates whether the template has already been published (e.g., to an interactive web-based and/or application-based catalog) or whether the template is unpublished. Optionally, a description field is presented that includes a description assigned to the template. Optionally, the user may enter or edit the description via the description field.

A color palette menu is provided that indicates in which colors the template may be utilized and/or in which color items the template may be utilized. Optionally, the user may change the color selections. A starting side control enables the user to specify what side of the item (on which the template is to be used) is to be displayed as a default to end users/consumers on an interactive online catalog. A zoom cycle front and zoom cycle back controls are provided which may enable or disable a zoom cycle when the first and the back of the item are displayed via the catalog.

A collection strategy area enables the user to specify whether the royalty is to be calculated as a percentage of the item sale price or as a flat currency amount per item sold using the template. If the user selects the percentage option, one or more royalty percentage rate fields are displayed. For example, an asset royalty percentage field and an asset royalty percentage field enabling different royalty rates to be set for different partners and for owners of the design elements (also referred to as assets) used on the template. If the user selects the flat amount option, one or more flat amount fields are displayed (see, e.g., FIG. 13C). For example, an asset royalty flat amount field and an asset royalty flat amount field enabling different royalty flat amount to be set for different partners and owners of assets A licensees pane lists the entities to whom royalties are due for use of the template and corresponding royalty percentages or flat fees. A control is provided via which the user may add additional licensee and associated royalties. A control may be provided via which the user may delete licensees and associated royalties.

Where there is more than one partner, a cut percentage of the partner royalty may be specified via corresponding fields for each partner (where the total of the cut percentages for all the partners equals 100%). Thus, for example, the percentage of a given item sale customized using the template may be calculated as Cut %×Partner %. The calculation result may be displayed via the user interface. The actual royalty due to each partner and for each asset may be calculated in response to an order for an item customized using the template being actually placed, where the calculation is based on the actual order information.

Figure 13C:
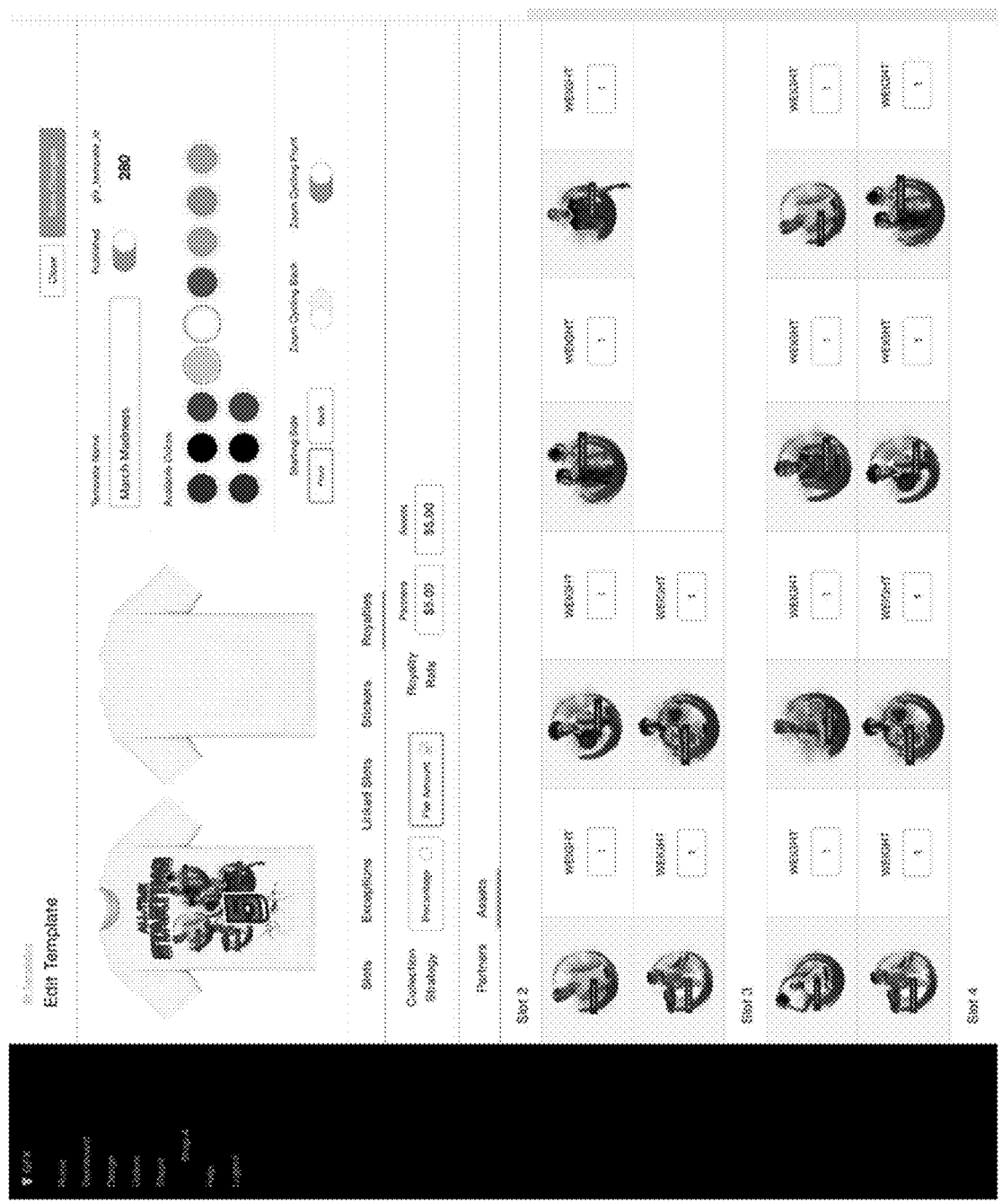
Figure 13D:
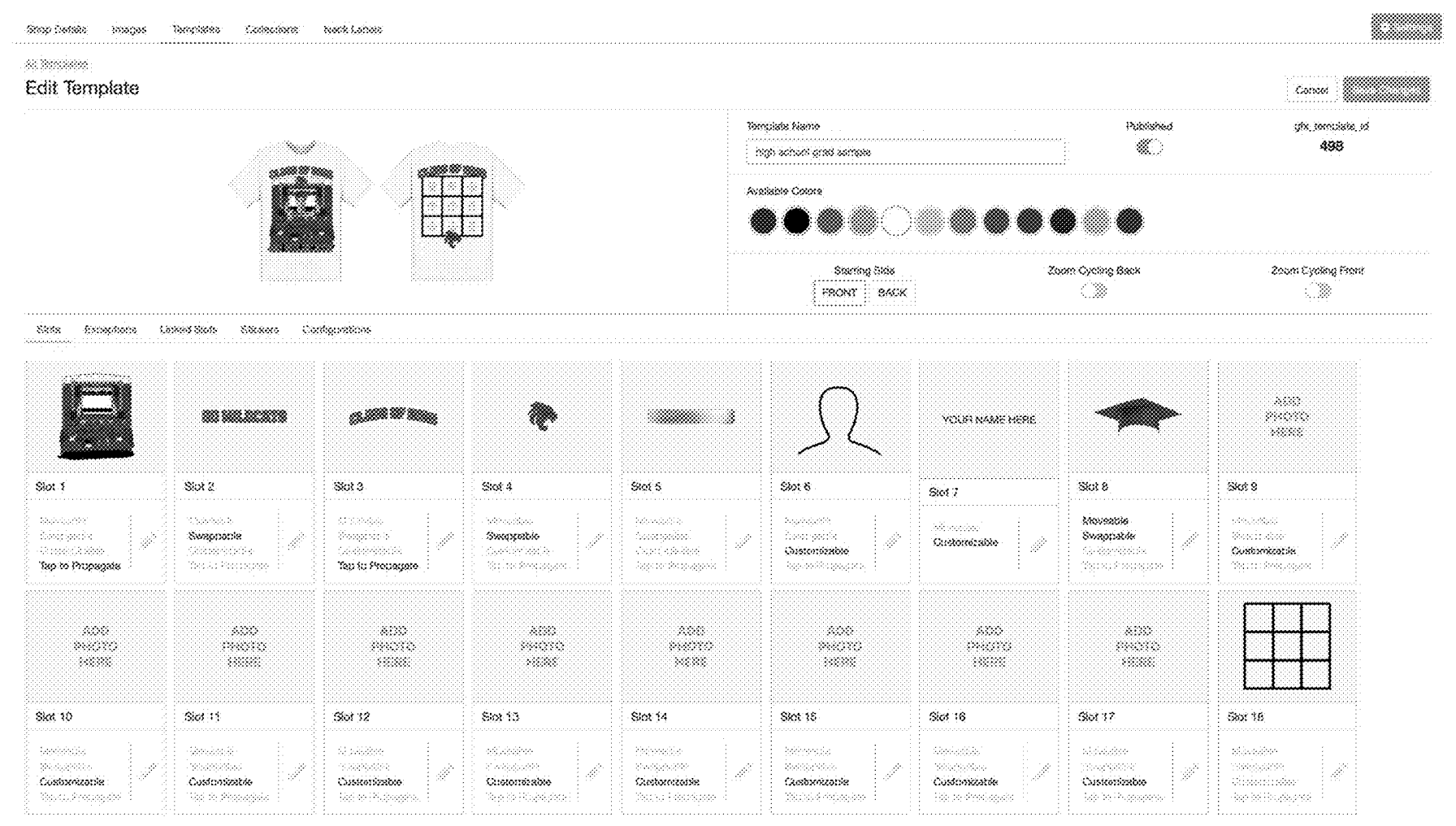

FIG. 13C illustrates the example user interface presented when the user has specified that a flat royalty is to be utilized. In this example, a flat rate for royalties has been specified instead of a percentage. In this example, for every sale of an item customized using the template, $5.00 will be remitted to the partners identified as discussed above with reference to FIG. 13B, and $5.00 will be remitted to the owners of the assets used on the template.

Different weights may be assigned to different assets. The weights may be used to determine what percentage of the amount designated for asset owners ($5.00 in example) is to be remitted to the owner of each asset being used on the template. Thus, the weights may be used to enable a different royalty payout to be designated for each asset.

In this case, a basketball asset is assigned a weight of "3", and each logo asset is assigned a weight of "1". Assuming the template includes 1 basketball design element and 4 logos, the owner of the basketball asset is remitted: $2.14, a value calculated using the following formula:

$$(\text{Weight of Asset/Total Weight of All Assets}) * \text{Royalty Rate of Assets} = (3/7) * (\$5.00)$$

To more accurately and quickly generate a template, the template slots/design areas may be automatically be populated (as opposed to having to manually populate the entire template), in whole or in part, from an image file. An interface (e.g., a user interface of API) may be provided via which a user (e.g., an administrator) can upload a file (e.g., a layered image file, such as an ADOBE PHOTOSHOP PSD file, including a file header section, color mode data section, image resources section, layer and mask information section, and image data). The upload may be from a user device or from a data store for which a link is received. For example, template slots may use design elements from the image file as default design elements.

Further, such image file upload and importation enables a pixel perfect default design (where design elements in the image file are placed with less than 0.1 inch deviation in the template, and more preferably, with less than 0.05 inch deviation). By way of illustration, the system may parse the image file to identify image and text assets in the image file. Template slots may be created and populated based on the identified image and text assets in the image file. Optionally, the populated slots may be later edited by an administrator and/or end user (e.g., replaced with another design element) as similarly discussed elsewhere herein (e.g., in accordance with associated customization permissions). The images and text included in the image file may be organized into multiple folders (e.g., one for the front side of an item design, one for a rear side of an item design, etc.) corresponding to two or more design sides. A given folder may include multiple layers, wherein a given layer includes a single image or text asset that will later become a slot.

Conventional manual techniques for creating a template from an image involve manual definition of slots and manual placement of design elements/assets in corresponding slots. In addition to being time consuming and requiring computer resources such as displays, mice, keyboards and other computer resources, such manual definition of template slots often results in inaccurate placements of slots as compared to the placement of assets in the source image. Further, conventionally, design elements may often be assigned to the wrong slots.

By contrast, an aspect of the present disclosure enables a template to be quickly, accurately, and efficiently generated from a layered image file. By way of illustration, the layers in a layered image file (e.g., an ADOBE PHOTOSHOP PSD file) may be uploaded as separate images/files. Each layer may include a design element (sometimes referred to as an asset), such as an editable or non-editable design element or an image (e.g., a photograph, a graphic element, other design element-type described herein, and/or the like). Optionally, a design element may be in one or more formats (e.g., PNG-8, PNG-24, PNG-32, GIF, JPG, SVG, or the like). Optionally, for certain formats, the design element quality may be scaled down (e.g., using a value in the range of 0-100%). Optionally, one or more JPEG, PNG, or GIF image assets may be generated from the contents of a layer or layer group. Optionally, design elements extracted from the layered image may be stored in a folder or subfolder with the source layered image file.

As discussed above, a given layer may be used to create a corresponding template slot, where the design element in the given layer may be used to populate the slot at the same location (e.g., with respect to the borders of the original layered image) as in the imported source layered image. Thus, a newly generated template may include a slot corresponding to each layer in the source layered image file, with each slot populated with a design element from the corresponding template.

Optionally, a given template slot's dimensions may be sized to automatically correspond to the size of a design element (e.g., an image or text) in the respective layer.

As similarly discussed above, the layers of the layered image file may be assigned to an appropriate folder corresponding to a template side. For example, if the template is intended to be used on a t-shirt or other clothing item, the layers may be assigned to a "front" folder (corresponding to a template for the front side of the t-shirt) or a "back" folder (corresponding to a template for the back side of the t-shirt). If the template is intended for a six-sided product (e.g., a block), there may be six folders for respective sides, and the layers may be stored in the appropriate side file. Optionally, a given single template may include slots for each side of an item, thereby reducing the amount of memory utilization that would otherwise be needed to store multiple separate templates (where each template has associated overhead, such as name, metadata, etc. Optionally instead, each side may be associated with a separate corresponding template, thereby providing enhanced customization flexibility.

A given design element/asset may use RGB, CMYK, Grayscale, or other color format. A text layer (which may be oriented vertically or horizontally) may be associated with some or all of the following metadata:
Font name
Font size
Style (e.g., bold, italic, faux bold, faux italic, etc.)
Color
Tracking (character spacing)
Leading (spacing between base lines)
Paragraph settings:
  Alignment
  First line indent, left indent, and right indent
  Space before and space after Optionally, a user interface may be presented that enables a user to assign a given layer of the layered image file to the corresponding template-side file. Optionally, a given layer of the layered image file may be automatically assigned to the correct file based on the layer name (e.g., which may have been assigned a name that includes the a side identifier, such as "front," "back," etc.).

Optionally, each layer of the layered image file may be automatically or manually renamed upon uploading. Optionally each image may be named using some or all of the layer name (which may be an alphanumeric name). Optionally, a layer may be renamed so that the name includes some or all of the original file name and text specific to the layer (e.g., which describes the asset in the layer image, the template side, the source entity, and/or the like). Optionally, the new name may include a slot number corresponding to the slot created from the layer.

Advantageously, a given design element in a given layer of the layered image file may remain editable in terms of color correction, effects, masking, transparency, or compositing.

Optionally an imported layered image file, or a layer thereof, may be retained as a bitmap. Optionally, an imported layered image file, or a layer thereof, may be vectorized and stored as a vectorized file.

The resulting newly generated template may be edited, managed, and used to customize items, as similarly discussed elsewhere herein with respect to templates generally, and as described in U.S. application Ser. No. 16/690,029, filed Nov. 20, 2019, titled COMPUTER AIDED SYSTEMS AND METHODS FOR CREATING CUSTOM PRODUCTS, the contents of which are incorporated herein in their entirety. For example, slot design elements may be replaced with other design elements, design element image properties may be modified (e.g., color, hue, saturation, and value, brightness, contrast, text), etc.), text may be replaced or edited, slots may be moved, the size of design elements and/or slots may be modified, and/or the like.

For example, permissions may be specified as to what template assets are default design elements, which slots may be modified using which collections of design elements, which slots may be modified by an end-user (e.g., a consumer), which slots may be modified by an end-user using content provided by the end user, which colors of which assets in a slot may be changed to which colors, which assets may not be used together, which assets may be resized by an end user, etc.

Optionally, a user may be enabled to specify via a user interface what item(s) the template may be used on. For example, a checkbox user interface may be provided via which a user (e.g., an administrator) may check off or otherwise indicate from a list of items which item the template may be used on. For example, a checkbox user interface may list "t-shirt," "shirt," "hoodie," and "phone case." When the template is later made available on an interactive catalog, an end user may be presented with a user interface listing the checked items. The end user may then select one of the listed items, and the template will be displayed on an image of the selected item. The user may then further customize the template in accordance with associate permissions, as similarly discussed elsewhere herein, and then order the item with the template printed or embroidered on the selected item.

Figure 14:
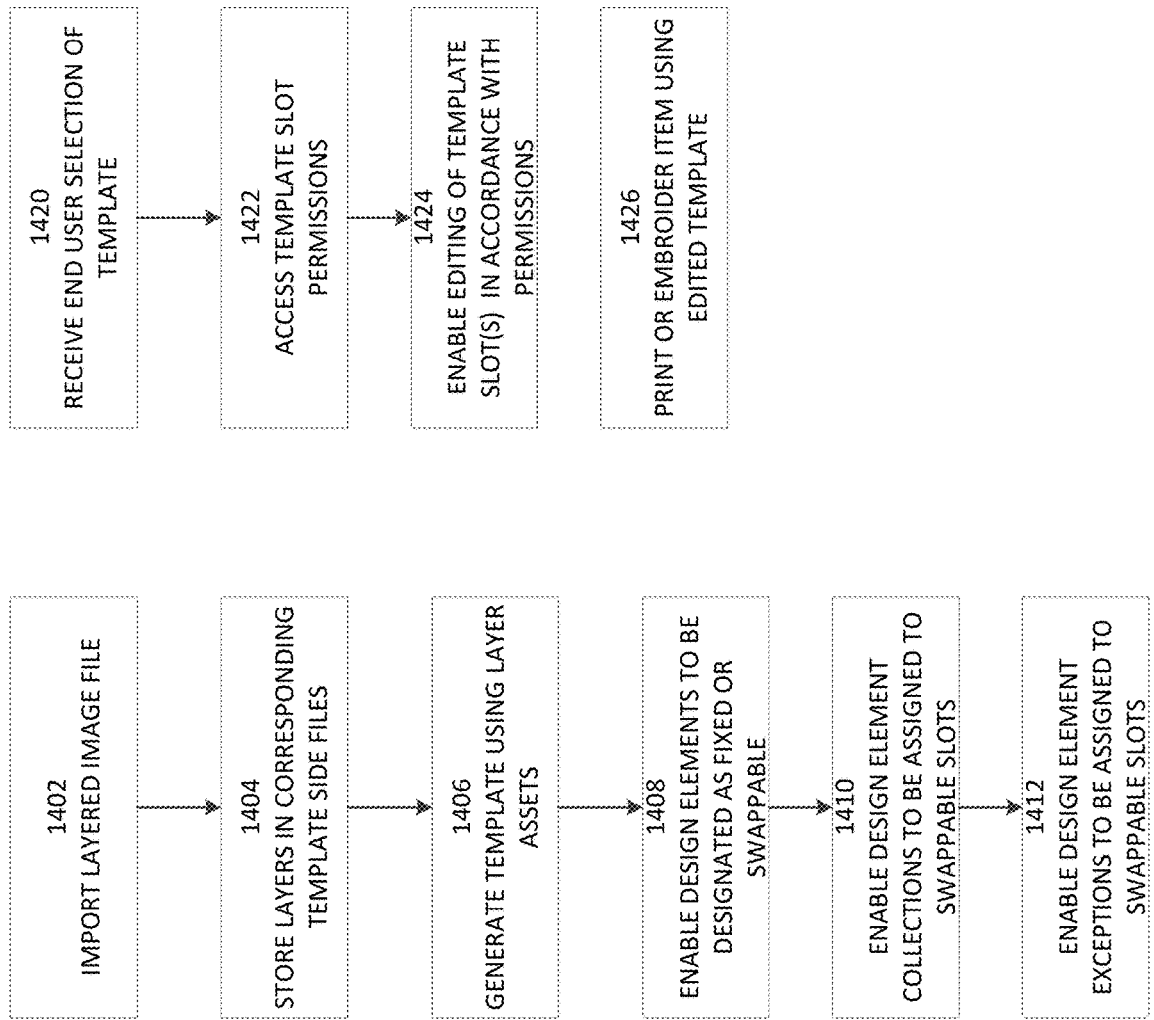
FIGS. 14-24 illustrate example processes.

Referring now to FIG. 14, an example process is illustrated for utilizing a source layered image file for creating a template, where the template may be used to customize an item (e.g., a clothing product, such as a t-shirt, a backpack, a phone case, a mug, or other specified item), as described elsewhere herein. At block 1402, a layered image file is imported. For example, the layered image file may be imported from a user device (e.g., a desktop computer, laptop computer, tablet computer, mobile phone, smart television, dedicated CAD terminal, a wearable device, or other computing device) or from a cloud-based storage system specified by the user. Optionally, each layer may be uploaded as a separate file.

At block 1404, the imported layer files may be stored in respective CAD system files. For example, each CAD system file may correspond to a template side (e.g., a back file, a front file), and the corresponding layer file may be stored in the corresponding template-side file. If there are separate templates for each side, a given layer file may be stored in a respective template file. The storing of a layer file may be performed automatically, based at least in part on the layer name. For example, the creator of the layered image file may include in a given layer name a corresponding side name (e.g., front, back, left_side, back_side, top, bottom, etc.), which then may be used to routed and store the layer file in the correspondingly named template-side file (e.g., front, back, left_side, back_side, top, bottom, etc. Optionally instead, a user interface may be provided that enables a user to drag and drop a layer for a given side into a corresponding file or that otherwise enables a user to cause a layer to be stored into the into a corresponding file.

At block 1406, a template is created, where a template slot may be defined for each layer (or optionally a subset of layers), and a respective design element/asset from the corresponding layer may be used to populate the slot (e.g., as a fixed or swappable design element).

At block 1408, the generated template may be displayed on a user device, with the corresponding layer design elements/assets displayed at the appropriate slot locations. Controls may be displayed via which a user (e.g., a designer/administrator) may specify whether another user (e.g., an end user, such as a consumer/prospective item purchaser) may be enabled to swap/switch the design element from the corresponding layer populating a given slot (which may be designated as a default design element for a given slot) for another design element (e.g., an end user-provided design element, such as a selfie-photograph, or from a collection of design elements).

At block 1410, a user interface is provided via which the user may assign one or more collections of design elements (e.g., logos or team player names associated with a school) to a given template slot. For example, an end user may be enabled to replace a default design element assigned to a slot with an end user-selected design element from an associated design element collection or provided by the end user.

At block 1412, a user interface may be provided via which a user may specify whether a specified first design element at a first slot may not be used at the same time as specified second design element at a second slot (which may be referred to as an exception condition). For example, an entity (which may be a sports team) may not want an old team logo to be used in a first slot with a new team logo in a second slot.

Other user interfaces may be further provided that enable additional permissions to be specified. For example, a user interface may be provided that enables a user to specify that a color of a design element may or may not be changed. Further, where the color is permitted to be changed, the user may assign permitted collections of colors that may be used. and may specify which colors may not be used together.

By way of yet further example, a user interface may specify which specific items and/or item types that are permitted to be customized using the template (e.g., t-shirt, hoodie, bomber jacket, etc.).

The template may be posted on an interactive catalog accessible by end users over a network via end user devices. For example, an end user may select an item to which the template is assigned or the user may select a template and then select an item to be customized using the template. The template may then be displayed (e.g., overlaying an image of a side of an item being customized by the end user). Where the template has slots for more than one side of the item, the image of the item may be rotatable (e.g., in response to a user rotate command, which may be provided by activating a displayed control or by making a rotate gesture on a touchscreen using to display the item image), and the corresponding assets will be displayed at the appropriate slot locations, depending which item side is being displayed.

At block 1422, associated template slot permissions and rules may be accessed from memory (e.g., the permissions and exceptions discussed above with respect to blocks 1408-1412 and/or as described in U.S. application Ser. No. 16/690,029, filed Nov. 20, 2019, titled COMPUTER AIDED SYSTEMS AND METHODS FOR CREATING CUSTOM PRODUCTS, the contents of which are incorporated herein by reference in their entirety). At block 1424, the end user is enabled to customize and edit the template in accordance with the accessed permissions and rules.

At bock 1426, the end user may order an item customized using the edited template. The ordered item may then be customized by having the design elements of the edited template embroidered or printed on the item via a corresponding printer or embroidering machine as similarly discussed elsewhere herein.

Optionally, the edited template may be used to customize a digital item (e.g., an image or video), as similarly discussed elsewhere herein.

As noted above, certain imported layer files may include text design elements. In certain instances, the text in a layer may be non-editable, while in other instances the text may be editable. For example, text may have been rasterized, where the text was converted from vectors to pixels, and so may no longer be natively editable as text characters (e.g., without converting the text to an editable format, such as by exporting the layer as a vector file). In the instances where the layer text is editable (e.g., where the text is in or is converted to vector form), the font set used in the text may be uploaded as part of or in association with the layered image file. For example, the font file may be in the form of a .otf (for Adobe Type Library fonts) or .ttf (for TrueType-based OpenType fonts). Optionally, the font file may be embedded in the layered image file.

As will be described, when a font file is associated with a layered image file (e.g., a PSD file), a determination may be made as to whether the system already has the corresponding font available in a CAD system font library (which may be used to customize template slots).

If a determination is made that the system already has the corresponding font available in a font library, optionally the font file associated with the layered image file will not be uploaded and/or stored by the system, thereby advantageously reducing network and/or memory utilization. If, instead, a determination is made that the system does not have the corresponding font available in a font library, optionally the font file associated with the layered image file will uploaded and/or stored by the system. The uploaded font file may be made available to all CAD system users in customizing template and items, or only a subset of the users (e.g., as designated by the user or entity that created/uploaded the layered image file).

The determination as to whether the system has the corresponding font available in a font library may be based, at least in part, on all or a portion of the name of the font file associated with the layered image file. For example, the name of the font file associated with the layered image file (which may include the font name) may be compared to the font names of the existing fonts in the system font library, and if a match is found, it may be determined that the system has the corresponding font available in a font library.

In instances where the text in a layer is not editable, there may not be a font file associated with the layer. In such instance, computer vision may be utilized to determine the font of the non-editable (e.g., rasterized) text in the layer, and such determination may be used to determine whether the system has the corresponding font available in a font library. If there is not corresponding font available in a font library, the system may search network resources to find a corresponding font set, which may then be uploaded and used to enable the layer text to be edited using the uploaded font.

For example, a learning engine, such as neural network (e.g., a convolutional neural network) may be trained to recognize and localize text in an image. Another learning engine (e.g., a deep neural network) may be used, optionally in association with font metadata (e.g., a font family of the font, line weight, whether font is regular, uppercase, lowercase, bold, italicized, etc.) to identify and label the font of the text.

Figure 15:
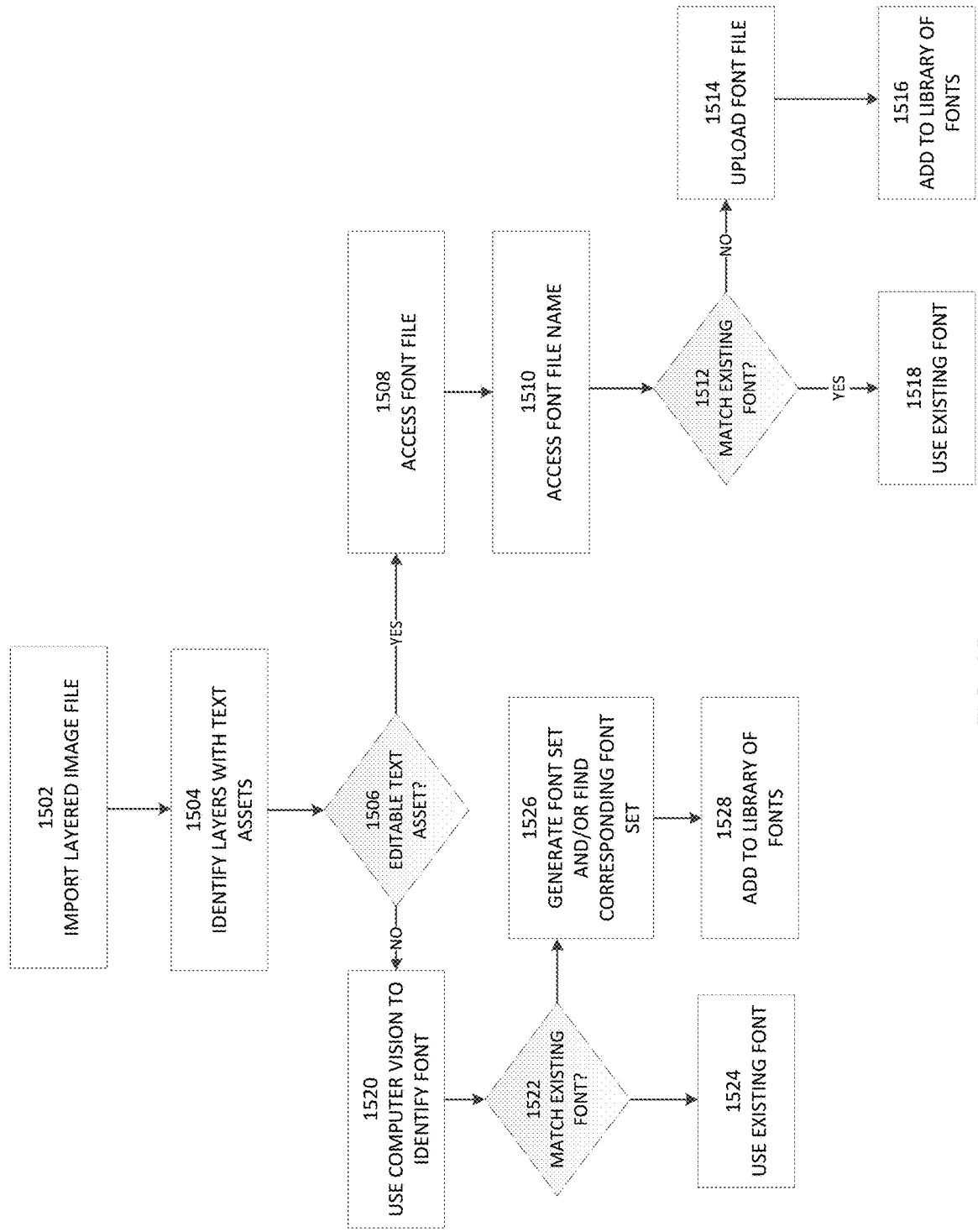

Referring now to FIG. 15, an example process of determining whether a text font of text in a layer is already available in a system font library. At block 1502, a layered image file is imported (e.g., uploaded from a user device or cloud storage system). At block 1504, layers with text assets/design elements are identified (e.g., using metadata associated with respective layers). At block 1506, a determination is made as to whether the text in a given layer is editable (e.g., where the text is in vector format), or non-editable (e.g., in pixel format). Optionally, metadata associated with the layer may indicate whether the text is editable or non-editable, and such metadata may be used in determining whether the text is editable or non-editable.

If a determination is made that the text in the layer is editable, the process may proceed to block 1508, and a font file associated with the layer text asset may be accessed. For example, either the font file name may be read without uploading the font file to the system, or the font file itself may be uploaded to the system. At block 1510, the font file name may be read. For example, the font file name may include a font name, and an extension indicating the font format type.

At block 1512, a determination may be made using the font file name as to whether or not the font used for the text asset in the layer is already included in a system font library. For example, some or all of the text asset font file name may be compared to some or all of the font names of the fonts in the system font library to determine whether or not there is a match. If a determination is made that the text asset font is already available in a system font library, the font in the text asset font file is not added to the system font library. In addition, if, at block 1508, the text asset font file was not uploaded, then the text asset font file is not now uploaded. The corresponding existing font in the system font library is used to enable editing the template layer text.

If a determination is made that the text font is not available in a system font library, then at block 1514, the font file associated with the text asset is imported (if not already uploaded). At block 1516, the font file associated with the text asset is added to the system font library and may be used to enable editing the template layer text. Optionally, a user interface may be provided that enables the user/entity that provided the text asset font file to specify whether or not the font file is to be added to the system font library for general access by users, whether the font file may only be used by the user/entity that provided the text asset font file, and/or whether the font file may only be used to customize certain specified templates.

If, at block 1506, a determination is made that the layer text is not editable, at block 1520, and computer vision may be utilized to identify the font. For example, optionally a learning engine, such as neural network (e.g., a convolutional neural network) may be trained to recognize and localize text. Another learning engine (e.g., a deep neural network) may be used, optionally in association with font metadata, to identify and label the text font.

At block 1522, a determination may be made as to whether or not the font used for the text asset in the layer is already included in a system font library. If a determination is made that the text asset font is already available in a system font library, the font in the text asset font file is not added to the system font library and the corresponding existing font in the system font library is used to enable editing the template layer text.

If a determination is made that the text asset font is not available in a system font library, then at block 1526, the font file associated with the text asset may be searched for (e.g., over the Internet and/or at one or more third party font libraries) to identify a matching font. Optionally in addition or instead, the system may generate a full alphanumeric font set using the layer text as a model. At block 1528, the located or generated font file is added to the system font library and may be used to enable editing the template layer text. Optionally, a user interface may be provided that enables the user/entity that provided the layered image file to specify whether or not the located or generated font is to be added to the system font library for general access by users, whether the font may only be used by the user/entity that provided the text asset layered image file, or whether the font may only be used to customize certain specified templates.

Thus, when the font from a layered image file layer is added to a font library, the added font library may be used, as permitted, by end users to customize templates, and to have a selected item manufactured/customized using the customized templates (e.g., by having text embroidered or printed on an item using the added font).

In certain instances it may be preferable to inspect a user-provided image prior to visually populating a template slot on the user's device display, and notify the user if the image violates a specified image subject matter prohibition (e.g., a prohibition of an image of a face of a specific person, a class of people (e.g., celebrities, politicians, etc.), or an object type (e.g., cigarettes, drug paraphernalia, logo of other sports teams, etc.). This, for example, may prevent the user from populating a template slot with an image having prohibited content, and then taking a screenshot of the resulting template. However, at times the upload of a user image from a user device or other storage system may be relatively slow (e.g., more than 5 seconds, more than 10 seconds, more than 15 seconds, or other threshold amount of time). Show slow upload may be the result of one or more causes. For example, one or more of network congestion, high use of processing resource, and/or large image size may contribute to a slow upload of an image.

The system may identify an image upload as slow based on a determination that the image has not completed an upload by a specified threshold of time and/or based on a determination that a specified percentage of the image upload has not completed by a specified threshold of time. For example, the image size in bytes (e.g., megabytes, gigabytes, etc.) may be determined from metadata associated with the image, where the size metadata (e.g., store in an image file header) may be uploaded prior to the image (or a portion thereof) itself. The percentage upload may be determined by dividing the current number of image bytes uploaded divided by the image size.

In response to determining that an image upload is slow, the system may modify a moderation stage from performing image analysis (e.g., using a neural network or other image recognition system) prior to displaying the user-supplied image in a corresponding template slot on the user device to instead performing image analysis after the user-supplied image is displayed in a corresponding template slot on the user device, and then notifying the user if the image violates a specified image subject matter prohibition. For example, based on a moderation rule, the analysis of the user-provided image to determine if the image includes prohibited subject matter may be performed immediately after the user-supplied image being displayed in a corresponding template slot on the user device.

By way of further example, based on a moderation rule, the analysis of the user-provided image to determine if the image includes prohibited subject matter may be performed immediately after the user adds an item being customized by the user using the user-provided images to an online shopping cart (but prior to the user providing a payment instruction). By way of further example, based on a moderation rule, the analysis of the user-provided image to determine if the image includes prohibited subject matter may be performed after the user adds an item being customized by the user (using the user-provided images) to an online shopping cart, in response to the user providing a payment instruction.

Optionally, rather than modifying the moderation stage on an image-by-image bases, the moderation stage may be modified for multiple images provided by multiple users for a period of time and/or during a period when one or more specified conditions are detected to exist. For example, the specified conditions may include network upload speed, average time to upload images over a specified period of time (e.g., the last 30 seconds, the last minute, the last five minutes, etc.), processor utilization (e.g., percentage of the maximum available processing resources being utilized), memory utilization (e.g., percentage of the maximum available memory resources being utilized), and/or the like.

Where more than one condition is being used to determine whether to change the stage the image analysis is to be performed (to determine whether the image includes prohibited subject matter), the different conditions may be selectively differently weighted.

For example, a process of determining at what stage a moderation operation is to be performed (e.g., determining whether a given user-provided image for customization of template includes prohibited content) may use a formula such as that provided below:

Aggregate Resource Utilization
Value=$w_1 n_1 Rutilization_1 + w_2 n_2 Rutilization_1 + \ldots w_n n_n Rutilization n$ Perform moderation at stage 1 if: Aggregate Resource Utilization Value≤Threshold 1

Perform moderation at stage 2 if: Threshold 1<Aggregate Resource Utilization Value≤Threshold 2

Perform moderation at stage 3 if: Threshold 2<Aggregate Resource Utilization Value≤Threshold 3

.

.

.

Perform moderation at stage N if: Threshold N−1<Aggregate Resource Utilization Value≤Threshold N Where:
w=weight
n=normalization factor
$Rutilization_\#$=utilization of resource #
w=weight As similarly discussed above, an example of a moderation stage 1 may be as soon as a user-provided image is uploaded and prior to displaying the image in a template slot on the user device.

An example of a moderation stage 2 may be after the user-provided image is displayed in a template slot, but before an item being customized using the image (in the corresponding template slot) is permitted to be added to an online shopping cart of the user.

An example of a moderation stage 3 may be after the item (being customized using the user-provided image) is added to an online shopping cart of the user, but before the user enabled to complete checkout (complete the purchase of the item customized using the user-provided image).

An example of a moderation stage 4 may be after checkout is completed for the item being customized using the user-provided image but before an instance of the item is customized (e.g., using a printing or embroidering process to print the user-provided image at a corresponding slot area) using the user-provided image.

Other factors may be taken into account in determining at what stage moderation is to be performed. For example, current network, processor, and/or memory loading may be used to determine when moderation is to be performed. Optionally, a determination as to when moderation is to be performed may be modified based on current computer resource loading (e.g., network, processor, and/or memory loading), and/or on anticipated numbers of image uploads at a given time period.

Optionally, rather than using a single calculated Aggregate Resource Utilization Value (or a component thereof), the formula may use and calculate an average or other statistical central tendency of the Aggregate Resource Utilization Value (or a component thereof) over a period of time (e.g., the average Aggregate Resource Utilization Value over the previous 10 seconds (or other time period), where the Aggregate Resource Utilization Value is calculated once a second (or at other time interval)).

Optionally, a control may be provided that enables or disables the dynamic modification of the moderation based on one or more criteria such as image upload time, network bandwidth utilization, processing resources utilization, image size, and/or other criteria.

Figure 16:
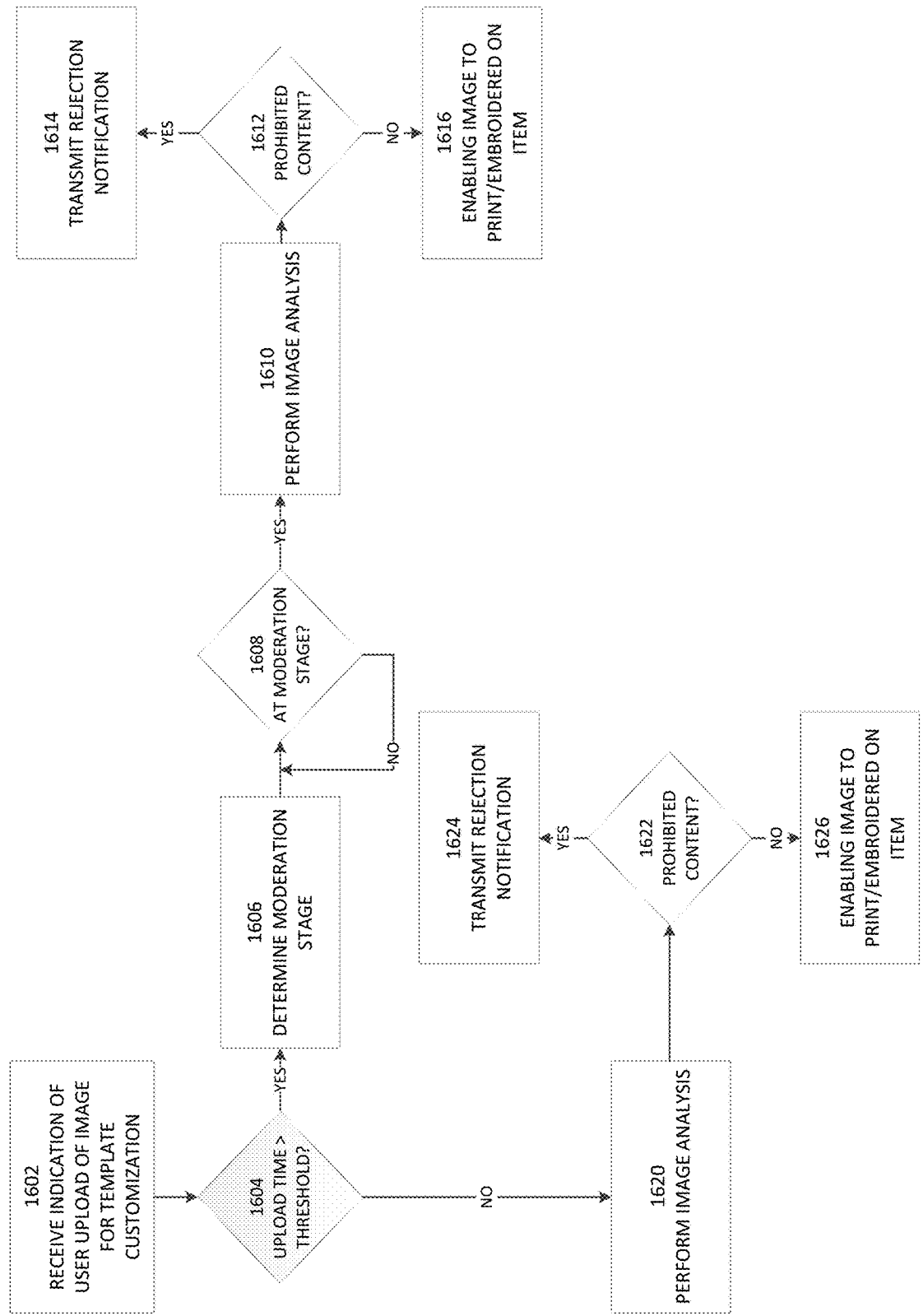

Referring now to FIG. 16, an example process, which may optionally be performed in real time, is illustrated configured to determine whether to perform moderation at a different stage than a default stage (or to perform no moderation). By way of example, a determination may be made to perform no moderation; perform moderation in real time; perform moderation while the end user is modifying the slot; perform moderation when the end user activates a save control to save the end user's customization of the item; perform moderation when the end user submits a user content asset for a slot, but before the user interface renders the user content asset in the slot; perform moderation after the user interface renders the user content asset in the slot, but before the end user adds the item being customized to a shopping cart; perform moderation after the end user adds the item being customized to a shopping cart, but before the end user begins a checkout process; perform moderation after the end user begins the checkout process, but before the order is accepted; perform moderation after the order is accepted, but before the end user-provided content asset is printed on the physical item; and/or at other stages.

At block 1602, a determination is made that a user is uploading an image from a user device or other storage system to a system configured to enable customization of physical and/or digital items such as that discussed elsewhere herein. For example, an upload message may be transmitted from an application (e.g., configured to enable a user to customize items, such as that discussed elsewhere herein) hosted on a user device or in the cloud.

During the upload process, the upload progress may be monitored. At block 1604, a determination may be made as whether the upload progress will (based on the upload rate) or has exceeded a specified threshold period of time. As discussed above, additional or different factors may be monitored, such as network upload speed, average time to upload images over a specified period of time, processor utilization, memory utilization, and/or the like.

When a determination is made that upload time has or will exceed the specified threshold period of time, the process proceeds to block 1606. At block 1606, a determination may be made as to what stage moderation is to be performed (e.g., image analysis to determine if the user-provided image includes prohibited subject matter). For example, rules, including associated thresholds, may be utilized to determine at what stage moderation is to be performed. By way of example, as similarly discussed above, the moderation may be performed, as a default, immediately after the user adds an item being customized by the user using the user-provided image to an online shopping cart (but prior to the user providing a payment instruction), after the user adds an item being customized by the user (using the user-provided image) to an online shopping cart, or in response to the user providing a payment instruction or otherwise placing the actual order. By way of further example, moderation may be performed at other example stages discussed herein.

At block 1608, the user interactions with a system via user interfaces are monitored to determine whether moderation is to be performed at the current stage. For example, the current stage may be determined from user inputs transmitted via a user device, via cookies accessed on the user device (where a given cookie may store user navigation history, shopping cart contents, and/or other related data), or otherwise.

If it is determined that the current stage corresponds to when moderation has been specified to be performed, the process may proceed to block 1610, and the user-provided image may be analyzed to identify objects in the image (e.g., faces, cigarettes, logos, etc.), as similarly discussed elsewhere herein. The objects may be assigned corresponding tags that identify the objects. For example, facial recognition may be performed as described elsewhere herein. Object recognition may be performed using a module configured to generate and extract category independent region proposals (e.g., by generating candidate bounding boxes), using a deep neural network feature extractor configured to extract features from respective candidate regions, and using a classifier (e.g., a Support Vector Machine (SVM) classifier) configured to classify an extracted feature as one of a known class.

Using the analysis, at block 1612, a determination may be made as to whether the object(s) (animate and/or or inanimate) identified at block 1610 include the likeness of prohibited subjects (e.g., specific person, type of person, specific object, object type, etc.) associated with the template or the specific template slot being customized by the user. As discussed elsewhere herein, an entity may have specified prohibited subject matter for a template or specific template slot, and the prohibitions may be stored in association with the template or template slot.

If a determination is made that the user-provided image includes the likeness of prohibited subjects, at block 1614, a corresponding rejection notification may be presented to the user. For example, the notification may be presented via a dedicated app, such as that described herein, a webpage, a short messaging text, an email, or otherwise. A link or other control may be provided in the message or elsewhere enabling the user to resubmit any other permitted user template customizations, and where the user may upload a replacement image for the slot to which the user had attempted to upload the rejected images (in which case the process may revert to block 1602).

At block 1616, if a determination is made that the user-provided image does include the likeness of prohibited subjects, the customized template may be transmitted to a printer or embroidering machine as a print file to enable the item to be customized using the customized template, where the user-provided image is printed or embroidered at a corresponding template slot location.

If, at block 1604, a determination is made that the upload progress will not or has not exceeded a specified threshold period of time, the process may proceed to block 1620, using a default moderation stage (without having the moderation stage modified). The user-provided image may be analyzed to identify objects in the image (e.g., faces, cigarettes, logos, etc.), and the identified objects in the image may be assigned descriptive tags (e.g., face, cigarette, logo, etc.). Using the analysis, at block 1622, a determination may be made as to whether the object(s) (animate and/or or inanimate specific objects or object types) identified at block 1620 include the likeness of prohibited subjects.

If a determination is made that the user-provided image includes the likeness of prohibited subjects, at block 1624, a corresponding rejection notification may be presented to the user. For example, the notification may be presented via a dedicated app, such as that described herein, a webpage, a short messaging text, an email, or otherwise. A link or other control may be provided in the message or elsewhere enabling the user to resubmit any other permitted user template customization (including any images at the slots of the rejected images, where the process may revert to block 1602). At block 1626, if a determination is made that the user-provided image does include the likeness of prohibited subjects, the customized template may be transmitted to a printer or embroidering machine as a print file to enable the item to be customized using the customized template, where the user-provided image is printed or embroidered at a corresponding template slot location.

Optionally, to further simplify the end user input, and to reduce the computing and memory resources need to customize a template in real time on a person by person basis, a large number of iterations (e.g., thousands) of a populated template may be automatically generated from a given template, from which an end user may select. For example, different iterations of different combinations of all or a threshold number of different design elements from design element collections assigned to respective slots of a template may be generated. Optionally, each iteration is assigned a unique identifier (e.g., a SKU (Stock Keeping Unit) specific to the seller or a UPC code specific to the manufacturer), which may be used in tracking inventory and placing manufacturing orders. Optionally, an end user may still be enabled to customize one or more template slots of a given iteration as similarly discussed elsewhere herein. Optionally, an end user may be inhibited from customizing any template slots of a given iteration. The various iterations may be associated with search descriptive metatags to enable end users to quickly search for and access desired iterations via an online catalog. A user may then optionally further customize a given template iteration, and acquire an item customized using the customized template.

Optionally, to further reduce the utilization of computer and memory resources that would otherwise be needed to generate a separate template of each type of customizable item, the same template may be automatically converted for use with respect to different product types in accordance with conversion rules and target item geometries and dimensions. Thus, a single template may be duplicated and mapped to different orderable items (where a given orderable item may be associated with a unique SKU).

For example, one or more mapping files/instruction sets may be generated that maps template slots to different physical locations for different items.

By way of illustration, a template slot configured to be located in a chest area of a t-shirt having a first specified width and height may be mapped to a front kangaroo pocket area of a hoodie having a second specified width and height, where the height and width aspect ratio of the slot is maintained. Optionally, in order to maintain a given aspect ratio, a first dimension (e.g. height or width) may be limited to a maximum or a set size, and a second dimension may be adjusted to as to maintain the original or specified aspect ratio. Optionally, when an end user selects a particular item via an online catalog or an app installed on a user device, a corresponding template (which optionally was separately selected by the end user) is mapped onto an image of the selected item, and is populated with corresponding default design elements. The end user may then customize the template further in accordance with associated permissions, as described elsewhere herein and have the customized item accordingly customized via printing, embroidering, or otherwise.

Optionally, in order to provide design ideas for a given template, the various template slots may be randomly populated by an automated presentation generator using design elements from design element collections assigned to the slots. A snapshot of the resulting populated template (optionally displayed on an item, such as a t-shirt) may be taken and stored. The template slots may then be again randomly populated using design elements from design element collections assigned to the slots, and another snapshot of the resulting populated template may be taken and stored. This process may be repeated multiple times by the presentation generator. A slide show file or video file (which may be generally referred to as a presentation) may then be generated and optionally an audio track (e.g., a music track) and/or captions may be added. The file format may optionally be a GIF file. The resulting file may then be shared via social media, email, short messaging service, or otherwise. The resulting file may be shared with a selected set of users who may be associated with or may have a particularly interested in using the template to customize items.

By way of example, the template may be for a school graduation, and may include a name of the school at one template slot and may include the graduation year at a second template slot. Six other slots may be reserved for images of students. Thus, at each randomization, a different mix of student images may be used to populate the corresponding template slots.

Optionally, rather than being totally random, certain design elements may be more heavily weighted based on one or more criteria, so that more heavily weighted design elements will be selected to appear in template slots more often than relatively lower weighted design elements. Weighting criteria may include one or more of popularity (e.g., measured using relative sales of items customized with a given design element), descriptive metadata associated with a design element (e.g., an image labeled "basketball team captain" may be more heavily weighted than an image labeled "member of basketball team"), newness (e.g., a more recent design element may be weighted more heavily than an relatively older design element) or an incentive (e.g., a payment) provided by an entity that owns or is the subject of the design element.

Optionally, a user interface may be provided that enables a user to specify how many iterations of randomized template customizations are to be included in a presentation, how long each iteration is to be displayed, and/or the total length of the presentation. Optionally, the presentation may be configured to automatically repeat until the viewer activates a pause control or navigate away from the presentation.

In addition, a user interface may enable a user to assign a selected audio track to the presentation. Optionally, the presentation generator may automatically truncate the audio track to the length of the presentation and/or fade the audio track towards the end of the presentation (e.g., the last 3, 5, or 8 seconds of the presentation). Optionally, system may automatically select the audio track. For example, the audio track may be selected based on metadata associated with the template. By way of illustration, if the template is associated with the metadata "graduation", the system may identify an audio track, such as "Pomp and Circumstance" that is commonly associated with the phrase "graduation" (e.g., as determined by crawling the web or by accessing a file that includes an association of phrases with a different musical piece).

Optionally, a user interface may be provided via which a user may specify the presentation format file type (e.g., GIF, MPEG4, APNG, WebP, a series of JPEG static images, etc.), and the presentation may be generated accordingly.

Optionally, design elements of a third party (e.g., an influencer) may be included in a presentation. For example, an influencer may provide six items of content, which may be randomly selected to populate a given template slot.

Optionally, multiple third parties (e.g., multiple influencers) may be enabled to provide sets of design elements to populate one or more template slots. Optionally, different sets of end users will reference presentations with design elements from different third parties. For example, if a template relates to a graduation year, students at schools in one area of the country may be provided with representations of a template with a first slot populated using randomly selected design elements of a first influencer, while students at schools in different area of the country may be provided with representations of the same template with the first slot populated using randomly selected design elements of a second influencer (where the choice of influencer may be based on the popularity of a given influencer in a given area of the country).

Figure 18:
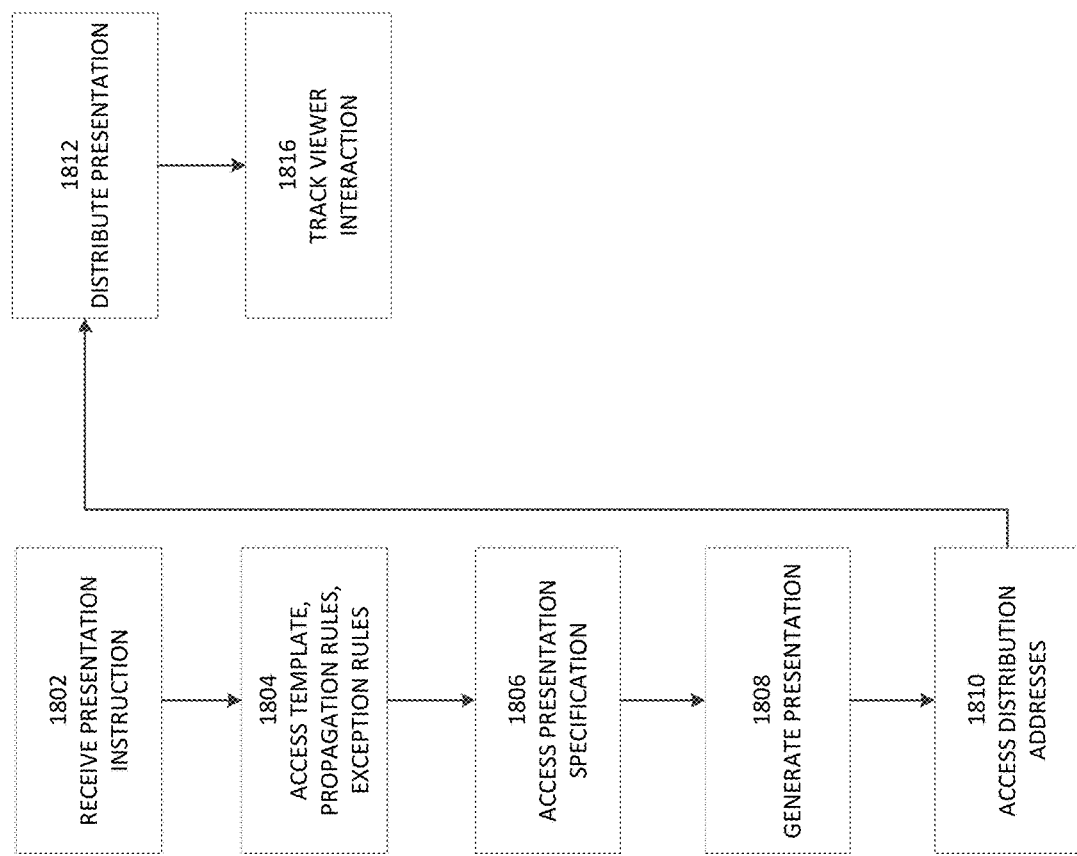

Referring now to FIG. 18, an example presentation generation process is illustrated. At block 1802, a presentation generation instruction may be received via a user interface. For example, the presentation generation instructions may be provided via a user interface displayed on a user device and may be associated with a specified template and/or item (e.g., a t-shirt, hoodie, backpack, etc.) which may be customized using a template.

At block 1804, the template (including one or more slots) is accessed (including an indication as to which collections of design elements are assigned to which slots), as well as associated template or slot specific rules. For example, the rules may include exception rules (that indicate which design elements may not be used in combination with which other design elements in customizing the template), propagation rules (utilized to propagate a user input with respect to one design area to other design areas), color rules (e.g., that specify colors of design elements or backgrounds that may or may not be used at all or in combination), and/or other rules disclosed herein. An indication (a number) may be displayed informing the user as to how many design elements are in a given collection. If additional design elements are added to a collection or if design elements are deleted, the number may be modified in real time to reflect the change in the number of design elements in a given collection.

At block 1806 a presentation specification may be accessed. For example, the presentation specification, which may have been specified by a user via a user interface, define how many iterations of randomized template customizations are to be included in a presentation, how long each iteration is to be displayed, and/or the total length of the presentation. The presentation specification may indicate that an audio track (e.g., a song) is to be included in the presentation. The presentation specification may indicate that one or more specified captions to be included in the presentation. The presentation specification may also specify one or more output formats (e.g., GIF, MPEG4, APNG, WebP, a series of JPEG static images, etc.). The presentation may specify a link (e.g., which may be activated by the user clicking on the presentation) to be included in the presentation. For example, the link may be configured to navigate a user device to access and display a local document or a document on a networked site (e.g., an online catalog page via which the user may customize the template and purchase items customized using the user-customized template).

At block 1808, the presentation may be generated in the specified formats in accordance with the selected template, template rules, collections assigned to template slots, and presentation specification. At block 1808, a distribution address data store may be accessed. The addresses may include end user email addresses, short messaging service addresses, text and voice messaging service addresses, social media accounts, microblog addresses, and/or the like. For example, the data store may be associated with a given school or sets of schools. By way of further example, the addresses may be associated with members of a fan club.

At block 1812, the presentation may be transmitted to some or all of the accessed distribution addresses for playback by respective user devices. At block 1816, presentation recipient interactions may be tracked and a corresponding report generated and distributed to specified destinations. For example, the process may track how many recipients played the presentation (e.g., partially and/or to completion), how many recipients re-shared the presentation (e.g., via email addresses, short messaging service addresses, text and voice messaging service addresses, social media accounts, microblog addresses, and/or the like), how many recipients clicked on the presentation and were navigated to a network resource (e.g., a website) via which the item may be further customized and/or purchased, which iteration of the template was presented to a given end user when the end user clicked on the presentation (e.g., which design elements were populating the template slots), whether a given recipient customized the template, whether a given recipient purchased an item customized using the template, which design elements (and the source of the design elements) were used on a purchased item customized using the template, and/or the like.

The tracked and reported data may be fed back into the presentation generation to generate more effective presentations (e.g., where relatively more popular design elements, as measured by purchases or uses made of a given design element, may be weighted relatively than less popular design elements when selecting the design elements for the presentation).

In addition to using an image analysis to determine whether the contents of an image (e.g., An end user-provided image) violates a subject matter rule, the image analysis tool may be used in determining what content to recommend to the end user.

For example, a neural network may be utilized to identify the subject matter of a user-provided image. The neural network may locate the presence of objects (e.g., a cat, dog, car, surfboard, etc.) with a bounding box (e.g. defined by a point, width, and height) and assign a label corresponding to the types or classes of the located objects in an image.

The object identification/classification may be stored in memory in association with the source image. The object identification/classification may be used to infer the user's preferences regarding objects identified in the image. The inferred user preferences may be used to recommend or suggest to the user items and/or templates that have image with the same or similar subject. In addition, a given user may expressly identify, via a preference user interface, user preferences and interests regarding subject matter, colors, sports, sports teams, musical performers, television shows, movies, cities, hobbies, vacation spots, pets, parents, children, an identification of favorite photographs, and/or the like. The user may also expressly identify certain information regarding the user (e.g., age, city of residence, city of birth, types of pets, number and ages of children, marital status, renter or home owner, etc.) which may be used to infer preferences and interests of the user.

For example, if an end user-provided image is determined to include an image of a dog, an inference may be made that the end user has an interest in dogs, and the system may recommend items and/or templates or design elements for customizing item that include the likeness of a dogs. Thus, for example, the identification of dogs, cats, birds, graduation gowns and/or mortarboards, wedding dresses, cars, motorcycles, beaches, mountains, cityscapes, flowers, trees, concert venues, sports venues, ski equipment, ski slopes, food, sunsets, sunrises, and/or the like (optionally in addition to expressly provided preferences or preferences inferred from information provided by the user) may be used to generate recommendations of like subjects. Optionally, in addition to image subject matter, a determination may be made as to a user's preferred color from colors used or prevalent in images uploaded by the user. The recommendations may be provided via a dedicated application for customizing items, an email, a text messaging service (e.g., a short messaging service message), a webpage, and/or otherwise. Optionally, the recommendation may include a coupon (e.g., a discount coupon) to purchase an item customized using a recommended design element to template. Optionally, the recommendations may include gift recommendations to be provided by the user to other people.

Optionally, the order in which design elements in a given collection of design elements are presented to the user (e.g., to customize a template being used to customize a product) may likewise be based on inferred or explicitly stated user interests/preferences. Further, a given collection of design elements may be modified to include one or more images based on such inferred or explicitly stated user interests/preferences. As noted above, a number may be displayed informing the user as to how many design elements are in a given collection. If additional design elements are added to a collection (or if design elements are deleted), the number may be modified in real time to reflect the change in the number of design elements in a given collection.

Optionally, the frequency and type of recommendations may be based on the number of images of a given subject matter used and/or provided by an end user in customizing an item and/or the centrality of the subject matter in such images (e.g., a determined using the percentage of the image occupied by the subject matter and/or the relative position of the subject matter with respect to the center of the image). For example, optionally, a recommendation is not provided regarding design elements directed to a given subject matter until the end user has uploaded and/or used a threshold number of images containing the subject matter (optionally within a specified period of time).

Optionally, some or all of the template slots of a given template may be automatically populated using images that correspond to interests/preferences inferred from computer vision recognition of objects in images uploaded by the user and/or as expressly specified by the user. Thus, the generation of a customized template may be performed automatically, faster and with greater accuracy than would be possible by a human.

Figure 20:
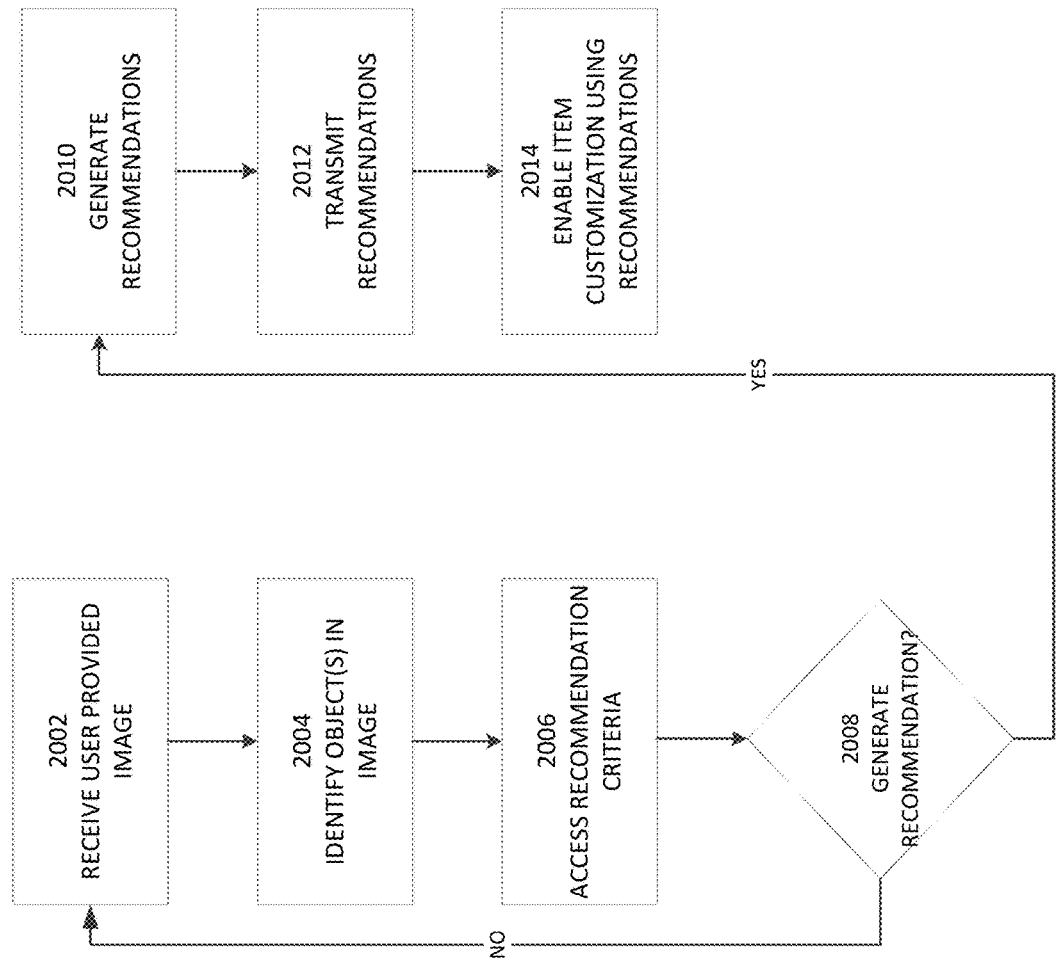

Referring now to FIG. 20, an example process for generating recommendations is described. At block 2002, a user-provided image is uploaded. For example, as similarly described elsewhere herein a user-provided image may be accessed to customize a template (e.g., a template slot that end users are permitted to customize using a user provide image). At block 2004, an image analyzer (e.g., a neural network as described elsewhere herein) may be employed to identify the contents of the image (e.g., animate and/or inanimate objects). For example, the image analyzer may identify and label objects in the image and may determine the percentage of the image occupied by the image and the distance of the center of the object from a reference point (e.g., the image center, the top, bottom, left, and/or right sides of the image).

At block 2006, recommendation criteria may be accessed. The recommendation criteria may indicate that, in order for a recommendation be generated, a threshold number of images needs to be received, a threshold number of images with the same non-human object needs to be received, a given object needs to occupy a threshold percentage of an image, a centroid of a given object needs to be within a threshold distance of the center of the image, and/or the like.

At block 2008, using the result of the image and analyses and the recommendation criteria, a determination may be made as to whether a recommendation is to be generated (e.g., a recommendation of an item, template, and/or design element). If a determination is made that a recommendation is to be made, at block 2010, one or more recommendations may be generated. For example, using the object label generated by the image analyzer, items, templates, and/or design elements may be identified using corresponding labels/metadata. For example, a data store may store metadata/labels that describe the subject matter of a given item, template, and/or design element that are available via an online catalog and/or a dedicated application. The labels associated with the user-provided image may be used to generate a search query (e.g., an SQL query) to identify matching items, templates, and/or design elements, some or all of which may then be included in a corresponding recommendation.

At block 2012, the recommendation(s) may be transmitted to the user via an email, a text messaging service (e.g., a short messaging service message), a webpage, and/or otherwise. A link may be included in the recommendation, wherein activation by the end user causes the user device (e.g., a browser or dedicated application hosted on the user device) to navigate to and access a corresponding catalog entry. Optionally a discount coupon (e.g., a percentage or dollar off coupon or a coupon that provides a free item when a non-free item is purchased) may be included with the recommendation. At block 2014, the presented entry may enable the user to acquire a recommended item or to use a recommended template or design element to customize an item as similarly discussed elsewhere herein. For example, a selected item may have the recommended template or design element printed or embroidered on an item.

In order to enhance the uniqueness of a given customized product, optionally only a single instance of a given customization may be permitted. For example, optionally an end user may be enabled to order a product (e.g., a t-shirt, hoodies, phone case, or other item) customized using one or more frames from a specified movie, series, video sharing site posted video, or other video content, where no other end user will be permitted to use those same frame(s) to customize a product. Optionally, an end user may be enabled to further customize the product via one or more slots that are designated as user-customizable (e.g., where the user is enabled to upload an image to populate the slot, enter text to populate the slot, or select an image and/or text from a collection of images and/or text to populate the slot, as described elsewhere herein).

The frames may be positioned in accordance with a specified template having one or more slots as similarly discussed elsewhere herein. For example, a template slot at a first position may be reserved for the name of the video item (e.g., a movie title), and one or more slots at corresponding other positions may be used for corresponding frames. Other slots may be optionally reserved for other content (e.g., specified images of characters, logos, text, and/or the like). Thus, when a product is customized, the name and frames may be printed on the product at the corresponding slot positions using a selected printer as discussed elsewhere herein.

Optionally, a gallery of still-available frames from a selected item of video content (e.g., movie, series, video sharing site posted video, or other video content) may be provided for presentation on a user device (e.g., a device of an end user). The frames may be presented as thumbnails, and in response to the user clicking or tapping on a given thumbnail, a corresponding larger image of the frame may be accessed and presented on the user device. The user may select a given frame for use in customization by clicking on the frame or using other control (e.g., selecting a checkbox positioned in association with the frame). Once the user selects a frame, an image of the product may be displayed in real time with the frame positioned at the corresponding template slot position thereon (and with other content positioned at corresponding template slot positions). Once the end user orders an item customized using one or more frames, a corresponding use indication may be stored in memory in association with those frames. When a future user selects the item of video content, the corresponding gallery may be modified so as to exclude the frames that have already been utilized to customer a product.

Optionally, during a customization process, when a user selects a frame for customization of a product, the frame may be reserved for the user's use for a specified period of time (e.g., 30 minutes, 2 hours, or other time period). If the user does not order a product to be customized with the selected frame (or frames) within the specified time period, the frame(s) may be released for use by another user in customizing a product.

Optionally, rather than the user selecting a frame, a frame is automatically selected by the system. The system may be configured to only select frames from those frames that have not yet been used by end users to customize products. Optionally, an image of the product may be presented to the user with the system-selected frame depicted thereon at an appropriate position/template slot prior to the user ordering and/or purchasing the product customized using the system selected frame. Thus, if the user does not like the selected frame, the user may decline to order the product customized using the frame. Optionally, a "retry" control or the like may be provided, which when activated by the user causes the system to select and present a different frame (which may be presented at the corresponding slot position on the image of the product).

As similarly discussed above, the system-selected frame may optionally be reserved for the user's use for a specified period of time (e.g., 30 minutes, 2 hours, or other time period). If the user does not order a product to be customized with the system-selected frame (or frames) within the specified time period, the frame(s) may be released for use by another user in customizing a product.

Optionally, to further ease the process, the user may simply order a product (e.g., which may be in the form of a purchase by the user or may be provided to the user for free as a promotional item) via an electronic or paper form, the system will automatically select a frame from the video content, populate a corresponding template, transmit the print file corresponding to the template to a printer (which prints the frame image and other template content items on the product to thereby customize the product), and initiate the shipment of the customized product to an address provided by the user.

Optionally, the system may perform an analysis of the video content frames prior to including the frames in a gallery for use in product customization or from being automatically selected by the system for use in product customization. The analysis may include analysis of both image characteristics (e.g., colors, predominate color, brightness, presence of shadows, contrast, and/or other such image characteristics discussed herein) and image subject matter (e.g., as determined using object recognition). For example, a neural network may be used to perform object recognition as described elsewhere herein. Similarly, certain image characteristics may be determined using techniques described herein. Metadata (e.g., text tags) may be stored in association with a given frame indicating such image characteristics and image subject matter data.

Based on the frame analysis, certain frames may be excluded from the galleries of frames (presented to end users) that may be used in product customization and/or from being automatically selected by the system for use in customization. For example, one or more rules may be specified regarding certain criteria that if present in a frame (or absent from the frame) will cause the frame to be excluded from customization galleries or from being automatically selected by the system for use in customization. For example, if it is determined that more than a specified percentage (e.g., 50%, 60%, 75%, or other percentage) of a frame is one or more specified colors (e.g., white, black, and/or other colors), the frame may be inhibited from being used in customizing products and from being included in corresponding galleries. The percentage may be selected so as to exclude frames whose color composition makes them unsatisfactory (e.g., with respect to visibility or contrast with the color of the product being customized) for product customization.

Certain frames may be similarly excluded for use in customization based on other frame image characteristics, such as contrast of all or portions of the frame image being less than a corresponding threshold or greater than a corresponding threshold, brightness of all or portions of the frame image being less than a corresponding threshold or greater than a corresponding threshold, the presence of transparencies occupying more than a specified threshold percentage of the image, the presence of specified colors occupying more than a specified threshold percentage of the image, and/or the like.

Optionally, where an end user is enabled to select a product color (e.g., where the product is a garment, such as a t-shirt), the exclusion of frames for product customization may be different for different end users based on the product color selection by the end user. For example, where the product color is black, frames that are more than 25% (or other threshold) black may be excluded for use in customization, while such frames may be permitted where the end user has selected a white product color. Similarly, where the product color is white, frames that are more than 15% white (or other threshold) may be excluded for use in customization, while such frames may be permitted where the end user has selected a black product color.

Certain frames may be excluded for use in customization based on frame contents. For example, if certain frames include certain specified objects (which may be animate or inanimate objects, and may be specified people/actors) or depict certain scenes/acts, the frame may be excluded for use in customization based on frame content rules and may be excluded from corresponding galleries. By way of illustration, if certain specified actors are determined to be in a frame, the frame may be excluded for use in customization based and may be excluded from corresponding galleries. By way of additional illustration, only frame images of faces of certain identified people may be used for product customization, and if the frame image includes the faces of other people, the frame image may be excluded from corresponding galleries and for use in customization.

By way of further illustration, if certain specified drug paraphernalia are determined to be in a frame, the frame may be excluded for use in customization and may be excluded from corresponding galleries. By way of yet further illustration, if an image of a sexual nature is determined to be in a frame, the frame may be excluded for use in customization and may be excluded from corresponding galleries. As discussed elsewhere herein, a frame that fails to comply with customization rules may optionally be edited (e.g., with objects blurred and/or color changed) so that the edited frame complies with the customization rules. The edited frame may then be used to customize a product.

In addition, certain frames may be excluded for use in customization if at least one specified object is not identified as being in the frame. For example, a frame may be excluded if there is not at least once specified character/actor (which may be an actual human actor or which may be an animated/computer generated image character) or at least one specified inanimate object (e.g., a specified prop, such as a specified vehicle, weapon, article of clothing; a building or other structure; scenery, etc.). This technique better ensures that a user will not be presented with frames that are likely to be lacking interesting objects and are of little interest, thereby reducing network utilization that would otherwise be used to transmit such frames, reducing the amount of display space on the user's device that would otherwise be used to display such frames, and reducing memory utilization space on the user's device that would otherwise be used to store such frames.

As similarly discussed elsewhere herein, tags may be assigned by the system based on frame/image characteristics and/or based on frame/image content. For example, one or more color tags may be assigned to a frame based on colors that are determined to be present in the frame (e.g., occupying more than a threshold percentage of the frame). By way of further example, one or more character and/or actor names may be used as tags for frames in which the character and/or actor are detected. By way of further example, one or more prop names may be used as tags for frames in which certain props are identified. Such tags may be used to categorize the frames. Such categorization may be utilized to organize the frame gallery.

For example, the frame gallery may include an actor section, where frames that include actors are depicted, optionally in association with the actor names. By way of further example, the frame gallery may include a car section, where frames that include cars are depicted, optionally in association with the car model and make names, and/or the model year.

Such frame tags may also be used to enable a user to search for frames of interest. For example, a search field may be provided via which the user may enter one or more search terms. A search engine may be utilized to identify frames that have one or more tags that match the search query. The search results may be ranked (e.g., based on the number or percentage of frame tags that match the search query) and the search results may be presented to the user in ranked order (where the frames estimated to be the closest match are presented higher in the search results), where the search results may include the corresponding frame images and tags (and/or other descriptive information).

Figure 23:
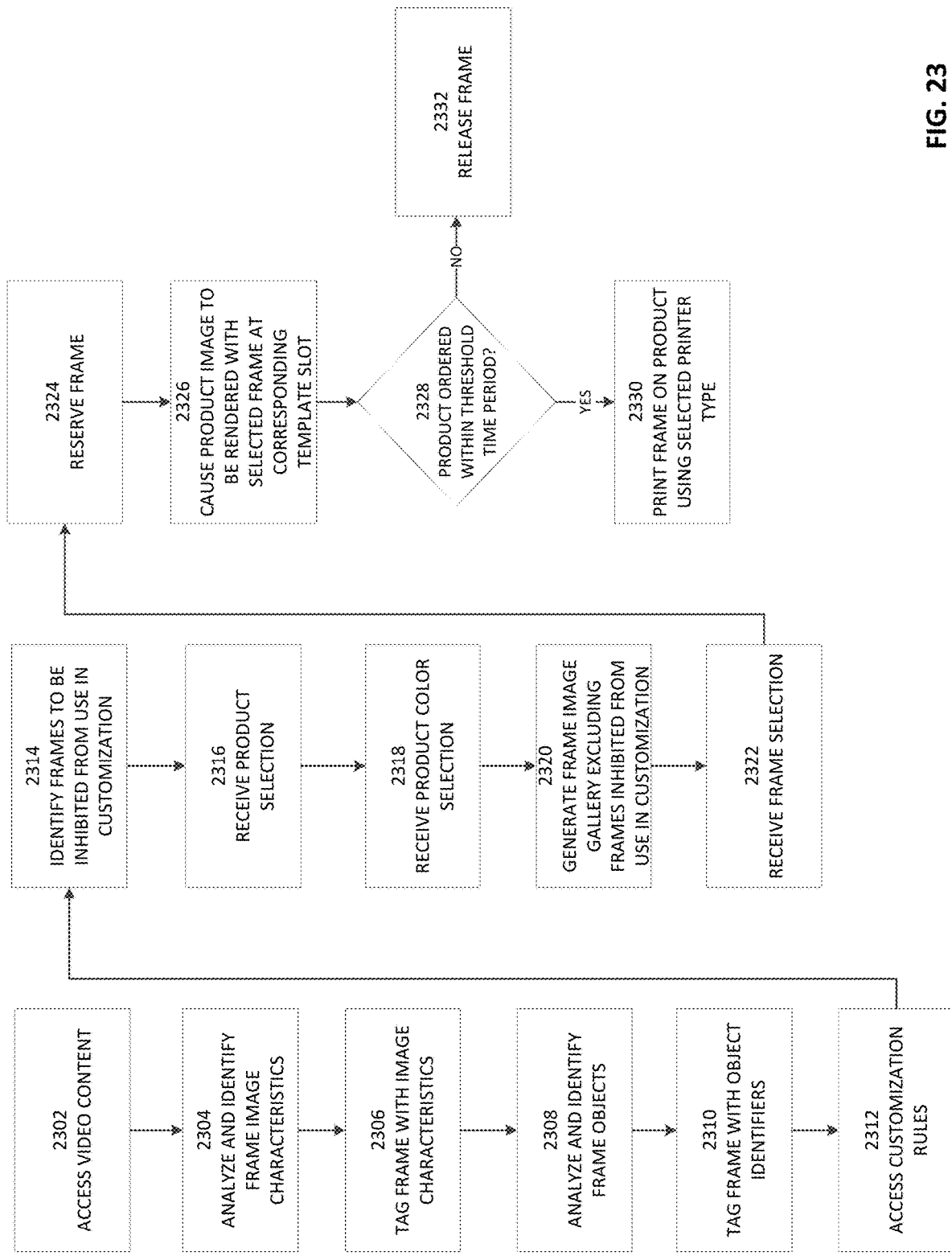

Referring to FIG. 23, an example process is illustrated configured to enable images to be uniquely used to customize items, such as products (e.g., apparel such as t-shirts or hoodies, backpacks, phone cases, stickers, etc.). Although the description herein may refer to customizing products, the disclosed processes and systems may be utilized to customize digital and/or other items For example, the images may be from a movie, a television/streaming service series, a concert, a play, a sporting event, a video shared on a social network, or other video content. At block 2302, an item of video content is accessed from a data store, such as a database. The frames from the item of video content may be identified and stored as separate files. Optionally, a format conversion may be performed. For example if the item of video content is in MPEG format, the individual frames may be converted to another format, such as a JPEG format, and stored as JPEG files. Optionally, the aspect ratio of the frame image is maintained during such conversion. A given frame may be stored in association with a frame identifier, such as a frame number identifying the sequential position of the frame in the item of video content (e.g., if there are 10,000 frames, the frames may be number in sequence 1 to 10,000).

At block 2304, some or all of the frames may be analyzed to identify frame image characteristics, such as similarly described elsewhere herein (e.g., brightness, contrast, color, shadows, transparencies, sharpness, etc.). At block 2306, the frame may be associated with label tags that identify some or all of the frame image characteristics. Such image characteristics tags may be stored in association with the corresponding frame. Such analysis may be scheduled during times of relatively low system utilization to thereby aid in time balancing the system process, memory, and network loading, and further inhibiting overloading the system resources in a manner which cause other processes executed by the system to be unacceptably impacted and slowed.

At block 2308, some or all of the frames may be analyzed to identify objects in the frames, such as described elsewhere herein (e.g., inanimate objects, such as props, clothing, scenery, buildings, vehicles, etc.; animate objects, such as actors, characters, animals; actions being performed by animate or inanimate objects, such as sexual acts, violent acts, romantic acts, etc.). At block 2310, the frame may be associated with label tags that identify some or all of the objects identified in the frame image. Such object tags may be stored in association with the corresponding frame.

At block 2312, customization rules may be accessed from a corresponding data store, such as a database. The customization rules may be specific to the accessed video content or may be associated with a set of video content items (e.g., video content from the same source, such as the same movie studio, content streaming service; products from the same product manufacturer, etc.). As discussed above, example customization rules may include rules for frame image characteristics and/or for frame image objects. By way of illustration, one or more rules may be specified regarding certain characteristics or objects that if present in a frame (or absent from the frame) will cause the frame to be excluded from customization galleries or from being automatically selected by the system for use in customization.

At block 2314, the rules are used to analyze frame tags for a given frame and to determine if the frame tags indicate that the frame is to be inhibited from being used for customizing products and/or from being included in a gallery of frames that may be used to customize products. For example, as similarly discussed above, if, based on one or more rules, a determination is made that a frame image is too dark, or that the frame includes a certain prohibited object (e.g., a gun), or that the frame include an image of a certain prohibited act (e.g., a violent act), or that the frame does not include a certain required object (e.g., a person, a vehicle, etc.), the frame may be inhibited for use in product customization. A corresponding "excluded for use" tag or other indication may be stored in association with the frame.

At block 2316, a user (e.g., an end user) selection of a product (e.g., a t-shirt, hoodie, phone case, etc.) to be customized may be selected from an online, interactive catalog, as similarly discussed elsewhere herein. Optionally, rather than selecting a product from a catalog the user may have activated a link (e.g., in a social networking interface, in an email, in a messaging service (e.g., a short messaging service) message, in a webpage, or otherwise) that navigates the user's web browser or a product customization application directly to a product page for the product.

If more than one color of the product is available, at block 2318, a user product color selection may be received (e.g., via a menu of available colors, such a black, white, red, blue, gray, etc.). An image of the product may be presented in real time on the user device in the selected color. The accessed color rules may include rules that are specific to certain product colors and not other product colors. For example, as similarly discussed above, customization rules may indicate that where the product color is black, frames that are more than 25% black may be excluded for use in customization, while such frames may be permitted where the end user has selected a white product color. Similarly, where the product color is white, frames that are more than 15% white may be excluded for use in customization, while such frames may be permitted where the end user has selected a black product color. Thus, additional frames may be excluded for use in product customization based on the user selection of the product color.

At block 2320, a frame image gallery may be generated and provided for presentation on the user device display. The frame image gallery may include frame images that may be used for customization of the product in the selected product color, and that optionally excludes frame images that may not be used for customization of the product in the selected product color. Optionally, if the user changes the product color, the frame gallery may be updated accordingly (e.g., with certain previously included frame images now excluded, and with certain previously excluded frame images now included).

At block 2322, a user selection of a frame image (e.g., by clicking on a desired frame image or activating an adjacent frame image selection control) from the frame image gallery is received where the selected frame image is to be used to populate a corresponding template slot. It is understood that in certain instances, the user may be enabled to populate several template slots with respective frame images, but for clarity, the example process will be described as being used to populate a given template slot with a given frame image.

At block 2324, the selected frame image is optionally reserved for a specified period of time (e.g., 15 minutes, 30 minutes, 2 hours, or other time period, which may be referred to as the reserve period), where other users (e.g., other end users) may not use the selected frame image for product customization. While a frame image is reserved, optionally it may be excluded from frame image galleries presented to other users.

At block 2326, the selected frame image is optionally rendered in real time on the user device display at the corresponding template slot position on an image of the product. An order control, add to shopping cart control, and/or purchase control may be provided in conjunction with the frame image rendered at the corresponding template slot position on the image of the product. Thus, for example, the user may order/purchase the product as customized with the frame image.

At block 2328, a determination is made as to whether the user ordered/purchased the product as customized with the frame image within the reserve time period. If the user failed to order/purchase the product as customized with the frame image within the reserve time period, at block 2332 the frame image may be released for use in product customization by other users. Optionally, the frame image galleries presented to users may be refreshed to include the previously selected frame image.

If the user ordered/purchased the product as customized with the frame image within the reserve time period, at block 2330 the selected frame image may be printed or embroidered on a physical instance of the product (optionally using a specified printer type) at the corresponding template slot location, as similarly described elsewhere herein. The customized product may then be shipped to the user. The frame may then be stored with a "used" indicator to inhibit the future use (for at least a specified time period) of the frame to customize a product.

Optionally, the frame number and/or the total number of frames of the item of video content may be printed on the product. For example, if the frame is the $300^{th}$ frame and there are 10,000 frames, the text "frame 300 of 10,000 frames" may be printed on the product. The text may be printed on or just adjacent to the frame image, may be printed in a tag area on the inside of the product (e.g., where the product is a garment, such as a t-shirt or hoodie), and/or may be printed elsewhere on the product. Optionally, a customization user interface enables the user to specify a location on the product where the frame image will be printed.

Figure 24:
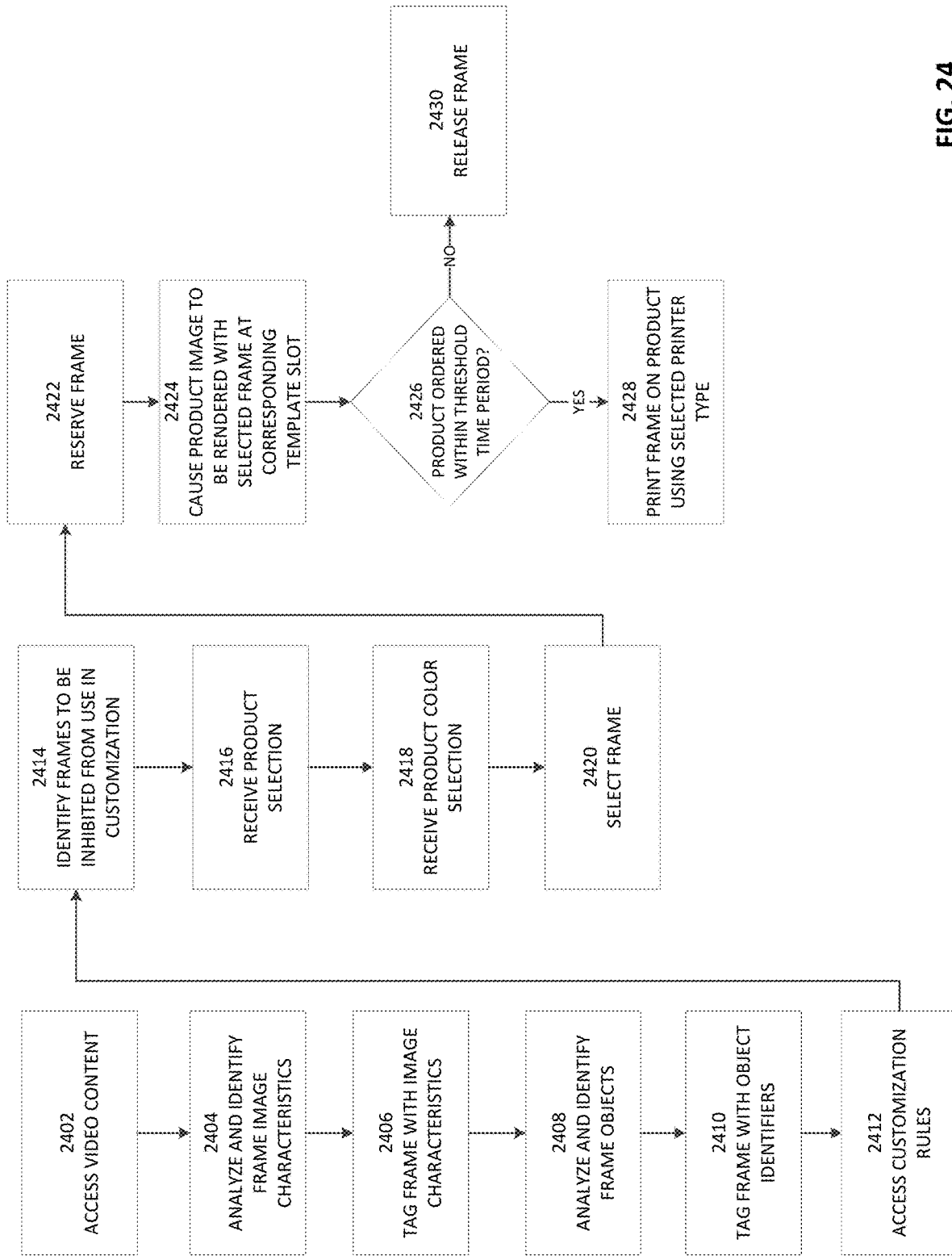

Referring to FIG. 24, an example process is illustrated configured to enable images to be uniquely used to customize items, such as products (e.g., apparel such as t-shirts or hoodies, backpacks, phone cases, stickers, etc.). In this example process, the system, rather than a user, automatically selects the frame image from an item of video content to be used customize products, so as to ensure that each customized product is unique.

As discussed above, the images may be from a movie, a television/streaming service series, a concert, a sporting event, a video shared on a social network, or other video content. At block 2402, an item of video content is accessed from a data store, such as a database. As similarly discussed above, the frames from the item of video content may be identified and stored as separate files. Optionally, a format conversion may be performed. For example if the item of video content is in MPEG format, the individual frames may be converted to another format, such as a JPEG format, and stored as JPEG files. A given frame may be stored in association with a frame identifier, such as a frame number identifying the sequential position of the frame in the item of video content (e.g., if there are 10,000 frames, the frames may be number in sequence 1 to 10,000).

At block 2404, some or all of the frames may be analyzed to identify frame image characteristics, such as similarly described elsewhere herein (e.g., brightness, contrast, color, shadows, transparencies, sharpness, etc.). At block 2406, the frame may be associated with label tags that identify some or all of the frame image characteristics. Such image characteristics tags may be stored in association with the corresponding frame. Such analysis may be scheduled during times of relatively low system utilization to thereby aid in time balancing the system process, memory, and network loading, and further inhibiting overloading the system resources in a manner which cause other processes executed by the system to be unacceptably impacted.

At block 2408, some or all of the frames may be analyzed to identify objects in the frames, such as described elsewhere herein (e.g., inanimate objects, such as props, clothing, scenery, buildings, vehicles, etc.; animate objects, such as actors, characters, animals; actions being performed by animate or inanimate objects, such as sexual acts, violent acts, romantic acts, etc.). At block 2410, the frame may be associated with text label tags that identify some or all of the objects identified in the frame image. Such object tags may be stored in association with the corresponding frame.

At block 2412, customization rules may be accessed from a corresponding data store, such as a database. The customization rules may be specific to the accessed video content or may be associated with a set of video content items (e.g., from the same source, such as the same movie studio, content streaming service; from the product manufacturer, etc.). As discussed above, example customization rules may include rules for frame image characteristics and/or for frame image objects. By way of illustration, one or more rules may be specified regarding certain characteristics or objects that if present in a frame (or absent from the frame) will cause the frame to be excluded from customization galleries or from being automatically selected by the system for use in customization.

At block 2414, the rules are used to analyze frame tags for a given frame and to determine if the frame tags indicate that the frame is to be inhibited from being used for customizing products and/or from being included in a gallery of frames that may be used to customize products. For example, as similarly discussed above, if, based on one or more rules, a determination is made that a frame image is too dark, or that the frame includes a certain prohibited object (e.g., a gun), or that the frame include an image of a certain prohibited act (e.g., a violent act), or that the frame does not include a certain required object (e.g., a person, a vehicle, etc.), the frame may be inhibited for use in product customization. A corresponding "excluded for use" tag may be stored in association with the frame.

At block 2416, a user (e.g., an end user) selection of a product (e.g., a t-shirt, hoodie, phone case, etc.) to be customized may be selected from an online, interactive catalog, as similarly discussed elsewhere herein. Optionally, rather than selecting a product from a catalog the user may have activated a link (e.g., in a social networking interface, in an email, in a messaging service (e.g., a short messaging service) message, in a webpage, or otherwise) that navigates the user's web browser or a product customization application directly to a product page for the product.

If more than one color of the product is available, at block 2418, a user product color selection may be received (e.g., via a menu of available colors, such a black, white, red, blue, gray, etc.). An image of the product may be presented in real time on the user device in the selected color. The accessed color rules may include rules that are specific to certain product colors and not other product colors. For example, as discussed above, customization rules may indicate that where the product color is black, frames that are more than 25% gray may be excluded for use in customization, while such frames may be permitted where the end user has selected a khaki product color. Similarly, where the product color is white, frames that are more than 35% khaki may be excluded for use in customization, while such frames may be permitted where the end user has selected a black product color. Thus, additional frames may be excluded for use in product customization based on the user selection of the product color.

At block 2420, the system may automatically select a frame image from the frames that are not excluded from use in customizing the product and that have not yet been used in product customization. The selected frame may be the next sequential permitted frame in the item of video content relative to the permitted frame images that have already been used for product customization. Optionally instead, the system randomly selects a frame image from permitted, but not yet used, frames. Optionally, if the user changes the product color, the system may select a different frame image from the frames permitted for that product color (and that comply with the customization rules) if the currently selected frame may not be used (in accordance with customization rules) with the changed product color.

At block 2422, the system-selected frame image is optionally reserved for a specified period of time (e.g., 15 minutes, 30 minutes, 2 hours, or other time period, which may be referred to as the reserve period), where other users (e.g., other end users) may not use the selected frame image for product customization. While a frame image is reserved, it may be excluded from frame image galleries presented to other users.

At block 2424, the selected frame image is optionally rendered in real time on the user device display at the corresponding template slot position on an image of the product. An add to shopping cart or purchase control may optionally be provided in conjunction with the frame image rendered at the corresponding template slot position on the image of the product. Thus, for example, the user may order/purchase the product as customized with the frame image.

At block 2426, a determination is optionally made as to whether the user ordered/purchased the product as customized with the frame image within the reserve time period. If the user failed to order/purchase the product as customized with the frame image within the reserve time period, at block 2430 the frame image may be released for use in product customization by other users.

If the user ordered/purchased the product as customized with the frame image within the reserve time period, at block 2428 the selected frame image may be printed or embroidered on a physical instance of the product (optionally using a specified printer type) at the corresponding template slot location, as similarly described elsewhere herein. The customized product may then be shipped to the user.

As similarly discussed above, optionally, the frame number and/or the total number of frames of the item of video content may be printed on the product. For example, if the frame is the 300th frame and there are 10,000 frames, the text "frame 300 of 10,000 frames" may be printed on the product. The text may be printed on or just adjacent to the frame image, may be printed in a tag area on the inside of the product (e.g., where the product is a garment, such as a t-shirt or hoodie), and/or may be printed elsewhere on the product. Optionally, the user may select a location where the frame number is to be printed (e.g., from among a plurality of slots).

Optionally, rather than excluding frames that fail to meet customization rules in the processes illustrated in FIGS. 23 and 24, the frames may be automatically altered, where possible, so as to comply with the customization rules. For example, if there are prohibited objects or actions in a given frame (e.g., drug paraphernalia, images of certain faces, a sexual act), the system may blur the corresponding objects or actions so that they are not readily discernible to the human eye. Optionally, if the prohibited objects or actions occupy more than a certain threshold percentage of the frame and/or are located at certain positions of the frame (e.g., in the center of the frame), the entire frame may be excluded for use in customization rather than blurred for use. Optionally, if the prohibited objects or actions occupy less than a certain threshold percentage of the frame and/or are located at certain positions of the frame (e.g., at an edge of the frame), the objects or actions may be blurred.

Blurring may be performed on a selected portion of the frame image using a low pass filter. For example, a Gaussian blur filter may be applied to the selected portion of the frame.

By way of further, if an image characteristic (e.g., brightness, contrast, color, shadows, transparencies, sharpness, etc.) of a frame violates customization rules, the corresponding image characteristic may be automatically modified by the system so that the frame image complies with customization rules. For example, the image brightness may be increased or decreased so as to comply with customization rules. By way of further example, the image contrast may be increased or decreased so as to comply with customization rules. By way of yet further example, an image color may be changed to a different color so as to comply with customization rules.

Where a blurring and/or image characteristic edits are performed on a frame, the edits may be stored, and the edited frame may be used for customizing the product as described elsewhere herein.

Optionally, some customizations of a product using an item of video content may be performed using the process discussed above with respect to FIG. 23 (where an end user selects a frame image from the item of video content), and some customizations of a product using an item of video content may be performed using the process discussed above with respect to FIG. 24 (where the system selects a frame image from the item of video content). For example, a preferred class of users (e.g., those who agree to pay more for the customized product, those who are members of a loyalty or fan club, etc.) may be enabled to select a desired frame using the process illustrated in FIG. 23, while other (e.g., less preferred) end users may be enabled to select a desired frame using the process illustrated in FIG. 24.

Thus, aspects of the disclosure relate to enhancement in the computer aided design and customization of physical and digital items.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A computer-aided design (CAD) computer system comprising:
    a computing device;
    a network interface;
    a non-transitory data media configured to store instructions that when executed by the computing device, cause the computing device to perform operations comprising:
        provide for display on a device of a first user a product selection user interface enabling a first user to select a product image;
        receive over a network using the network interface, from the device of the first user, a selection of an image of a first product via the product selection interface;
        cause the image of the first product to be displayed on the first user device with default design elements in respective locations determined using a first template, wherein the first product is displayed in accordance with corresponding current color data;
        access current color data associated with the first product;
        detect a first user selection of a first template design area;
        determine design element collections, comprising images, associated with the first template design area;
        determine design element collections, comprising images, associated with a second template design area, the design element collections associated with the second template design area different than the design element collections associated with the first template design area;
        access a color rule corresponding to the current color data associated with the first product, wherein the color rule, when applied is configured to provide a real time indication as to which design elements in the design element collections, comprising images, associated with the first template design area, are inhibited from being used contrary to the color rule with a color of the first product;

access color data associated with design elements, comprising images, in the design element collections associated with the first template design area;

use the color rule corresponding to the current color data associated with the first product, the current color data associated with the first product, and the color data associated with design elements, comprising images, in the design element collections associated with the first template design area to identify, in real time, proscribed design elements, comprising images, in the design element collections associated with the first template design area, wherein the design element collections, comprising a first set of images, associated with the first template design area are different than the design element collections, comprising a second set of images, associated with the second template design area;

cause, at least in part, a design element menu comprising at least a portion of the design elements, comprising images, in the design element collections, comprising the first set of images, associated with the first template design area, with a visual identification of proscribed design elements identified using the color rule corresponding to the current color data associated with the first product, the current color data associated with the first product, and the color data associated with design elements in the design element collections associated with the first template design area, the proscribed design elements comprising proscribed images;

enable the first user to modify the first template design area utilizing non-proscribed design elements, comprising images, in the design element collections, comprising the first set of images, associated with the first template design area;

inhibit the first user from modifying the first template design area utilizing proscribed design elements, comprising images, in the design element collections, comprising the first set of images, associated with the first template design area identified using the color rule corresponding to the current color data associated with the first product, the current color data associated with the first product, and the color data associated with design elements in the design element collections associated with the first template design area; and cause at least in part design elements of the first template, as modified by the first user, to be printed or embroidered on a physical instance of the first product.

2. The CAD computer system as defined in claim 1, the operations further comprising:

detect a selection by the first user of a different color for the first product;

cause an image of the first product to be displayed on the first user device in accordance with the selected different color, the selected different color associated with second color data;

use a color rule corresponding to the second color data associated with the first product, the second color data associated with the first product, and the color data associated with design elements in the design element collections associated with the first template design area to identify second proscribed design elements in the design element collections associated with the first template design area; and cause, at least in part, a design element menu comprising at least a portion of the design elements in the design element collections associated with the first template design area, with a visual identification of the second proscribed design elements.

3. The CAD computer system as defined in claim 1, wherein color data associated with design elements in the design element collections associated with the first template design area comprises histogram data.

4. The CAD computer system as defined in claim 1, wherein the color rule comprises a minimum color distance in CIELAB color space from the current color data associated with the first product.

5. The CAD computer system as defined in claim 1, wherein the color rule comprises a minimum color distance in HSV color space from the current color data associated with the first product.

6. The CAD computer system as defined in claim 1, wherein the color rule comprises a minimum color distance in RGB color space from the current color data associated with the first product.

7. The CAD computer system as defined in claim 1, wherein visual identification of proscribed design elements comprises greying out and/or fading the proscribed design elements.

8. A computer-aided design (CAD) computer system comprising:

a computing device;

a network interface;

a non-transitory data media configured to store instructions that when executed by the computing device, cause the computing device to perform operations comprising:

provide for display on a device of a first user a product selection user interface enabling a first user to select a product image;

receive over a network using the network interface, from the device of the first user, a selection of an image of a first product via the product selection interface, wherein the first product comprises an item of clothing;

cause the image of the first product in a first color to be displayed on the first user device with default design elements, in respective locations determined using a first template;

store an association of design element collections, comprising images, associated with a first template design area;

store an association of design element collections, comprising images, associated with a second template design area, the design element collections associated with the second template design area different than the design element collections associated with the first template design area;

detect a first user selection of the first template design area;

cause, at least in part, a design element interface comprising at least a portion of design elements in design element collections, comprising images, associated with the first template design area to be displayed, the design element collections associated with the first template design area different than the design element collections associated with the second template design area;

receive a selection of a first design element, comprising a first image, by the first user from the design element interface;

access color data associated with the selected first design element, comprising the first image;

at least partly in response to the color data associated with the selected first design element, comprising the first image, and a color rule, wherein the color rule when applied is configured to determine if a color of the first design element, comprising the first image and the first color substantially match, at least partly in response to determining a color of the first design element, comprising the first image and the first color substantially match, automatically change in real time the first color of the first product displayed on the first user device to a second color in accordance with the color rule, wherein the first product comprises the item of clothing; and cause at least in part the selected first design element to be printed or embroidered on a physical instance of the first product having the second color, wherein the first product comprises an item of clothing.

9. The CAD computer system as defined in claim 8, the operations further comprising:

detect a selection by the first user of a different color for the first product;

cause an image of the first product to be displayed on the first user device in accordance with the selected different color, the selected different color associated with second color data;

use the color rule corresponding to second color data associated with the first product, the second color data associated with the first product, and the color data associated with design elements in the design element collections associated with the first template design area to identify second proscribed design elements in the design element collections associated with the first template design area; and cause, at least in part, a design element interface comprising at least a portion of the design elements in the design element collections associated with the first template design area, with a visual identification of the second proscribed design elements.

10. The CAD computer system as defined in claim 8, wherein color data associated with design elements in the design element collections associated with the first template design area comprises histogram data.

11. The CAD computer system as defined in claim 8, wherein the color rule comprises a minimum color distance in CIELAB color space from the current color data associated with the first product.

12. The CAD computer system as defined in claim 8, wherein the color rule comprises a minimum color distance in HSV color space from the current color data associated with the first product.

13. The CAD computer system as defined in claim 8, wherein the color rule comprises a minimum color distance in RGB color space from the current color data associated with the first product.

14. The CAD computer system as defined in claim 8, wherein visual identification of proscribed design elements comprises greying out and/or fading the proscribed design elements.

15. A computer-implemented method, the method comprising:

causing, using a computer system comprising hardware, an image of a first product, comprising an item of clothing, in a first color to be displayed on a first user device with default design elements in respective locations determined using a first template;

storing an association of design element collections, comprising images, associated with a first template design area;

storing an association of design element collections, comprising images, associated with a second template design area, the design element collections associated with the second template design area different than the design element collections associated with the first template design area;

detecting a first user selection of a first template design area;

causing, at least in part, a design element interface comprising at least a portion of design elements in design element collections associated with the first template design area to be displayed, comprising images, associated with the first template design area to be displayed, the design element collections associated with the first template design area different than the design element collections associated with the second template design area;

receiving a selection of a first design element by the first user from the design element interface;

accessing color data associated with the selected first design element, comprising the first image;

at least partly in response to the color data associated with the selected first design element comprising the first image and a color rule, automatically causing the first color of the first product, comprising the item of clothing, displayed on the first user device to be changed to a second color in accordance with the color rule, wherein the color rule when applied is configured to determine if a color of the first design element, comprising the first image and the first color substantially match; and at least partly in response to determining a color of the first design element, comprising the first image and the first color are substantially match, causing at least in part the selected first design element, comprising the first image, to be printed or embroidered on a physical instance of the first product, comprising the item of clothing, having the second color.

16. The method as defined in claim 15, the method further comprising:

detecting a selection by the first user of a different color for the first product;

causing an image of the first product to be displayed on the first user device in accordance with the selected different color, the selected different color associated with second color data;

using the color rule corresponding to the current color data associated with the first product, the second color data associated with the first product, and the color data associated with design elements in the design element collections associated with the first template design area to identify second proscribed design elements in the design element collections associated with the first template design area; and causing, at least in part, a design element interface comprising at least a portion of the design elements in the design element collections associated with the first template design area, with a visual identification of the second proscribed design elements.

17. The method as defined in claim 15, wherein color data associated with design elements in the design element collections associated with the first template design area comprises histogram data.

18. The method as defined in claim 15, wherein the color rule comprises a minimum color distance in CIELAB color space from current color data associated with the first product.

19. The method as defined in claim 15, wherein the color rule comprises a minimum color distance in HSV color space from the current color data associated with the first product.

20. The method as defined in claim 15, wherein the color rule comprises a minimum color distance in RGB color space from current color data associated with the first product.

21. The method as defined in claim 15, wherein visual identification of proscribed design elements comprises greying out and/or fading the proscribed design elements.

* * * * *

UNITED STATES PATENT AND TRADEMARK OFFICE
CERTIFICATE OF CORRECTION

| | |
|---|---|
| PATENT NO. | : 11,514,203 B2 |
| APPLICATION NO. | : 17/302858 |
| DATED | : November 29, 2022 |
| INVENTOR(S) | : Michael Bowen et al. |

It is certified that error appears in the above-identified patent and that said Letters Patent is hereby corrected as shown below:

On the Title Page

Column 2, (Item (57) Abstract), Line 12: After "one or" insert -- more --.

On Page 4, Column 1, (Item (56) Other Publications), Line 24: Delete "Sourcinga%" and insert -- Sourcing%20a% --.

In the Specification

On Column 1, Line 67: Delete "a least" and insert -- at least --.

On Column 2, Line 28: Delete "a least" and insert -- at least --.

On Column 2, Line 46: Delete "a least" and insert -- at least --.

On Column 26, Line 53: Delete "entirety" and insert -- entirety. --.

On Column 30, Line 55: After "one or" insert -- more --.

On Column 32, Line 17 (Approx.): After "may" insert -- be --.

On Column 33, Line 52: Delete "DFX," and insert -- DXF, --.

On Column 40, Line 1: After "automatically" delete "be".

On Column 41, Line 6: Delete "and or" and insert -- and/or --.

On Column 42, Line 21: Delete "slotlmageID)." and insert -- slotImageID). --.

Signed and Sealed this
Twenty-first Day of March, 2023

*Katherine Kelly Vidal*
Katherine Kelly Vidal
*Director of the United States Patent and Trademark Office*

CERTIFICATE OF CORRECTION (continued)
U.S. Pat. No. 11,514,203 B2

On Column 48, Line 62: Delete "I," and insert -- 1, --.

On Column 52, Line 55: Delete "transparences" and insert -- transparencies --.

On Column 53, Line 52: Delete "btg" and insert -- dtg --.

On Column 56, Line 9 (Approx.): Delete "value Algorithm" and insert -- value$\geq$Algorithm --.

On Column 62, Line 46: Delete "selections" and insert -- selections. --.

On Column 63, Line 13: After "automatically" delete "be".

On Column 63, Line 49: After "via" delete "a".

On Column 66, Line 14 (Approx.): Delete "assets" and insert -- assets. --.

On Column 66, Line 56: After "automatically" delete "be".

On Column 68, Line 29: After "the" delete "a".

On Column 70, Line 21: Delete "used." and insert -- used --.

On Column 74, Line 23 (Approx.): Delete "$w_n n_n Rutilization n$" and insert -- $w_n n_n Rutilization_n$ --.

On Column 80, Line 55: Delete "An" and insert -- an --.

On Column 86, Line 23: Delete "items" and insert -- items. --.

In the Claims

On Column 97, Line 47: In Claim 11, before "current" delete "the".

On Column 97, Line 51: In Claim 12, before "current" delete "the".

On Column 97, Line 55: In Claim 13, before "current" delete "the".

On Column 98, Line 51: In Claim 16, before "current" delete "the".

On Column 99, Line 7: In Claim 19, before "current" delete "the".